United States Patent
Kimura et al.

(10) Patent No.: US 10,499,277 B2
(45) Date of Patent: Dec. 3, 2019

(54) TERMINAL APPARATUS, COMMUNICATION CONTROL METHOD AND COMMUNICATION CONTROL APPARATUS

(71) Applicant: SONY CORPORATION, Tokyo (JP)

(72) Inventors: Ryota Kimura, Tokyo (JP); Hiromasa Uchiyama, Kanagawa (JP); Ryo Sawai, Tokyo (JP); Sho Furuichi, Tokyo (JP); Hiroaki Takano, Saitama (JP); Shinichiro Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 36 days.

(21) Appl. No.: 14/768,872

(22) PCT Filed: Jan. 31, 2014

(86) PCT No.: PCT/JP2014/052330
§ 371 (c)(1),
(2) Date: Aug. 19, 2015

(87) PCT Pub. No.: WO2014/167883
PCT Pub. Date: Oct. 16, 2014

(65) Prior Publication Data
US 2016/0021566 A1 Jan. 21, 2016

(30) Foreign Application Priority Data
Apr. 10, 2013 (JP) .................. 2013-082451

(51) Int. Cl.
*H04W 4/00* (2018.01)
*H04W 28/06* (2009.01)
(Continued)

(52) U.S. Cl.
CPC ........... *H04W 28/06* (2013.01); *H04W 72/02* (2013.01); *H04W 72/0406* (2013.01);
(Continued)

(58) Field of Classification Search
None
See application file for complete search history.

(56) References Cited

U.S. PATENT DOCUMENTS 9,635,652 B2 * 4/2017 Wu ............... H04W 52/146
2009/0034432 A1 * 2/2009 Bonta .............. H04W 74/02
370/255
(Continued)

FOREIGN PATENT DOCUMENTS

JP 2004-248210 A 9/2004
JP 2005-269530 A 9/2005
(Continued)

OTHER PUBLICATIONS

International Search Report dated Mar. 4, 2014 in PCT/JP2014/052330 (with English language translation).
(Continued)

*Primary Examiner* — Ayanah S George
(74) *Attorney, Agent, or Firm* — Xsensus, LLP

(57) ABSTRACT

[Object] To allow an increase in load on the base station to be suppressed when the device-to-device communication is performed.
[Solution] There is provided a terminal apparatus capable of communicating with a base station, the terminal apparatus including an acquisition unit that acquires radio resource information related to a radio resource usable for device-to-device communication not via the base station, of radio resources controllable by the base station, and a determination unit that determines a size of data to be transmitted and received in the device-to-device communication on the basis of the radio resource information.

17 Claims, 61 Drawing Sheets

(51) Int. Cl.
  *H04W 76/14*  (2018.01)
  *H04W 72/02*  (2009.01)
  *H04W 72/04*  (2009.01)
  *H04W 4/70*  (2018.01)
  *H04W 92/18*  (2009.01)
  *H04W 88/02*  (2009.01)
  *H04W 88/08*  (2009.01)

(52) U.S. Cl.
  CPC .............. *H04W 76/14* (2018.02); *H04W 4/70* (2018.02); *H04W 88/02* (2013.01); *H04W 88/08* (2013.01); *H04W 92/18* (2013.01)

(56) References Cited

U.S. PATENT DOCUMENTS

| | | | |
|---|---|---|---|
| 2010/0165882 A1 | 7/2010 | Palanki et al. | |
| 2011/0268004 A1* | 11/2011 | Doppler | H04W 72/02 370/311 |
| 2011/0268101 A1* | 11/2011 | Wang | H04L 5/0053 370/344 |
| 2011/0282989 A1 | 11/2011 | Geirhofer et al. | |
| 2012/0083283 A1* | 4/2012 | Phan | H04W 72/048 455/450 |
| 2012/0093098 A1* | 4/2012 | Charbit | H04W 72/04 370/329 |
| 2012/0134344 A1 | 5/2012 | Yu et al. | |
| 2012/0302272 A1 | 11/2012 | Hakola et al. | |
| 2013/0155990 A1* | 6/2013 | Nishio | H04L 5/0053 370/329 |
| 2013/0178221 A1* | 7/2013 | Jung | H04L 9/0844 455/450 |

FOREIGN PATENT DOCUMENTS

| | | | | |
|---|---|---|---|---|
| JP | 2008-211344 A | 9/2008 | | |
| JP | 2009-89042 A | 4/2009 | | |
| JP | 2012-514435 A | 6/2012 | | |
| JP | 2012-169693 A | 9/2012 | | |
| JP | 2012-169873 A | 9/2012 | | |
| JP | 2013-34165 A | 2/2013 | | |
| JP | 2013-530570 A | 7/2013 | | |
| WO | WO 2011/083741 A1 | 7/2011 | | |
| WO | WO 2011/130626 A1 | 10/2011 | | |
| WO | WO 2011/143496 A1 | 11/2011 | | |
| WO | WO 2011143496 A1 * | 11/2011 | ............... | H04L 1/00 |
| WO | WO 2012/035732 A1 | 3/2012 | | |
| WO | WO-2012159270 A1 * | 11/2012 | .......... | H04W 72/048 |
| WO | WO 2012/166969 A1 | 12/2012 | | |

OTHER PUBLICATIONS

Extended European Search Report dated Oct. 31, 2016 in European Patent Application No. 14782854.5.
Office Action dated Sep. 26, 2017 in Japanese Patent Application No. 2015-511123.
Combined Chinese Office Action and Search Report dated Apr. 4, 2018 in corresponding Patent Application No. 201480019560.X (with English Translation), 17 pages.
Office Action dated May 29, 2018 in corresponding Japanese Patent Application No. 2015-511123 (with English Translation), citing documents AO-AT therein, 17 pages.

* cited by examiner

FIG. 3

| | #0 D | #1 S | #2 U | #3 U | #4 U | #5 D | #6 S | #7 U | #8 U | #9 U |
|---|---|---|---|---|---|---|---|---|---|---|
| Configuration 0 DL:UL 2:3 | #0 D | #1 S | #2 U | #3 U | #4 U | #5 D | #6 S | #7 U | #8 U | #9 U |
| Configuration 1 DL:UL 3:2 | #0 D | #1 S | #2 U | #3 U | #4 D | #5 D | #6 S | #7 U | #8 U | #9 D |
| Configuration 2 DL:UL 4:1 | #0 D | #1 S | #2 U | #3 D | #4 D | #5 D | #6 S | #7 U | #8 D | #9 D |
| Configuration 3 DL:UL 7:3 | #0 D | #1 S | #2 U | #3 U | #4 U | #5 D | #6 D | #7 D | #8 D | #9 D |
| Configuration 4 DL:UL 4:1 | #0 D | #1 S | #2 U | #3 U | #4 D | #5 D | #6 D | #7 D | #8 D | #9 D |
| Configuration 5 DL:UL 9:1 | #0 D | #1 S | #2 U | #3 D | #4 D | #5 D | #6 D | #7 D | #8 D | #9 D |
| Configuration 6 DL:UL 1:1 | #0 D | #1 S | #2 U | #3 U | #4 U | #5 D | #6 S | #7 U | #8 U | #9 D |

FIG. 6

| CQI Index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 7

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

FIG. 8

| MCS Index $I_{MCS}$ | Modulation Order $Q_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

FIG. 50

| TDD UL/DL CONFIGURATION | MAXIMUM NUMBER OF HARQ PROCESSES |
|---|---|
| 0 | 4 |
| 1 | 7 |
| 2 | 10 |
| 3 | 9 |
| 4 | 12 |
| 5 | 15 |
| 6 | 6 |

TERMINAL APPARATUS, COMMUNICATION CONTROL METHOD AND COMMUNICATION CONTROL APPARATUS

TECHNICAL FIELD

The present disclosure relates to a terminal apparatus, a communication control method, and a communication control apparatus.

BACKGROUND ART

In recent years, communication systems of a cellular scheme such as long time evolution (LTE) and worldwide interoperability for microwave access (WiMAX) have spread widely. Further, data traffic in the communication systems is increasing due to the spread of smartphones or the like. Accordingly, it is becoming increasingly important for each communication provider to increase a communication capacity of the communication systems.

It is also considered to utilize device-to-device (D2D) communication for offloading of data against the increase in the data traffic. For example, when two terminal apparatuses directly communicate with each other instead of communicating with each other via a base station, the data traffic of radio communication via the base station can be reduced to reduce a load of a network side including the base station.

For example, there has been disclosed technology that uses a radio terminal as a relay station for multihop communication, and assigns a radio resource (time slot) to the multihop communication (see, for example, JP 2004-248210A). Additionally, there has been disclosed technology that uses a radio terminal as a relay station for an ad-hoc network, and when it is determined that a data amount in the ad-hoc network has exceeded a transmittable data amount, allows the radio terminal to directly communicate with a base station (see, for example, JP 2009-89042A).

CITATION LIST

Patent Literature

Patent Literature 1: JP 2004-248210A
Patent Literature 2: JP 2009-89042A

SUMMARY OF INVENTION

Technical Problem

However, when the D2D communication is introduced, a load on the base station may increase.

Specifically, in the communication system of the cellular scheme represented by the LTE, the base station determines a size of data to be transmitted using the assigned radio resource in both of an uplink and a downlink in the communication between the base station and the terminal apparatus. For example, the 3rd generation partnership project (3GPP) technology standard TS36.213 describes a method for determining the size. However, the determination method is a method for communication between the base station and the terminal apparatus, and the D2D communication is not considered in the determination method.

Therefore, as is the case with the communication between the base station and the terminal apparatus, it is considered that the base station determines the size of the data also in the D2D communication. However, when determining the size of the data as is the case with the communication between the base station and the terminal apparatus, the base station will collect various information related to the D2D communication (for example, information related to media access control (MAC), radio link control (RLC) and a packet data convergence protocol (PDCP)). As a result, an overhead for information collection by the base station may increase. Further, a heavy load may be applied to the base station due to management and control for the D2D communication. In this way, it is concerned that the load on the base station increases.

Accordingly, it is desirable to provide a system capable of suppressing an increase in load on the base station when the device-to-device communication is performed.

Solution to Problem

According to the present disclosure, there is provided a terminal apparatus capable of communicating with a base station, the terminal apparatus including: an acquisition unit that acquires radio resource information related to a radio resource usable for device-to-device communication not via the base station, of radio resources controllable by the base station; and a determination unit that determines a size of data to be transmitted and received in the device-to-device communication on the basis of the radio resource information.

According to the present disclosure, there is provided an information processing apparatus that controls a terminal apparatus capable of communicating with a base station, the information processing apparatus including: a memory that stores a predetermined program; and a processor capable of executing the predetermined program. The predetermined program serves to execute acquiring radio resource information related to a radio resource usable for device-to-device communication not via the base station, of radio resources controllable by the base station, and determining a size of data to be transmitted and received in the device-to-device communication on the basis of the radio resource information.

According to the present disclosure, there is provided a communication control apparatus of a base station, the communication control apparatus including: an assignment unit that assigns a radio resource for radio communication between the base station and a terminal apparatus to the terminal apparatus from among radio resources controllable by the base station; and a notification unit that notifies the terminal apparatus of usable radio resources of the radio resources controllable by the base station. A part or all of the usable radio resources are used for device-to-device communication not via the base station. A size of data to be transmitted and received in the device-to-device communication is not determined by the base station, but determined by the terminal apparatus capable of communicating with the base station.

Advantageous Effects of Invention

As described above, according to the present disclosure, it is possible to suppress an increase in load on the base station when the device-to-device communication is performed.

BRIEF DESCRIPTION OF DRAWINGS

FIG. 3 is an explanatory diagram for explaining an example of a configuration of a link direction defined in the 3GPP.

FIG. 6 is an explanatory diagram for explaining a specific content of CQI.

FIG. 7 is an explanatory diagram for explaining a correspondence relationship between MCS indexes and TBS indexes for PDSCH.

FIG. 8 is an explanatory diagram for explaining a correspondence relationship between MCS indexes and TBS indexes for PUSCH.

FIG. 50 is an explanatory diagram for explaining a maximum number of HARQ processes related to a downlink of TDD.

DESCRIPTION OF EMBODIMENTS

Figure 1:
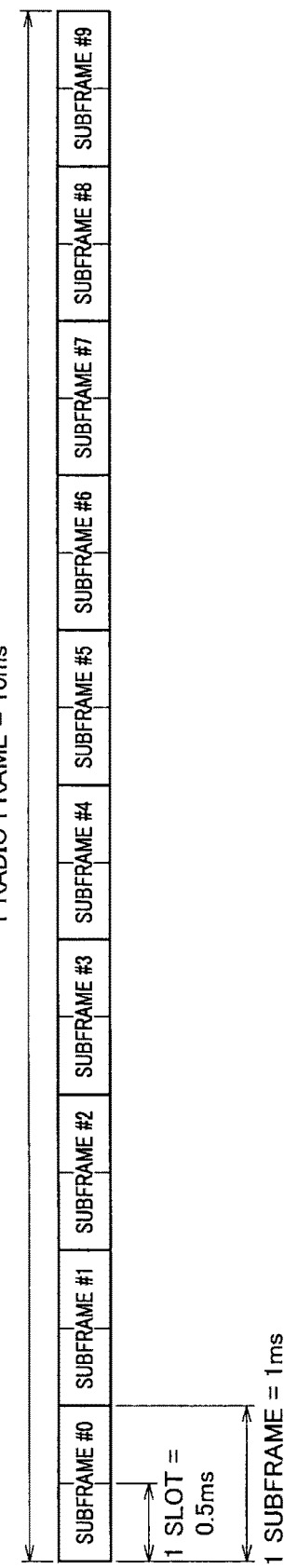
FIG. 1 is an explanatory diagram for explaining a radio resource in a time direction for a FDD.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that description will be provided in the order as follows:
1. Introduction
1.1. Technology of radio communication in 3GPP
1.2. Technical problem
2. Schematic configuration of communication system according to embodiment of the present disclosure
3. First Embodiment
3.1. Outline
3.2. Function configuration of terminal apparatus
3.3. Flow of processing
3.4. First modification
3.5. Second modification
3.6. Third modification
3.7. Fourth modification
4. Second Embodiment
4.1. Outline
4.2. Function configuration of terminal apparatus
4.3. Flow of processing
4.4. First modification
4.5. Second modification
4.6. Third modification
5. Third Embodiment
5.1. Outline
5.2. Function configuration of terminal apparatus
5.3. Flow of processing
5.4. First modification
5.5. Second modification
6. Related peripheral operation
7. Application examples
8. Summary
9. Reference embodiment
9.1. Outline
9.2. Function configuration of base station
9.3. Flow of processing
9.4. First modification
9.5. Second modification
9.6. Application examples <<Introduction>>

First, with reference to FIG. 1 to FIG. 8, technology and a technical problem of radio communication in the 3GPP will be described.

<1.1. Technology of Radio Communication in 3GPP>

With reference to FIG. 1 to FIG. 8, the technology of the radio communication in the 3GPP will be described.

(Radio Resource and Format)

Time Direction

In the radio communication in the 3GPP, a radio resource is divided in a time direction. For example, in LTE, the radio resource is divided in a subframe unit. This point will be described below with reference to FIG. 1 and FIG. 2.

FIG. 1 is an explanatory diagram for explaining the radio resource in the time direction for a frequency division duplex (FDD). With reference to FIG. 1, 10 sub-frames included in a radio frame of 10 ms are shown. In the FDD, a frequency band for an uplink link and a frequency band for a downlink are prepared, and resource control is performed in the subframe unit in each of the frequency bands. Note that each subframe includes two slots. Further, each slot includes 7 orthogonal frequency division multiplexing (OFDM) symbols.

Figure 2:
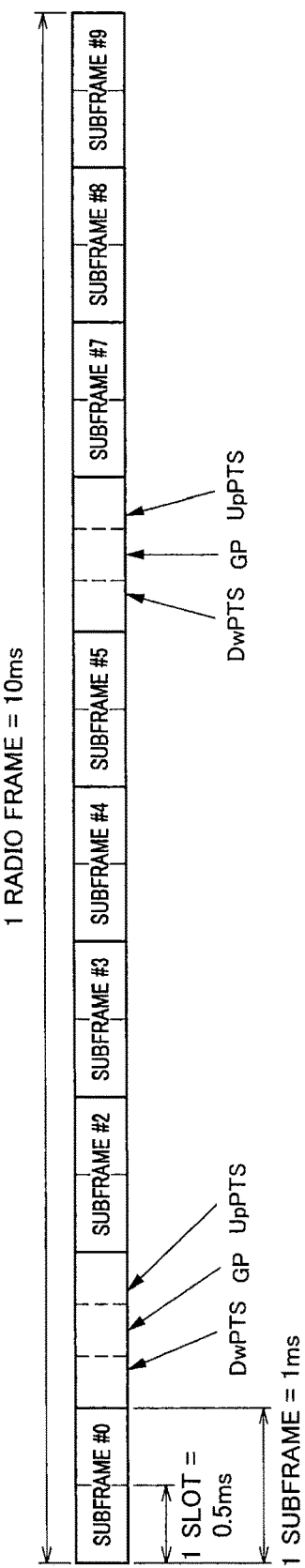
FIG. 2 is an explanatory diagram for explaining a radio resource in a time direction for a TDD.

FIG. 2 is an explanatory diagram for explaining the radio resource in the time direction for a time division duplex (TDD). With reference to FIG. 2, 10 subframes included in a radio frame of 10 ms are shown. In the TDD, communication is performed according to a link direction in the subframe unit. That is, each subframe is one of a downlink subframe, an uplink subframe, or a special subframe. The special subframe is provided for suppressing the interference in switching from the downlink subframe to the uplink subframe. The special subframe includes a downlink pilot time slot (DwPTS), a guard period, and an uplink pilot time slot (UpPTS). With reference to FIG. 3, a specific example of the link direction in the subframe unit in the TDD will be described below.

FIG. 3 is an explanatory diagram for explaining an example of a configuration of the link direction defined in the 3GPP. With reference to FIG. 3, 7 configurations defined in the LTE technology standard (TS 36.211 Table 4.2-2) are shown. The subframe represented by "D" is the downlink subframe, the subframe represented by "U" is the uplink subframe, and the subframe represented by "S" is the special subframe. For example, in the LTE, any configuration of these 7 configurations is selected and applied.

Frequency Direction

Furthermore, for example, in the LTE, the radio resource is divided also in a frequency direction. Specifically, in the frequency band direction, subcarriers exist at an interval of 15 kHz. Then, the subcarriers are bundled every 12 subcarriers (that is, 180 kHz).

Time Direction and Frequency Direction

For example, in the LTE, the radio resource over the 12 subcarriers in the frequency direction and 1 slot in the time direction is handled as a resource block (RB). Further, the radio resource of 1 subcarrier and 1 OFDM symbol is called a resource element.

Each RE is used for transmission of a control signal or a data signal. Examples of the control signal include a synchronization signal, a reference signal, and the like.

Furthermore, a channel including one or more resource elements is defined. In the LTE, as the channel of the downlink, a physical downlink control channel (PDCCH), a physical downlink shared channel (PBCH), a physical broadcast channel (PBCH), a physical control format indicator channel (PCFICH), and a physical HARQ indicator channel (PHICH) are defined. On the other hand, as the channel of the uplink, a physical uplink control channel (PUCCH), a physical uplink shared channel (PUSCH), and a physical random access channel (PRACH) are defined.

Note that data is basically transmitted on the PDSCH in the downlink, and transmitted on the PUSCH in the uplink. The number of the REs that can be used for the transmission of the data affects a size of the data to be transmitted and received.

(Communication Control Processing for Communication Between Base Station and Terminal Apparatus)

In a communication system of a cellular scheme represented by the LTE, the base station determines the size of the data to be transmitted using the assigned radio resource in both of the uplink and the downlink in communication between the base station and the terminal apparatus. Specifically, the base station determines any of predetermined transport block sizes (TBSs) as the size of the data to be transmitted. An example of communication control processing for the communication between the base station and the terminal apparatus will be described below with reference to FIG. 4.

Figure 4:
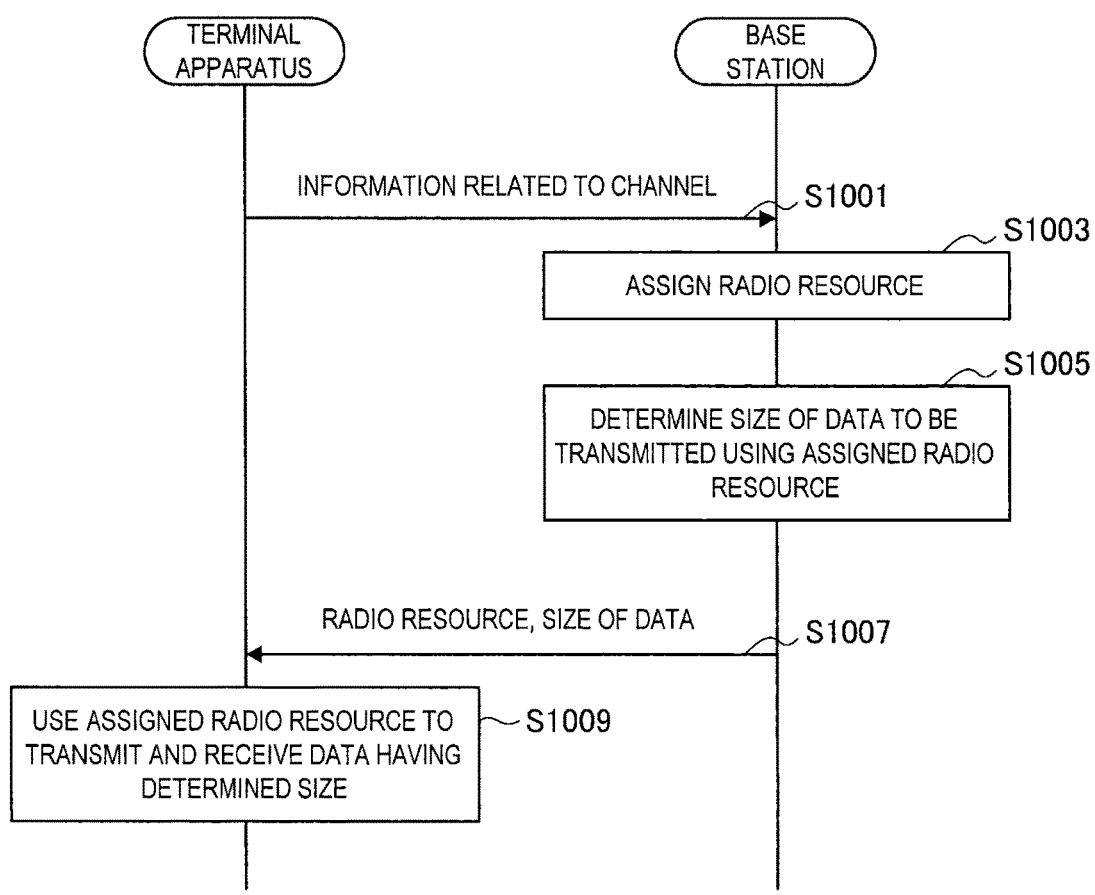
FIG. 4 is a sequence diagram illustrating an example of a schematic flow of communication control processing for communication between a base station and a terminal apparatus.

FIG. 4 is a sequence diagram illustrating an example of a schematic flow of the communication control processing for the communication between the base station and the terminal apparatus.

The terminal apparatus feeds back information on the channel between the base station and the terminal apparatus periodically or according to an instruction by the base station (S1001). For example, the information is channel-related information, and includes a channel quality indicator (CQI), a rank indicator (RI), a precoding matrix indicator (PMI), reference signal received power (RSRP), and reference signal received quality (RSRQ), and the like. The channel state information is related to determination of a modulation scheme and an encoding scheme used in the communication between the base station and the terminal apparatus.

The base station, when downlink data addressed to the terminal apparatus is generated, or when a transmission opportunity is requested by the terminal apparatus, performs resource control for the communication between the base station and the terminal apparatus (S1003). Specifically, the base station assigns the radio resource for the communication between the base station and the terminal apparatus. In the LTE, the radio resource is the RB.

The base station then determines the size of the data transmitted and received using the assigned radio resource after the resource control (S1005). The size is called the transport block size (TBS). Since candidates of the TBS are determined in the LTE, the base station then determines any candidate of the candidates of the TBS corresponding to the assigned radio resource as the size of the data to be transmitted and received.

After that, the base station notifies the terminal apparatus of control information including the information related to the assigned radio resource and the determined size (S1007). The terminal apparatus is notified of the information on the downlink as downlink assignment and notified of the information on the uplink as uplink grant. Specifically, the PDCCH includes downlink control information (DCI), and the DCI includes a modulation and coding scheme (MCS) index. The MCS index corresponds to a TBS index, and the modulation scheme and the encoding scheme. Therefore, the terminal apparatus acquires the TBS index from the MCS index, and acquires the TBS from the TBS index and the number of the assigned RBs. Further, the terminal apparatus acquires the modulation scheme and the encoding scheme to be used from the MCS index.

The base station and the terminal apparatus then use the assigned radio resource to transmit and receive the data having the determined size (S1005).

(Various Types of Information Related to Determination of Data Size)

Candidates of Transport Block Size (TBS)

As described above, the base station determines any candidate of the candidates of the TBS corresponding to the assigned radio resource as the size of the data to be transmitted and received. Further, the terminal apparatus acquires the determined TBS from the TBS indexe and the number of the assigned RBs. A specific content of the TBS will be described below with reference to FIG. 5.

Figure 5:
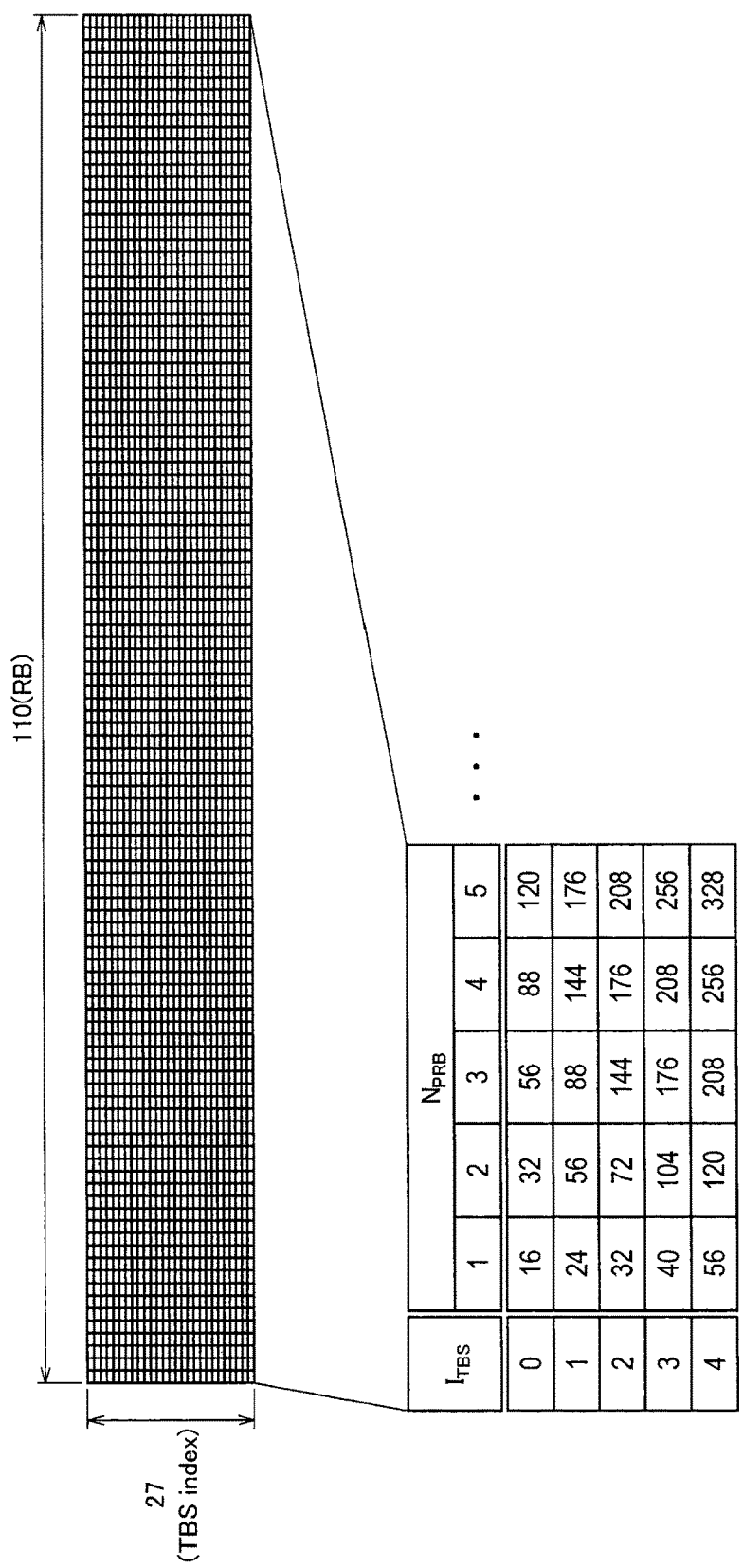
FIG. 5 is an explanatory diagram for explaining an example of a specific content of a transport block size (TBS) candidate.

FIG. 5 is an explanatory diagram for explaining an example of the specific content of the transport block size (TBS) candidates. With reference to FIG. 5, a table of the TBS candidates specified in Table 7.1.7.2.1-1 of the 3GPP technology standard TS26.213 is shown. The TBS candidates correspond to the TBS index and the number of the RBs. 27 indexes are specified as the TBS index, and 1-110 PBs are specified as the number of the RBs. The base station determines any candidate of the TBS candidates as the size of the data to be transmitted and received on the basis of the number of the assigned RBs, the modulation scheme and the encoding scheme, and the like. As an example, the base station selects a column of the table corresponding to the number of the RBs from the number of the assigned RBs. The base station then determines any candidate of the TBS candidates included in the selected column as the size of the data to be transmitted and received on the basis of the modulation scheme, the encoding scheme, and the like.

CQI

As described above, communication quality for the downlink channel is measured by the terminal, and the communication quality is reported to the base station as the CQI. A specific content of the CQI will be described below with reference to FIG. 6.

FIG. 6 is an explanatory diagram for explaining the specific content of the CQI. With reference to FIG. 6, a table of the CQI specified in Table 7.2.3-1 of the 3GPP technology standard TS36.213 is shown. The CQI is one of 1 to 15. Each CQI corresponds to the modulation scheme, an encoding rate, and a bit per symbol.

MCS Index and TBS Index

As described above, the MCS index corresponds to the TBS index. A specific content of this point will be described below with reference to FIG. 7 and FIG. 8.

FIG. 7 and FIG. 8 are an explanatory diagram for explaining a correspondence relationship between the MCS indexes and the TBS indexes. With reference to FIG. 7, a table of the correspondence relationship between the MCS indexes and the TBS indexes for the PDSCH, specified in Table 7.1.7.1-1 of the 3GPP technology standard TS36.213 is shown. Further, with reference to FIG. 8, a table of the correspondence relationship between the MCS indexes and the TBS indexes for the PUSCH, specified in Table 8.6.1-1 of the 3GPP technology standard TS36.213 is shown. In this way, the terminal apparatus can acquire the TBS index from the MCS index included in the DCI in the PUCCH. Then, as shown in FIG. 5, the terminal apparatus can acquire the TBS from the TBS index and the number of the PBs.

<1.2. Technical Problem>

As described above, the size of the data to be transmitted and received in the communication between the base station and the terminal apparatus is determined. However, when the device-to-device communication (that is, the D2D communication) is introduced in addition to such communication, a load on the base station may increase.

Specifically, in the communication system of the cellular scheme represented by the LTE, the base station determines a size of data to be transmitted using the assigned radio resource in both of an uplink and a downlink in the communication between the base station and the terminal apparatus. As described above, for example, the 3rd generation partnership project (3GPP) technology standard TS36.213 describes a method for determining the size. However, the determination method is a method for communication between the base station and the terminal apparatus, and the D2D communication is not considered in the determination method.

Therefore, as is the case with the communication between the base station and the terminal apparatus, it is considered that the base station determines the size of the data also in the D2D communication. However, when determining the size of the data as is the case with the communication between the base station and the terminal apparatus, the base station will collect various information related to the D2D communication (for example, information related to MAC, RLC and a PDCP). As a result, an overhead for information collection by the base station may increase. Further, a heavy load may be applied to the base station due to management and control for the D2D communication. In this way, it is concerned that the load on the base station increases.

Therefore, an embodiment of the present disclosure can suppress an increase in load on the base station in the case where the D2D communication is performed.

Figure 9:
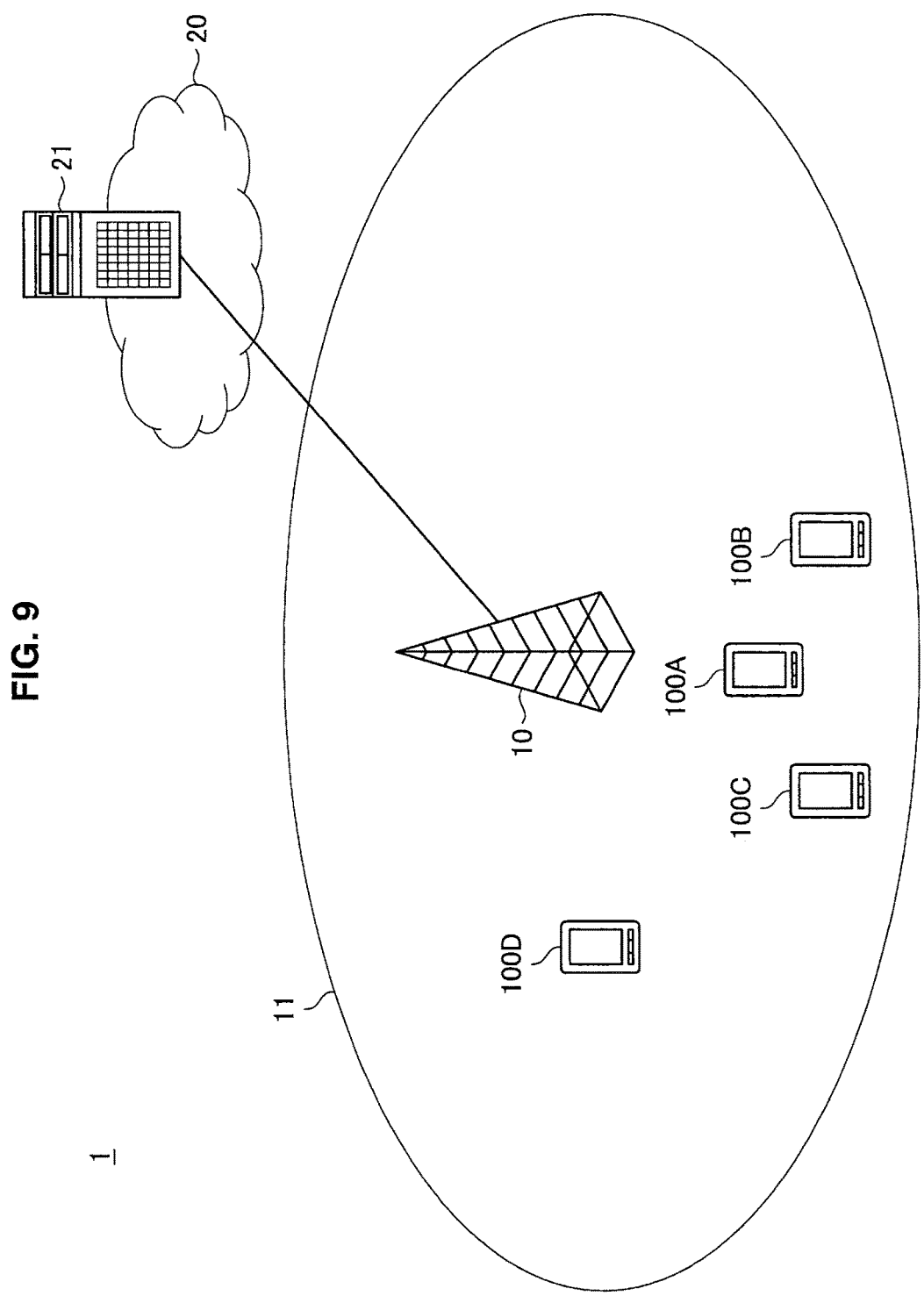
FIG. 9 is an explanatory diagram illustrating an example of a schematic configuration of a communication system according to an embodiment of the present disclosure.

2. Schematic Configuration of Communication System According to Embodiment of the Present Disclosure Subsequently, with reference to FIG. 9 to FIG. 11, a schematic configuration of a communication system according to an embodiment of the present disclosure will be described. FIG. 9 is an explanatory diagram illustrating an example of the schematic configuration of the communication system according to an embodiment of the present disclosure. With reference to FIG. 9, a communication system 1 includes a base station 10, a core network entity 20, and a terminal apparatus 100. The communication system 1 is, for example, a system conforming to the LTE.

(Base Station 10)

The base station 10 controls radio communication of the base station 10 within a cell 11. For example, the base station 10 performs radio communication with the terminal apparatus 100 positioned within the cell 11, and controls the radio communication. The base station 10 is, for example, an eNodeB. For example, the base station 10 performs radio communication by one of the FDD and the TDD. Further, for example, the base station 10 performs radio communication by the OFDM in the downlink, and performs radio communication by single carrier frequency division multiple access (SC-FDMA) in the uplink. The base station 10 may perform radio communication with the terminal apparatus 100 via a relay station.

For example, the base station 10 assigns the radio resource to the terminal apparatus 100 for radio communication between the base station 10 and the terminal apparatus 100. Specifically, for example, the base station 10 assigns the radio resource to the terminal apparatus 100 for downlink transmission of the data addressed to the terminal apparatus 100. Further, the base station 10 assigns the radio resource to the terminal apparatus 100 for downlink transmission of the data addressed to the terminal apparatus 100. Further, the base station 10 assigns the radio resource to the terminal apparatus 100 for uplink transmission of the data addressed to the terminal apparatus 100. Note that the base station 10 includes a resource assignment unit that assigns the radio resource in this manner.

Further, for example, the radio resource is assigned in a predetermined division unit. Specifically, for example, the radio resource is assigned in a subframe unit in the time direction, and in a resource block unit (that is, 12-subcarrier unit) in the frequency direction.

Note that the base station 10 may not assign any radio resource to any terminal for suppressing the interference.

(Core Network Entity)

The core network entity 20 is an entity arranged in the core network 21. For example, the core network 21 is an evolved packet core (EPC), the core network entity 20 is a mobility management entity (MME), a serving gateway (S-GW), a packet data network gateway (P-GW), or the like. The core network entity 20 performs control related to radio communication between the base station 10 and the terminal apparatus 100.

(Terminal Apparatus 100)

The terminal apparatus 100 is an apparatus capable of communicating with the base station 10. For example, the terminal apparatus 100 is an apparatus allowing radio communication with the base station 10. Specifically, for example, the terminal apparatus 100, when being positioned within the cell 11, performs radio communication with the base station 10. For example, the terminal apparatus 100 performs radio communication by one of the FDD and the TDD. Further, for example, the terminal apparatus 100 performs radio communication by the OFDM in the downlink, and performs radio communication by the SC-FDMA in the uplink. The terminal apparatus 100 may perform radio communication with the base station 10 via the relay station.

For example, the terminal apparatus 100 performs radio communication with the base station according to the control by the base station 10. Specifically, for example, the terminal apparatus 100 uses the radio resource assigned to the base station 10 to perform radio communication in the uplink or the down link.

Especially, in an embodiment according to the present disclosure, the terminal apparatus 100 uses a part of the radio resources controllable by the base station 10, to perform the device-to-device communication (that is, the D2D communication) with another terminal apparatus 100. As described above, the radio resources controllable by the base station 10 are, for example, radio resources that can be assigned by the base station 10. Further, for example, when a different radio access scheme is used between the downlink and the uplink, the terminal apparatus 100 performs the D2D communication by one of the radio access scheme for the uplink and the radio access scheme for the downlink. Specifically, for example, the terminal apparatus 100 performs the D2D communication by the DFDM, or the D2D communication by the SC-FDMA. Here, as a form of the D2D communication, a localized network (LN) and individual D2D communication are considered. A specific example of these points will be described below with reference to FIG. 10 and FIG. 11.

Figure 10:
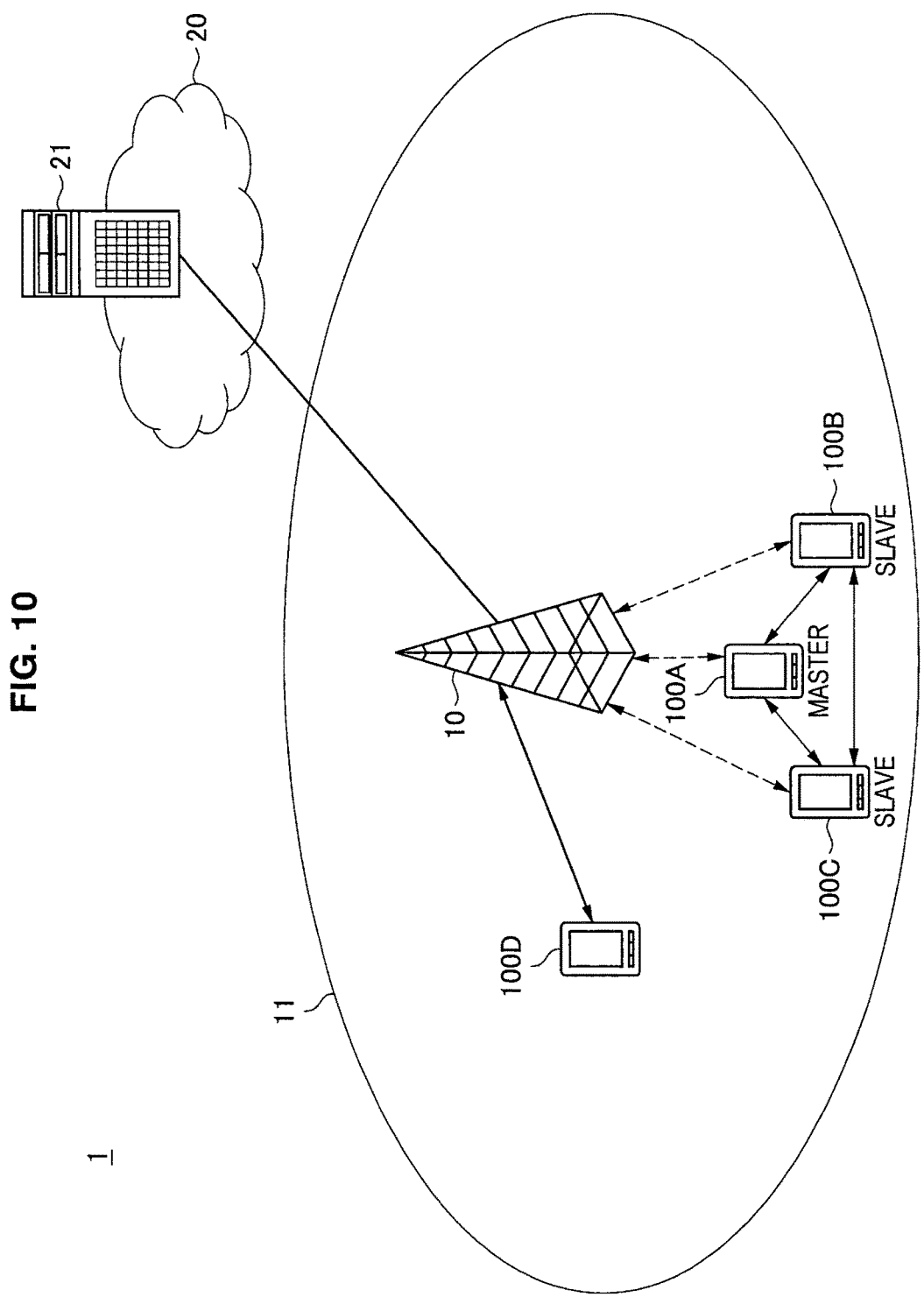
FIG. 10 is an explanatory diagram for explaining an example of radio communication in a case where a localized network (LN) is adopted as a form of D2D communication.

FIG. 10 is an explanatory diagram for explaining an example of the radio communication in a case where the localized network (LN) is adopted as a form of the D2D communication. With reference to FIG. 10, similarly to FIG. 9, each node is shown. In this example, a terminal apparatus 100A, a terminal apparatus 100B and a terminal apparatus 100C form the LN. In the LN, these is a relation between a master and a slave among the terminal apparatuses 100. In this example, the terminal apparatus 100A is a master apparatus and the terminal apparatus 100B and the terminal apparatus 100C are a slave apparatus. The master apparatus (terminal apparatus 100A) controls radio communication in the LN. For example, the master apparatus (terminal apparatus 100A) plays a role of the base station in a pseudo manner (that is, has a part of the function of the base station). Further, the master apparatus (terminal apparatus 100A) may function as the relay station bearing radio communication between the LN and the base station in order to realize the connection from the LN to a network (for example, the Internet). Note that the solid arrow indicates transmission and reception of both of the control information and the data, and the dotted arrow indicates transmission and reception of the control information. However, the transmission and reception of the data may be performed also in the transmission and reception indicated by the dotted arrow.

Figure 11:
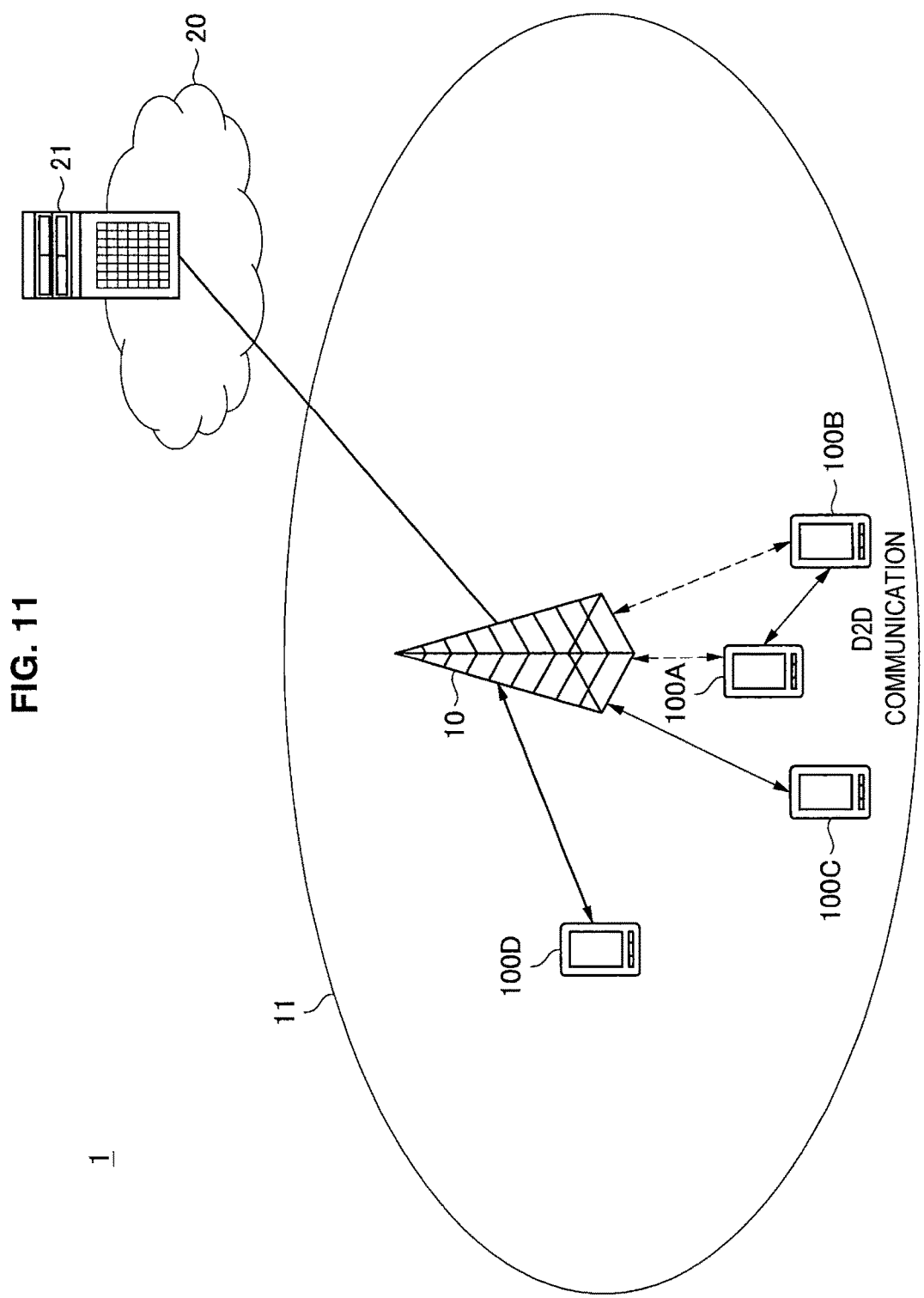
FIG. 11 is an explanatory diagram for explaining an example of radio communication in a case where individual D2D communication is adopted as a form of the D2D communication.

FIG. 11 is an explanatory diagram for explaining an example of the radio communication in a case where the individual D2D communication is adopted as a form of the D2D communication. With reference to FIG. 11, similarly to FIG. 9, each node is shown. In this example, the terminal apparatus 100A and the terminal apparatus 100B individually perform the D2D communication. In the example of FIG. 11, unlike the example of FIG. 10, the LN is not formed and there is no relation between the master and the slave between the terminal apparatus 100A and the terminal apparatus 100B, or the relation is weak even when it exists. Note that the solid arrow indicates transmission and reception of both of the control information and the data, and the dotted arrow indicates transmission and reception of the control information. However, the transmission and reception of the data may be performed also in the transmission and reception indicated by the dotted arrow.

3. First Embodiment

Subsequently, with reference to FIG. 12 to FIG. 32, a first embodiment of the present disclosure will be described.

<3.1. Outline>

First, with reference to FIG. 12, the first embodiment will be described. In the first embodiment, as described with reference to FIG. 10, as a form of the D2D communication, the localized network (LN) is adopted. Then, the size of the data to be transmitted and received in the D2D communication is determined by the master apparatus in the LN. A specific example of this point will be described below with reference to FIG. 12.

Figure 12:
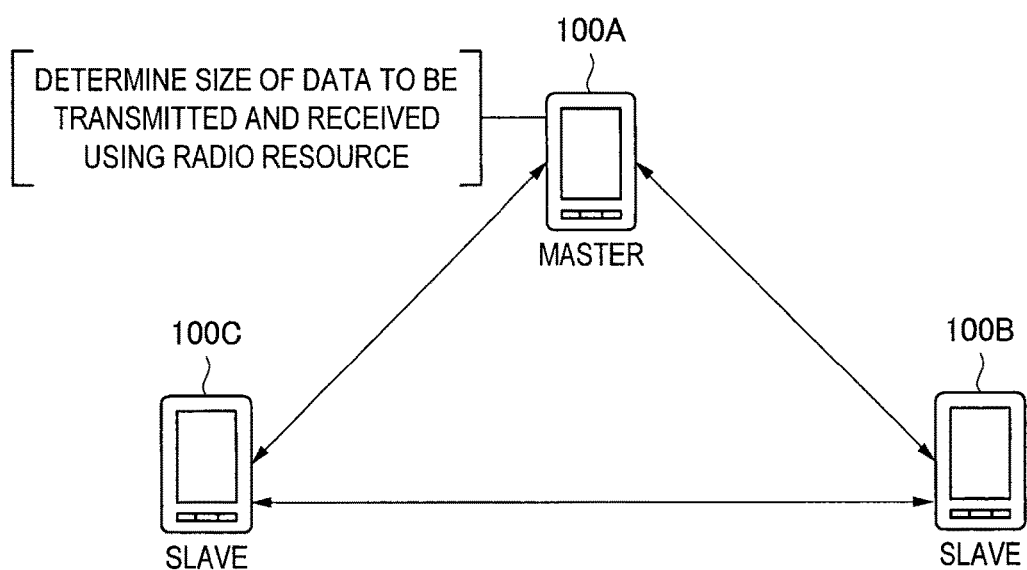
FIG. 12 is an explanatory diagram for explaining an outline of a first embodiment.

FIG. 12 is an explanatory diagram for explaining an outline of the first embodiment. With reference to FIG. 12, three terminal apparatuses 100 forming the localized network (LN) are shown. In this example, the terminal apparatus 100A is the master apparatus in the LN, and the terminal apparatus 100B and the terminal apparatus 100C are the slave terminals in the LN. In the first embodiment, in this way, the LN is adopted as a form of the D2D communication. Then, the master terminal (that is, the terminal apparatus 100A) determines the size of the data to be transmitted and received in the D2D communication within the LN. As an example, the size of the data to be transmitted and received in the D2D communication between the terminal apparatus 100B and the terminal apparatus 100C is determined by the terminal apparatus 100A. Further, as another example, the size of the data to be transmitted and received in the D2D communication between the terminal apparatus 100A and the terminal apparatus 100B is determined by the terminal apparatus 100A.

<3.2. Function Configuration of Terminal Apparatus>

Figure 13:
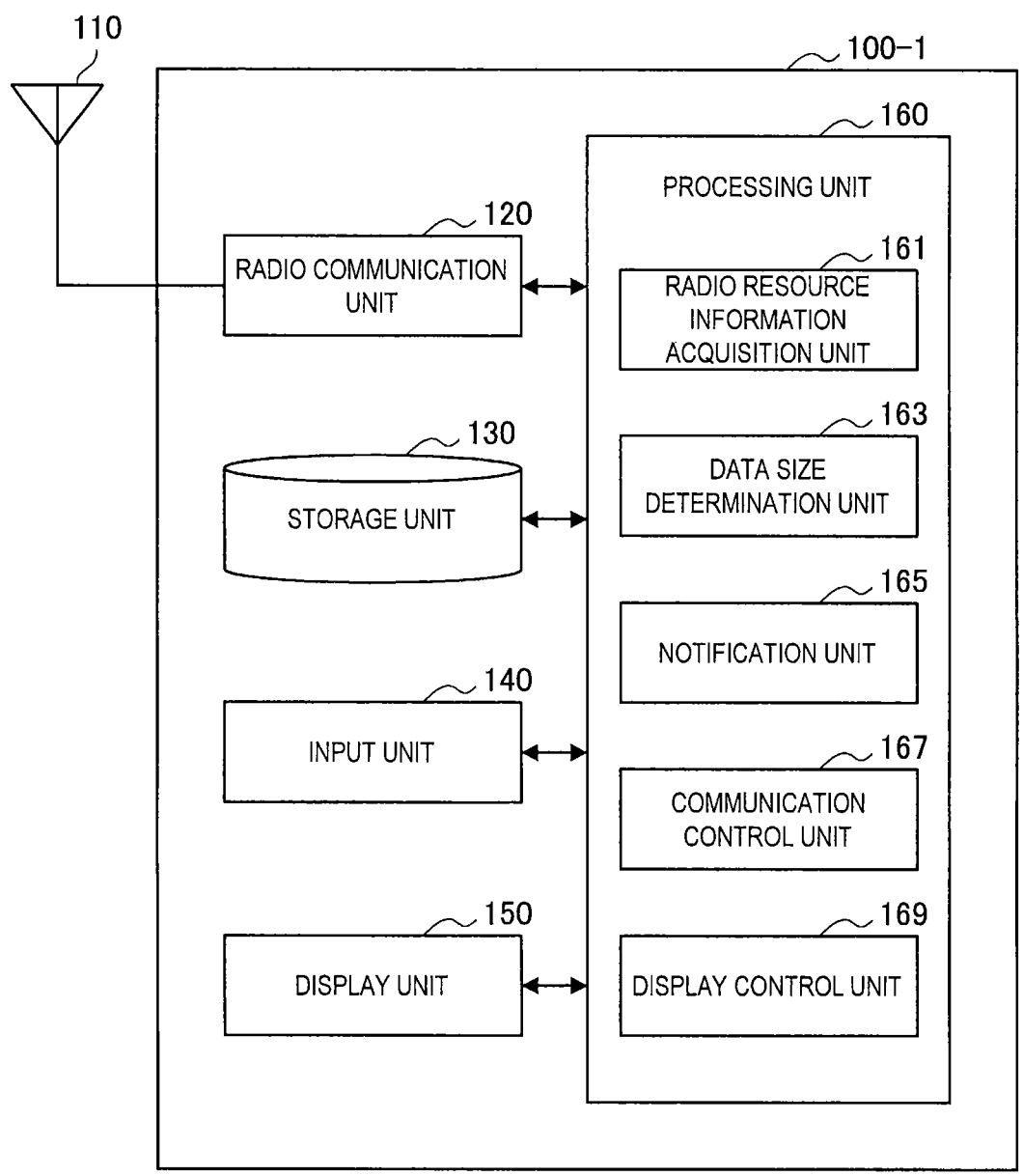
FIG. 13 is a block diagram illustrating an example of a function configuration of a terminal apparatus according to the first embodiment.

With reference to FIG. 13 to FIG. 16, an example of a function configuration of a terminal apparatus 100-1 according to the first embodiment will be described. FIG. 13 is a block diagram illustrating an example of the function configuration of the terminal apparatus 100-1 according to the first embodiment. With reference to FIG. 13, the terminal apparatus 100-1 includes an antenna unit 110, a radio communication unit 120, a storage unit 130, an input unit 140, a display unit 150, and a processing unit 160.

(Antenna Unit 110)

The antenna unit 110 receives a radio signal and outputs the received signal to the radio communication unit 120. Further, the antenna unit 110 transmits a transmission signal outputted by the radio communication unit 120.

(Radio Communication Unit 120)

The radio communication unit 120 performs radio communication with another apparatus. For example, the radio communication unit 120, when the terminal apparatus 100-1 is positioned within the cell 11, performs radio communication with the base station 10. Further, especially in an embodiment according to the present disclosure, the radio communication unit 120 performs radio communication with another terminal apparatus 100.

(Storage Unit 130)

The storage unit 130 stores a program and data for operating the terminal apparatus 100-1.

For example, the storage unit 130 stores information related to the size of the data to be transmitted and received in the radio communication. More specifically, for example, the storage unit 130 stores the table of the TBS candidates as shown in FIG. 5. Further, for example, the storage unit 130 stores the table of the correspondence relationship between the MCS indexes and the TBS indexes as shown in FIG. 7 and FIG. 8. Further, the storage unit 130 stores the table of the CQI as shown in FIG. 6.

(Input Unit 140)

The input unit 140 receives input by a user of the terminal apparatus. The input unit 140 provides the processing unit 160 with the input result.

(Display Unit 150)

The display unit 150 displays an output screen (that is, an output image) from the terminal apparatus 100-1. For example, the display unit 150 displays the output image according to control by the processing unit 160 (a display control unit 169).

(Processing Unit 160)

The processing unit 160 provides various functions of the terminal apparatus 100-1. The processing unit 160 includes a radio resource information acquisition unit 161, a data size determination unit 163, a notification unit 165, a communication control unit 167, and the display control unit 169.

(Radio Resource Information Acquisition Unit 161)

The radio resource information acquisition unit 161 acquires information related to the usable radio resource.

Radio Resource Usable for Radio Communication Between Base Station and Terminal Apparatus For example, the radio resource information acquisition unit 161 acquires information related to the radio resource usable for radio communication between the base station 10 and the terminal apparatus 100-1 among the radio resources controllable by the base station 10. The radio resources controllable by the base station 10 are, for example, radio resources that can be assigned by the base station 10. Specifically, for example, the base station 10 reports information related to the radio resource for the downlink as downlink assignment, and the radio resource information acquisition unit 161 acquires the information related to the radio resource for the downlink via the radio communication unit 120. Further, the base station 10 reports information related to the radio resource for the uplink as uplink grant, and the radio resource information acquisition unit 161 acquires the information related to the radio resource for the uplink via the radio communication unit 120.

Radio Resource Usable for D2D Communication (D2D Resource)

Acquisition of Information Related to D2D Resource

Especially, in an embodiment of the present disclosure, the radio resource information acquisition unit 161 acquires the radio resource information related to the radio resource usable for the D2D communication not via the base station 10 (hereinafter, referred to as a "D2D resource") among the radio resources controllable by the base station 10. As described above, the radio resources controllable by the base station 10 are, for example, radio resources that can be assigned by the base station 10. Especially in the first embodiment, when the terminal apparatus 100-1 is the master terminal in the LN, the radio resource information acquisition unit 161 acquires the radio resource information related to the D2D resource.

For example, the D2D resource is a part or all of the radio resources reported by the base station 10 as a usable radio resource. In this manner, when the usable radio resource is reported by the base station 10, it is possible to suppress the occurrence of the interference in the D2D communication and/or the interference caused by the D2D communication.

For example, the D2D communication is radio communication controlled by the terminal apparatus 100-1 in the LN. In this case, the D2D resource is assigned by the terminal apparatus 100-1 as the radio resource for the D2D communication.

For example, the terminal apparatus 100-1 (for example, the radio resource information acquisition unit 161), when being the master apparatus in the LN, is notified of the usable radio resource, by the base station 10, and assigns the radio resource for the D2D communication in the LN from among the usable radio resources. As a result, the assigned radio resource becomes the D2D resource (that is, the radio resource usable for the D2D communication). The radio resource information acquisition unit 161 then acquires information related to the assigned radio resource (that is, the D2D resource).

The radio resource reported by the base station 10 as a usable radio resource is, for example, the radio resource assigned to the LN. A specific example of the radio resource usable for the D2D communication will be described below with reference to FIG. 14.

Figure 14:
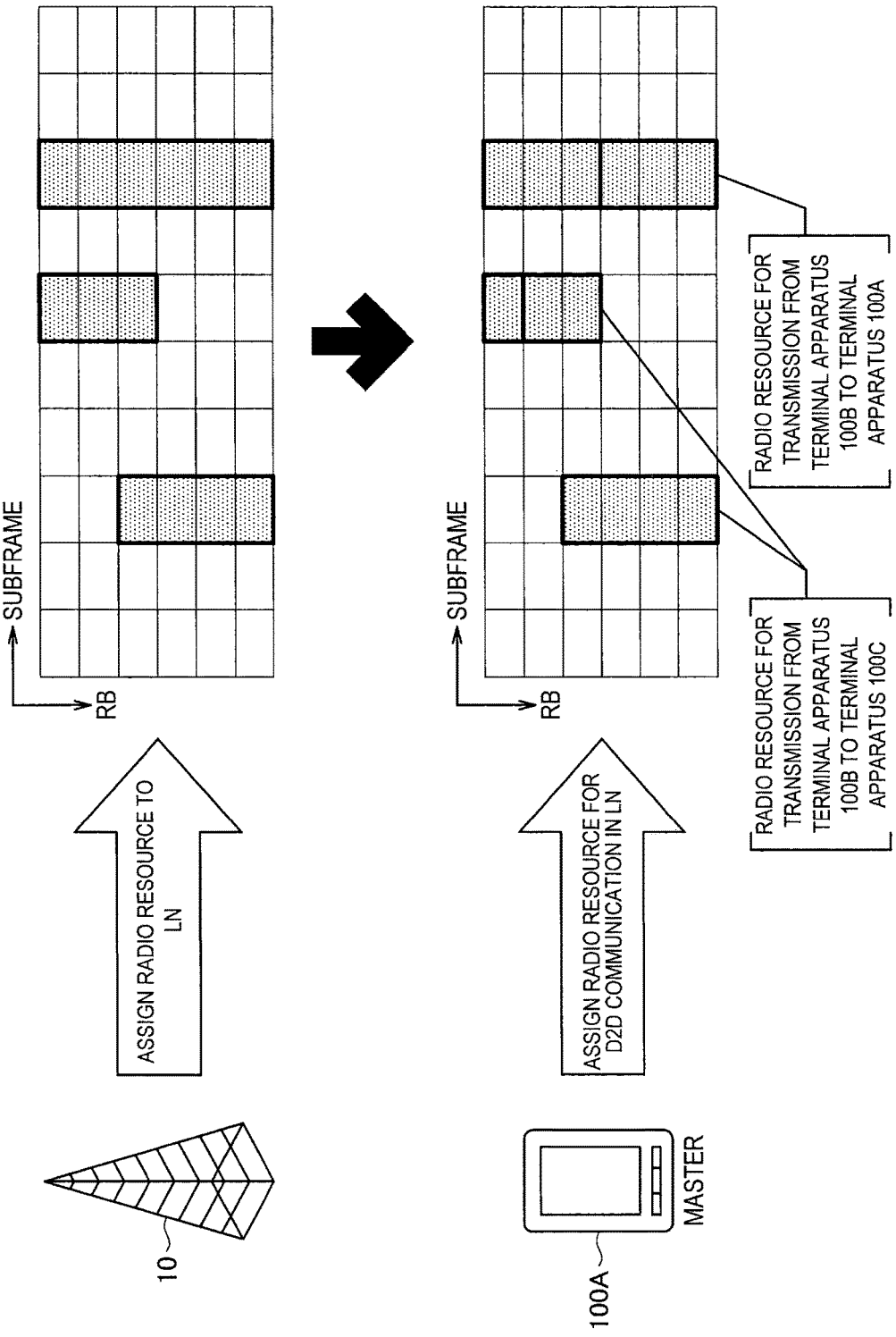
FIG. 14 is an explanatory diagram for explaining an example of a D2D resource.

FIG. 14 is an explanatory diagram for explaining an example of the D2D resource. With reference to FIG. 13, the base station 10 first assigns the radio resource as a part of the radio resources controllable by the base station 10 to the LN. The base station 10 then notifies the terminal apparatus 100A of the radio resource on any channel (for example, the PDCCH, PDSCH or PBCH). The terminal apparatus 100A (for example, the radio resource information acquisition unit 161) then assigns a part or all of the radio resources assigned to the LN as the radio resource for the D2D communication (that is, the D2D resource) in the LN. For example, the terminal apparatus 100A assigns a part of the radio resources assigned to the LN as the radio resource for transmission from the terminal apparatus 100B to the terminal apparatus 100C. Further, the terminal apparatus 100A assigns another part of the radio resources assigned to the LN as the radio resource for transmission from the terminal apparatus 100B to the terminal apparatus 100A.

Such resource assignment can prevent the base station 10 from performing resource assignment for the individual D2D communication, thereby suppressing an increase in load on the base station 10.

For example, as described above, when the terminal apparatus 100-1 is the master terminal in the LN, the radio resource information acquisition unit 161 assigns the radio resource for the D2D communication (that is, the D2D resource), and acquires the radio resource information related to the radio resource.

Note that the radio resource information related to the D2D resource includes, for example, information for identifying the radio resource usable for the D2D communication (for example, the resource block).

Resource Assignment by Base Station

For example, the base station 10, when a predetermined condition is satisfied, assigns the radio resource to the LN. As a first example, the predetermined condition is to have a request of the resource assignment from the terminal apparatus 100 (for example, the master apparatus) included in the LN. Further, as a second example, when service of performing the D2D communication in the LN at predetermined timing is provided, the predetermined condition is to reach the predetermined timing. Further, as a third example, it is to require resending as a result of the occurrence of an error in the D2D communication in the LN.

Resource Assignment by Terminal Apparatus (Master Apparatus)

Furthermore, for example, the terminal apparatus 100-1 (master apparatus), when a predetermined condition is satisfied, assigns a part or all of the radio resources (the radio resources assigned to the LN) reported to the terminal apparatus 100-1 by the base station 10, as the radio resource for the D2D communication in the LN (that is, the D2D resource). For example, the predetermined condition is to have a request of the resource assignment from another terminal apparatus 100-1 as the slave apparatus. For example, the request includes, for example, an ID, a total amount of data, and an application type (for example, a QoS) of data of the terminal apparatus 100-1 on the opposite side of the D2D communication. Further, as another example, when service of performing the D2D communication in the LN at predetermined timing is provided, the predetermined condition is to reach the predetermined timing. Further, as yet another example, it is to require resending as a result of the occurrence of an error in the D2D communication in the LN.

An amount of the radio resource to be assigned may be an amount according to a content of the request of the D2D communication, or may be a predetermined amount (for example, 1 RB). Further, when the target communication is resending of the previous communication, the amount of the resource to be assigned may be determined in consideration of the state of being the resending. When the target communication is resending of the previous communication, the amount of the resource to be assigned may be an amount capable of transmission of resending data, or may be an amount as much as possible when it is difficult to transmit all of the resending data.

Furthermore, along with the radio resource for transmission and reception of the data, the radio resource for transmission and reception of ACK/NACK may be also assigned. A time interval between the radio resource for transmission and reception of the data and the radio resource for transmission and reception of the ACK/NACK may be a predetermined time interval, or may be designated at any time. When the time interval is the predetermined time interval, the need for the notification of the radio resource for transmission and reception of the ACK/NACK is eliminated, leading to reduction in overhead. The terminal apparatus 100-1 as the master apparatus may not assign the radio resource for transmission and reception of the ACK/NACK for another radio communication.

Another Example of Radio Resource Reported by Base Station

Furthermore, the example that the radio resource assigned to the LN is reported by the base station 10 as a usable radio resource, but an embodiment according to the present disclosure is not limited to such an example. As a first example, the terminal apparatus 100-1 may be notified of the radio resource assigned to the terminal apparatus 100-1 (for example, the master apparatus) by the base station 10 as a usable radio resource. In this case, the radio resource assigned to the terminal apparatus 100-1 may be the radio resource assigned to the terminal apparatus 100-1 as the radio resource for radio communication between the base station 10 and the terminal apparatus 100-1. Alternatively, the radio resource assigned to the terminal apparatus 100-1 may be the radio resource assigned to the terminal apparatus 100-1 as the radio resource for the D2D communication. Further, as a second example, the terminal apparatus 100-1 may be notified of the radio resource not assigned by the base station 10 as a usable radio resource. In this case, the radio resource not assigned may be directly reported as the specific radio resource, or may be indirectly reported as the radio resource other than the assigned radio resource. When the radio resource not assigned is indirectly reported, the terminal apparatus 100-1 may confirm the radio resources assigned by the base station 10 (for example, all the radio resources for radio communication between the base station 10 and any terminal apparatus 100-1. The terminal apparatus 100-1 then considers the radio resource other than the confirmed radio resources as the radio resource not assigned (that is, the usable radio resource).

Note that the base station 10 includes a notification unit that notifies the terminal apparatus 100 of the usable radio resource.

(Data Size Determination Unit 163)

The data size determination unit 163 determines the size of the data to be transmitted and received in the D2D communication on the basis of the radio resource information related to the D2D resource. Especially in the first embodiment, when the terminal apparatus 100-1 is the master apparatus in the LN, the data size determination unit 163 determines the size.

Size to be Determined

As a first example, the size to be determined is one of a plurality of predetermined sizes. Specifically, for example, the size to be determined is one candidate of the TBS candidates as shown in FIG. 5.

As a second example, the size to be determined is a size to be calculated on the basis of the radio resource related to the D2D resource.

Determination Based on Modulation Scheme and Encoding Scheme

For example, the data size determination unit 163 determines the size on the basis of at least one of the modulation scheme and the encoding scheme. For example, the data size determination unit 163 determines the size on the basis of the radio resource information related to the D2D resource, and the modulation scheme and the encoding scheme.

Determination Based on Modulation Scheme and Encoding Scheme to be Used in D2D Communication As a first example, the modulation scheme and the encoding scheme are a modulation scheme and an encoding scheme to be used in the D2D communication by the apparatus that performs the D2D communication. In this manner, when the size of the data is determined on the basis of the modulation scheme and/or the encoding scheme to be actually used, it is possible to more accurately calculate the size of the data that can be transmitted. Therefore, it is possible to determine a larger value as the size of the data.

Note that, for example, the data size determination unit 163, when the terminal apparatus 100-1 is not an apparatus that performs the D2D communication, acquires channel information related to a channel to be used in the D2D communication, and identifies the modulation scheme and the encoding scheme to be used in the D2D communication from the information. The information related to the channel is, for example, channel state information (CSI). And the CSI includes the CQI. The data size determination unit 163 then identifies the modulation scheme and the encoding scheme corresponding to the CQI. This makes it possible to identify the modulation scheme and encoding scheme to be used even when the terminal apparatus 100-1 is not an apparatus that performs the D2D communication.

Determination Based on Predetermined Modulation Scheme and Predetermined Encoding Scheme As a second example, the modulation scheme and the encoding scheme, when the terminal apparatus 100-1 is not an apparatus that performs the D2D communication, are a predetermined modulation scheme and a predetermined encoding scheme. Such determination of the data size also based on the predetermined modulation scheme and the predetermined encoding scheme eliminates the need for the information related to the channel to be used in the D2D communication. Therefore, it is not necessary to feed back the information related to the channel from the slave apparatus to the master apparatus. As a result, the overhead can be suppressed. Further, as another point of view, such determination allows the size of the data to be determined even when the information related to the channel is not sufficiently obtained.

Further, for example, the predetermined modulation scheme is a modulation scheme having the lowest data rate among a plurality of usable modulation schemes. Further, the predetermined encoding scheme is an encoding scheme having the lowest data rate among a plurality of usable encoding schemes. This allows the data to be more securely transmitted and received. For example, when a state of the channel to be used in the D2D communication is bad, the data can be accurately transmitted and received.

Determination Based on Amount of Radio Resource

Determination Based on Amount of Resource for Data

As a first example, the data size determination unit 163 calculates an amount of a resource for data usable for transmission and reception of the data on the basis of the radio resource information related to the D2D resource. The data size determination unit 163 determines the size on the basis of the amount of the resource for data, and the at least one of the modulation scheme and the encoding scheme (the modulation scheme and/or the encoding scheme).

For example, the data size determination unit 163 calculates the number of the resource elements (REs) usable for transmission and reception of the data among the D2D resources, as the amount of the resource for data. For example, the data size determination unit 163 calculates the number of the REs excluding the RE for a control signal (for example, a synchronization signal, a reference signal, and a signal of the control channel) among the D2D resources. The data size determination unit 163 then determines the size on the basis of the calculated amount of the resource for data (that is, the number of the REs), and the modulation scheme and the encoding scheme.

This makes it possible to more accurately calculate the size of the data that can be transmitted, thereby making it possible to determine a larger value as the size of the data.

Furthermore, more specifically, for example, the data size determination unit 163 calculates a maximum value of the size of the data to be transmitted, on the basis of the calculated amount of the resource for data (that is, the number of the REs), and the modulation scheme and the encoding scheme. The data size determination unit 163 then determines one of a plurality of predetermined sizes as the size of the data to be transmitted and received in the D2D communication, on the basis of the calculated maximum value. For example, the plurality of predetermined sizes are the TBS candidates shown in FIG. 5. The data size determination unit 163 then determines the candidates equal to or less than the calculated maximum value among the TBS candidates as the size. As an example, when the table shown in FIG. 5 is provided, one column to be referred to in the table is determined from the amount of the usable radio resources (for example, the number of the RBs). Then, since a range of the TBS indexes is determined from the modulation scheme and the encoding scheme, one or more rows to be referred to in the table are determined. Then, the TBS candidates equal to or less than the maximum value among some TBS candidates corresponding to the one column and the one or more rows are first selected. Further, the maximum TBS candidate among the selected TBS candidates is finally selected. In this manner, the maximum TBS candidate among the TBS candidates equal to or less than the calculated maximum value is selected. The TBS candidate finally selected is determined as the size of the data to be transmitted and received in the D2D communication.

Note that, instead of determining any candidate of the TBS candidates as the size, the maximum value itself of the size of the data, which is calculated based on the calculated amount of the resource for data (that is, the number of the REs), and the modulation scheme and the encoding scheme, may be determined as the size of the data to be transmitted and received in the D2D communication, thereby making it possible to determine a larger value as the size of the data.

Determination Based on Amount of D2D Resource

As a second example, the data size determination unit 163, based on the radio resource information related to the D2D resource, and the at least one of the modulation scheme and the encoding scheme (the modulation scheme and/or the encoding scheme), determines a minimum size among one or more predetermined sizes corresponding to the amount of the D2D resource and the at least one of the modulation scheme and the encoding scheme, as the size.

For example, the data size determination unit 163 determines the minimum TBS candidate among the TBS candidates corresponding to the amount of the D2D resource, and the modulation scheme and the encoding scheme, as the size of the data to be transmitted and received in the D2D communication. As described above, for example, when the table shown in FIG. 5 is provided, one column to be referred to in the table is determined from the amount of the D2D resource (for example, the number of the RBs). Then, since the range of the TBS indexes is determined from the modulation scheme and the encoding scheme, one or more rows to be referred to in the table are determined. Therefore, the minimum TBS candidate is selected among some TBS candidates corresponding to the one column and the one or more rows. The selected TBS candidate is then determined as the size of the data to be transmitted and received in the D2D communication.

This may prevent the terminal apparatus 100-1 from calculating the amount of the resource for data usable for the transmission of the data, thereby making it possible to suppress a load on the terminal apparatus 100-1.

As described above, the size of the data to be transmitted and received in the D2D communication is determined. This makes it possible to suppress an increase in load on the base station 10 when the D2D communication is performed.

More specifically, when the base station 10 determines the size of the data to be transmitted and received in the D2D communication, the base station 10 will collect the various information related to the D2D communication. As a result, the overhead for the information collection by the base station may be increased. Further, the heavy load for management and control for the D2D communication may be applied to the base station. However, as described above, when the terminal apparatus 100, instead of the base station 10, determines the size of the data, the information collection, management and control by the base station 10 are reduced, thereby making it possible to suppress an increase in load on the base station 10.

(Notification Unit 165)

The notification unit 165 notifies another apparatus bearing the D2D communication of size-related information related to the size to be determined. Especially in the first embodiment, when the terminal apparatus is the master apparatus in the LN, the notification unit 165 notifies another apparatus (the slave apparatus) of the size-related information.

Size-Related Information

Information Corresponding to Predetermined Size

As a first example, the size to be determined is one of a plurality of predetermined sizes, and the size-related information is information corresponding to the one of the plurality of predetermined sizes.

Specifically, for example, the size to be determined is one candidate among the TBS candidates show in FIG. 5. Further, the size-related information is the TBS index or the MCS index.

This makes it possible to suppress the amount of the radio resource required for the notification compared with when being notified of information indicating the size. That is, the overhead can be suppressed.

Information Indicating Size

As a second example, the size-related information is information indicating the size to be determined.

Specifically, as described above, for example, the size to be determined is a size to be calculated based on the radio resource information related to the D2D resource. Then, the calculated size is determined as the size of the data to be transmitted and received in the D2D communication. In this case, the size-related information is the size calculated and determined.

This makes it possible to be notified of a size larger than that in the case where the information corresponding to a predetermined size (for example, the index) is transmitted, therefore improving throughput in the D2D communication.

Channel to Used

Control Channel

As a first example, another apparatus is notified of the size-related information through transmission on the control channel for transmitting the control signal.

Specifically, for example, also in the D2D communication, the channel similar to that in the radio communication between the base station 10 and the terminal apparatus 100-1 is used. For example, also in the D2D communication, the control channel corresponding to the PDCCH, and the data channel corresponding to the PDSCH are used. In this case, another apparatus is notified of the size-related information through transmission on the control channel corresponding to the PDCCH. A specific example of this point will be described below with reference to FIG. 15.

Figure 15:
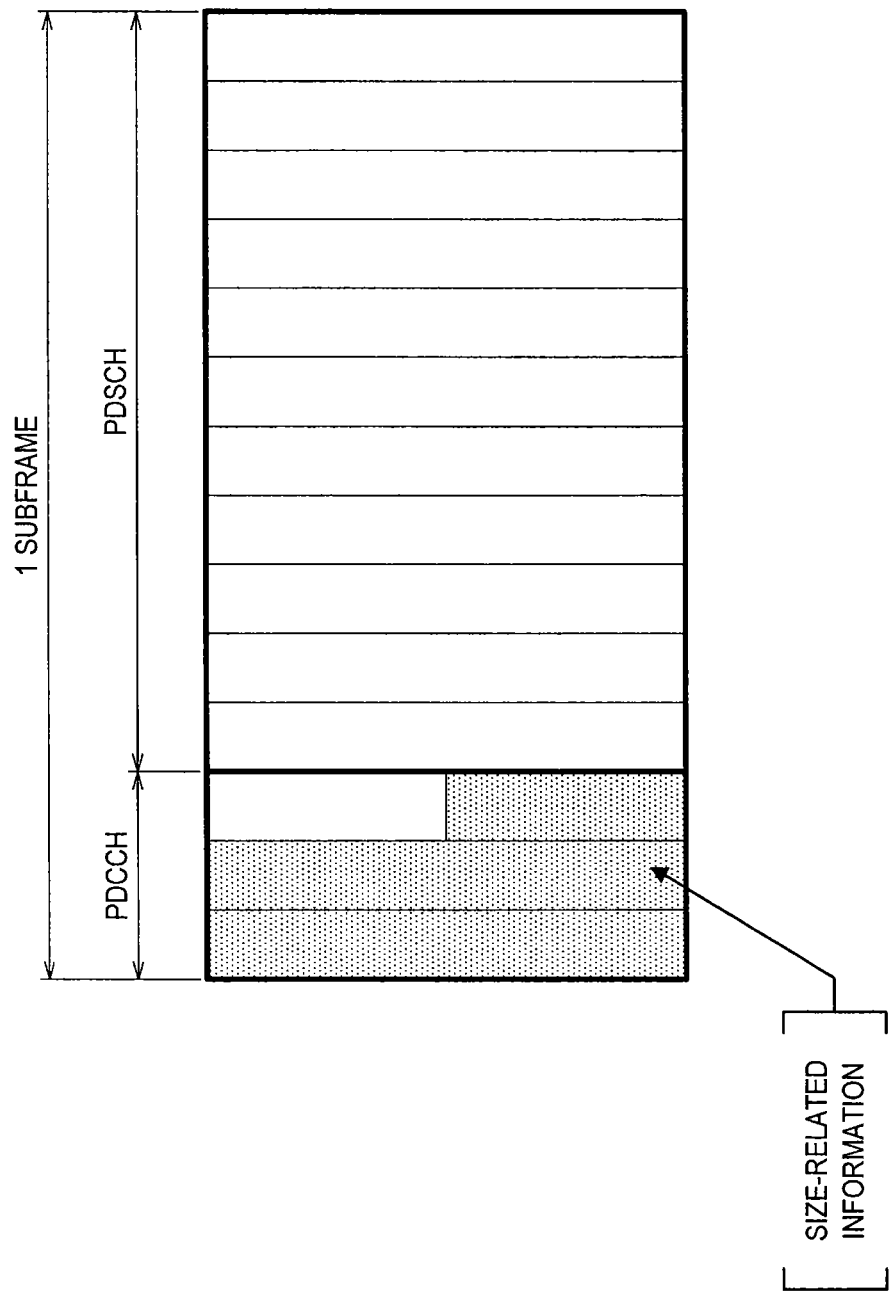
FIG. 15 is an explanatory diagram for explaining an example of a control channel on which size-related information is transmitted.

FIG. 15 is an explanatory diagram for explaining an example of the control channel on which the size-related information is transmitted. With reference to FIG. 15, the radio resource including the control channel corresponding to the PDCCH and the data channel corresponding to the PDSCH is shown. As shown in FIG. 15, the size-related information is transmitted on the control channel corresponding to the PDCCH.

The use of the control channel in this manner makes it possible to notify of or be notified of the determined size also in the D2D communication as in the case with the radio communication between the base station 10 and the terminal apparatus 100-1.

Data Channel

As a second example, another apparatus is notified of the size-related information through transmission on the data channel for transmitting the data.

Specifically, for example, also in the D2D communication, the channel similar to that in the radio communication between the base station 10 and the terminal apparatus 100-1 is used. For example, also in the D2D communication, the data channel corresponding to the PDCCH (control channel corresponding to the PDCCH), and the data channel corresponding to the PDSCH are used. In this case, another apparatus is notified of the size-related information through transmission on the control channel corresponding to the PDCCH. A specific example of this point will be described below with reference to FIG. 16.

Figure 16:
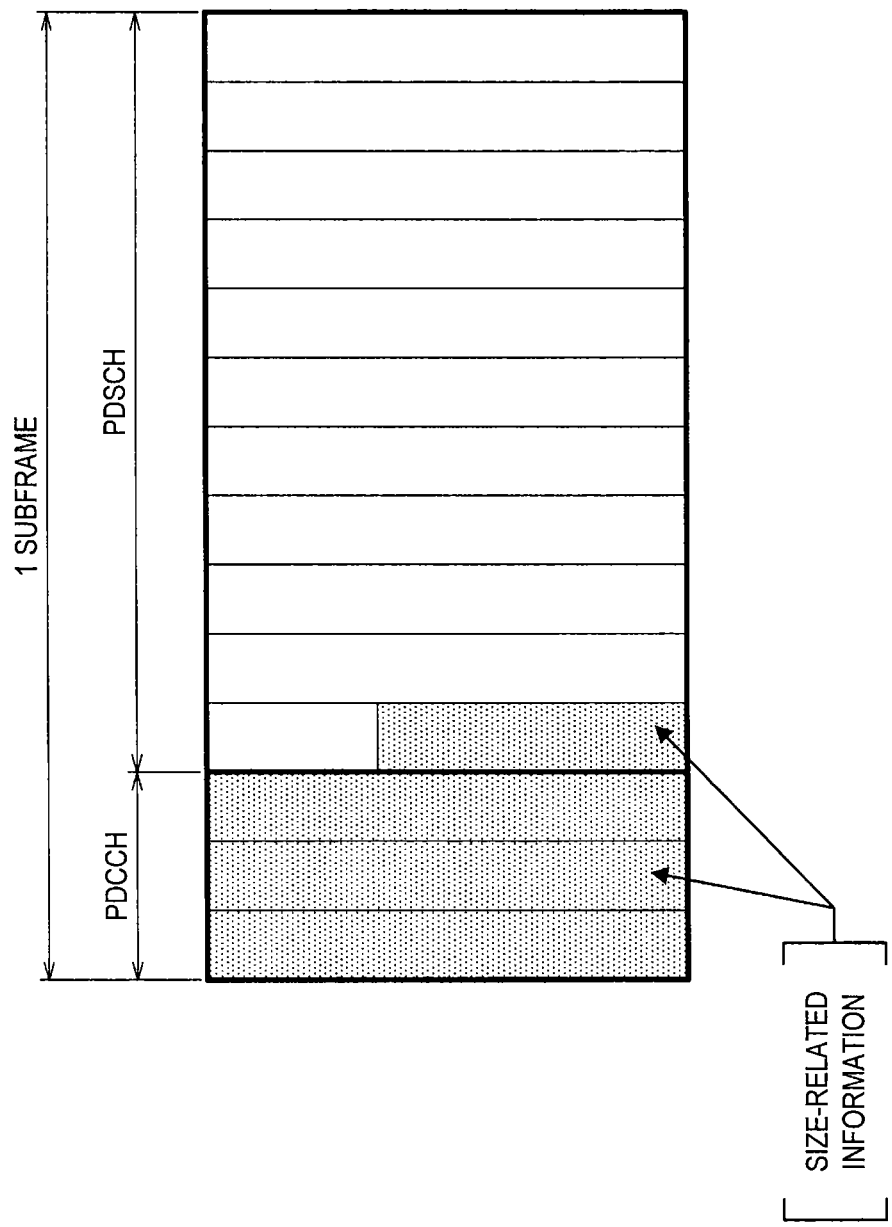
FIG. 16 is an explanatory diagram for explaining an example of a data channel on which the size-related information is transmitted.

FIG. 16 is an explanatory diagram for explaining an example of the data channel on which the size-related information is transmitted. With reference to FIG. 15, the radio resource including the control channel corresponding to the PDCCH and the data channel corresponding to the PDSCH is shown. As shown in FIG. 15, the size-related information is transmitted not only on the control channel corresponding to the PDCCH, but also on the data channel corresponding to the PDSCH. Note that, from a viewpoint of the decoding order, it is preferable to use a faster radio resource in the time direction in the data channel.

The use of the data channel in this manner makes it possible to notify of the determined size even when the information cannot be successfully transmitted on the control channel.

As described above, the apparatus that performs the D2D communication is notified of the size-related information, thereby allowing the determined size to be used in the D2D communication.

Notification of D2D Resource

Note that, in the apparatuses that perform the D2D communication, another apparatus is notified of not only the size-related information but the D2D resource. For example, the apparatus on the transmitting side in the D2D communication is notified as the D2D resource as the resource for transmission, and the apparatus on the receiving side in the D2D communication is notified of the D2D resource as the resource for reception.

For example, the notification unit 165 notifies another apparatus of the D2D resource together with the size-related information. The notification unit 165 then notifies the apparatus on the transmitting side of the radio resource as the resource for transmission, and notifies the apparatus on the receiving side of the radio resource as the resource for reception. Another apparatus is notified of the radio resource through transmission on the control channel and/or the data channel.

Such notification allows accurate transmission and reception in the D2D communication.

(Communication Control Unit 167)

The communication control unit 167 controls radio communication by the terminal apparatus 100-1. For example, when the terminal apparatus 100-1 performs radio communication with the base station 10, the communication control unit 167 controls radio communication with the base station 10 by the terminal apparatus 100-1.

Especially in an embodiment according to the present disclosure, the communication control unit 167 controls the D2D communication by the terminal apparatus 100-1. Specifically, when the terminal apparatus 100-1 performs the D2D communication, the communication control unit 167 uses the radio resource (D2D resource) usable for the D2D communication, to transmit or receive the data having the determined data size.

Note that, in the first embodiment, when the terminal apparatus 100-1 is the slave apparatus in the LN, the terminal apparatus is notified of the size-related information by the master apparatus. For example, the size-related information is information corresponding to one of a plurality of predetermined sizes. Specifically, the size-related information is the TBS index or the MCS index. In this case, for example, the communication control unit 167 uses the table of the TBS candidates as shown in FIG. 5, or the like to identify the TBS corresponding to the TBS index and the amount of the D2D resource (the number of the RBs), as the size of the data to be transmitted and received in the D2D communication. Further, as another example, the size-related information is information indicting the size. In this case, the communication control unit 167 identifies the size indicated by the size-related information as the size of the data to be transmitted and received in the D2D communication.

(Display Control Unit 169)

The display control unit 169 controls display of the output screen by the display unit 150. For example, the display control unit 169 generates the output screen to be displayed by the display unit 150 to allow the display unit 150 to display the output screen.

<3.3. Flow of Processing>

Next, with reference to FIG. 17 to FIG. 23, an example of the communication control processing according to the first embodiment will be described.

(Overall Flow of Communication Control Processing)

First, with reference to FIG. 17 and FIG. 18, a schematic flow of the communication control processing according to the first embodiment will be described.

Case of D2D Communication Between Slave Apparatuses

Figure 17:
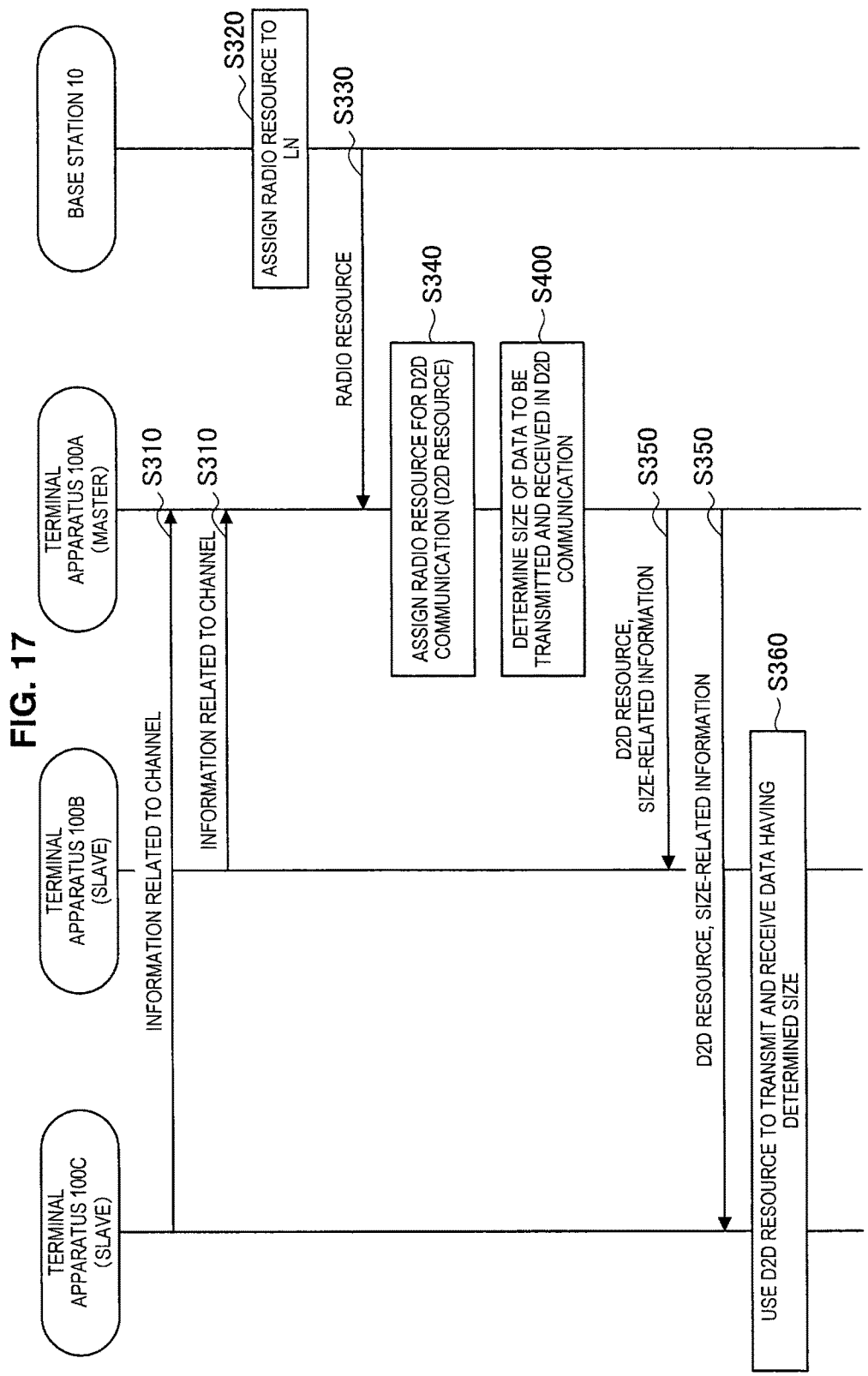
FIG. 17 is a sequence diagram illustrating a first example of a schematic flow of communication control processing according to the first embodiment.

FIG. 17 is a sequence diagram illustrating a first example of the schematic flow of the communication control processing according to the first embodiment. In this example, the terminal apparatus 100B and the terminal apparatus 100C as the slave apparatus in the LN perform the D2D communication.

The terminal apparatus 100 estimates a state of the channel that can be used for the D2D communication. For example, the terminal apparatus 100 estimates a state of the channel by receiving the reference signal transmitted by another terminal apparatus 100. The terminal apparatus 100B and/or the terminal apparatus 100C as the slave apparatus in the LN then feeds back the information related to the channel to the terminal apparatus 100A as the master apparatus in the LN (S310). The information related to the channel is the channel state information (CSI), and includes the CQI, RI, PMI, RSRP, RSRQ and the like. Note that the information related to the channel may be fed back also to the base station 10 via the master apparatus or directly from the slave apparatus.

Further, the base station 10, when a predetermined condition is satisfied, assigns the radio resource as a part of the radio resources controllable by the base station 10 to the LN (S320). Note that, when the information related to the channel is fed back also to the base station 10, the base station 10 may assign the radio resource in consideration of the information.

The base station 10 then notifies the terminal apparatus 100A as the master apparatus of the radio resource assigned to the LN on any channel (for example, the PDCCH, PDSCH or PBCH) (S330).

After that, the terminal apparatus 100A as the master apparatus (the radio resource information acquisition unit 161) assigns the radio resource for the D2D communication in the LN from among the radio resources assigned to the LN (S340). The assigned radio resource becomes the radio resource usable for the D2D communication (D2D resource).

The terminal apparatus 100A (data size determination unit 163) then determines the size of the data to be transmitted and received in the D2D communication (S400). A flow of the processing will be described in detail later.

After that, the terminal apparatus 100A (communication unit 165) notifies another apparatus that performs the D2D communication (slave apparatus) of the D2D resource and the size-related information related to the determined size (S350).

The terminal apparatus 100B and the terminal apparatus 100C then use the D2D resource to transmit and receive the data having the determined size (S360).

Case of D2D Communication Between Master Apparatus and Slave Apparatus

Figure 18:
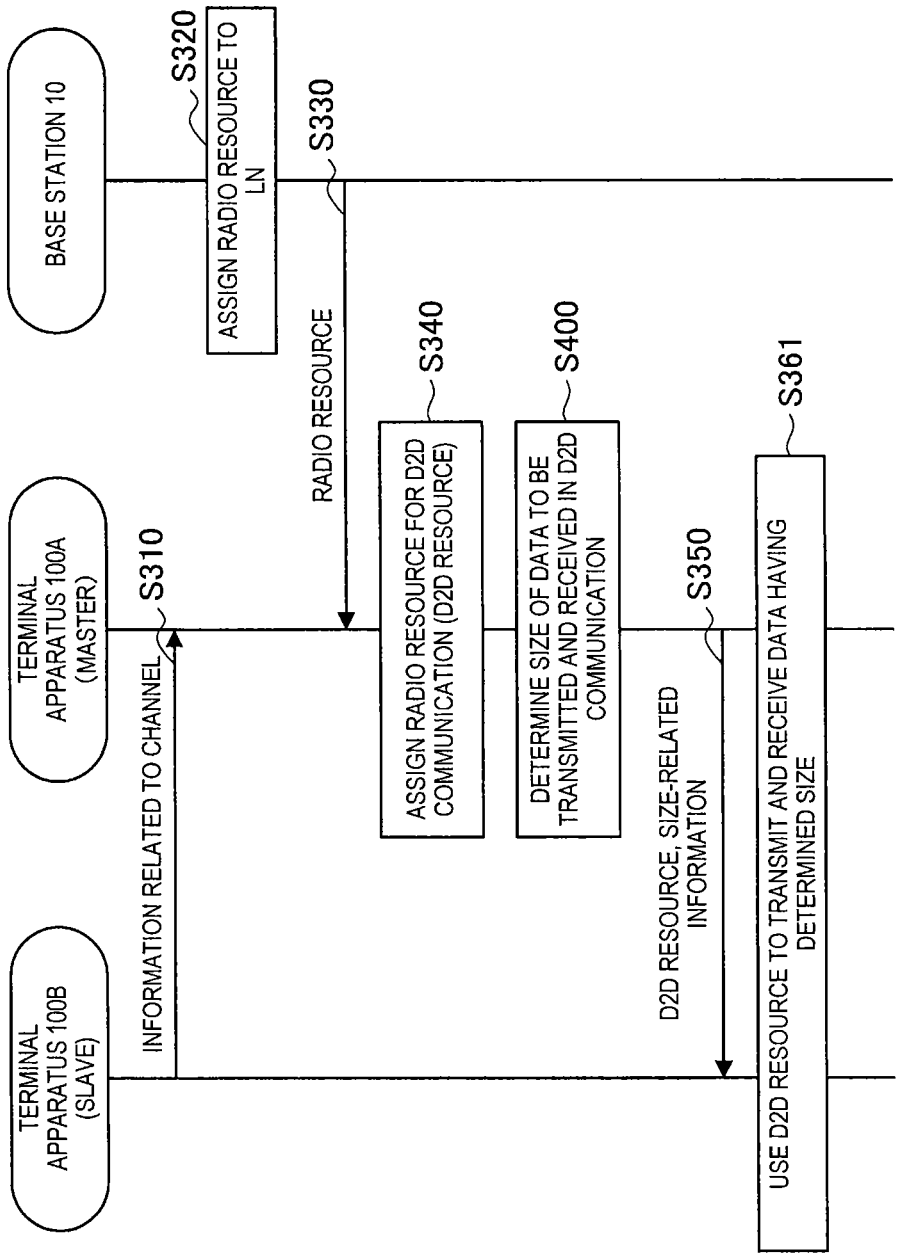
FIG. 18 is a sequence diagram illustrating a second example of a schematic flow of communication control processing according to the first embodiment.

FIG. 18 is a sequence diagram illustrating a second example of the schematic flow of the communication control processing according to the first embodiment. In this case, the terminal apparatus 100A as the master apparatus and the terminal apparatus 100B as the slave apparatus perform the D2D communication.

Also in the example shown in FIG. 18, similarly to the example shown in FIG. 17, Steps S310 to S350 are included. Then, finally, the terminal apparatus 100A as the master apparatus and the terminal apparatus 100B as the slave apparatus use the D2D to transmit and receive the data having the determined size (S361).

(Flow of Processing Related to Determination of Size of Data)

Next, with reference to FIG. 19 to FIG. 23, an example of the processing of determining the size of the data to be transmitted and received in the D2D communication will be described.

First Example

Figure 19:
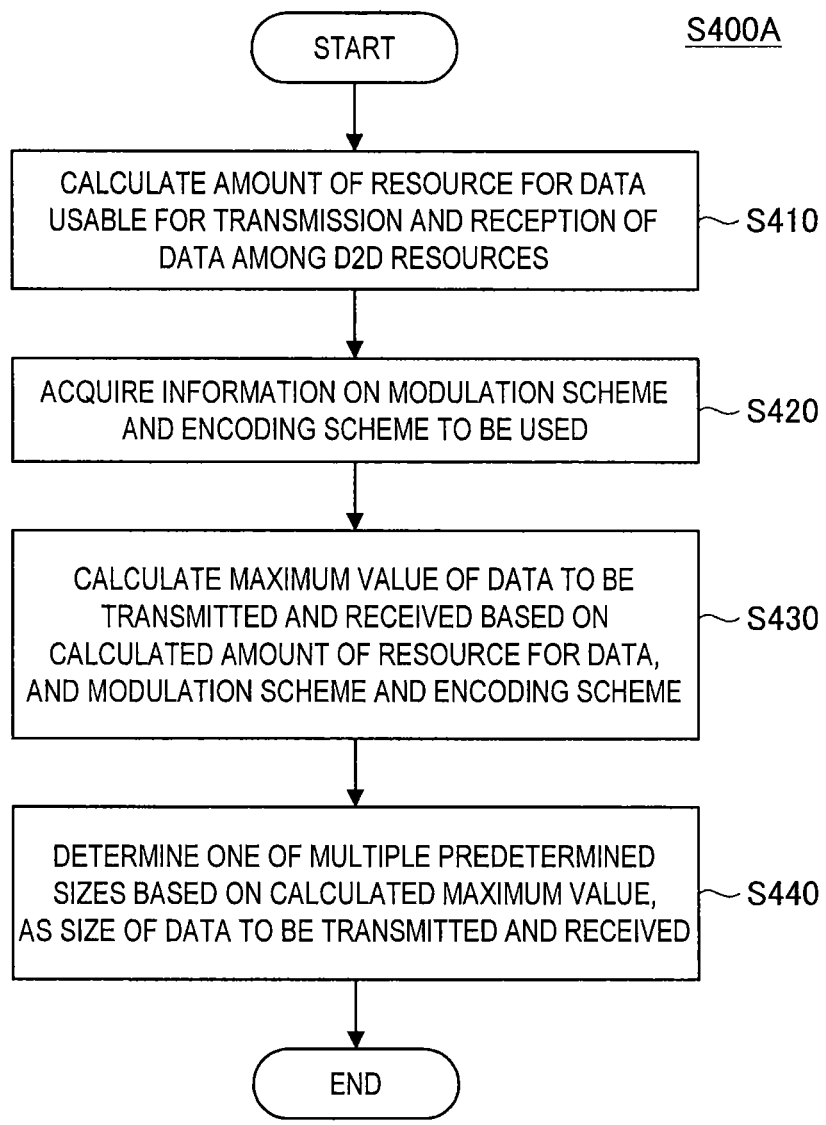
FIG. 19 is a flow chart illustrating a first example of a schematic flow of processing of determining a size of data to be transmitted and received in the D2D communication.

FIG. 19 is a flow chart illustrating a first example of the schematic flow of the processing of determining the size of the data to be transmitted and received in the D2D communication.

At Step S410, the data size determination unit 163 calculates the amount of the resource for data (for example, the number of the REs) usable for transmission and reception of the data among the D2D resources on the basis of the radio resource information related to the D2D resource (radio resource usable for the D2D communication).

At Step S420, the data size determination unit 163 acquires the information on the modulation scheme and the encoding scheme to be used in the D2D communication.

At Step S430, the data size determination unit 163 calculates the maximum value of the size of the data to be transmitted in the D2D communication on the basis of the calculated amount of the resource for data, and the modulation scheme and the encoding scheme (S430).

At Step S440, the data size determination unit 163 determines one of the plurality of predetermined sizes (for example, TBS candidates) as the size of the data to be transmitted and received in the D2D communication on the basis of the calculated maximum value. The processing then ends.

In this manner, according to the first example, it is possible to determine a larger value as the size of the data.

Second Example

Figure 20:
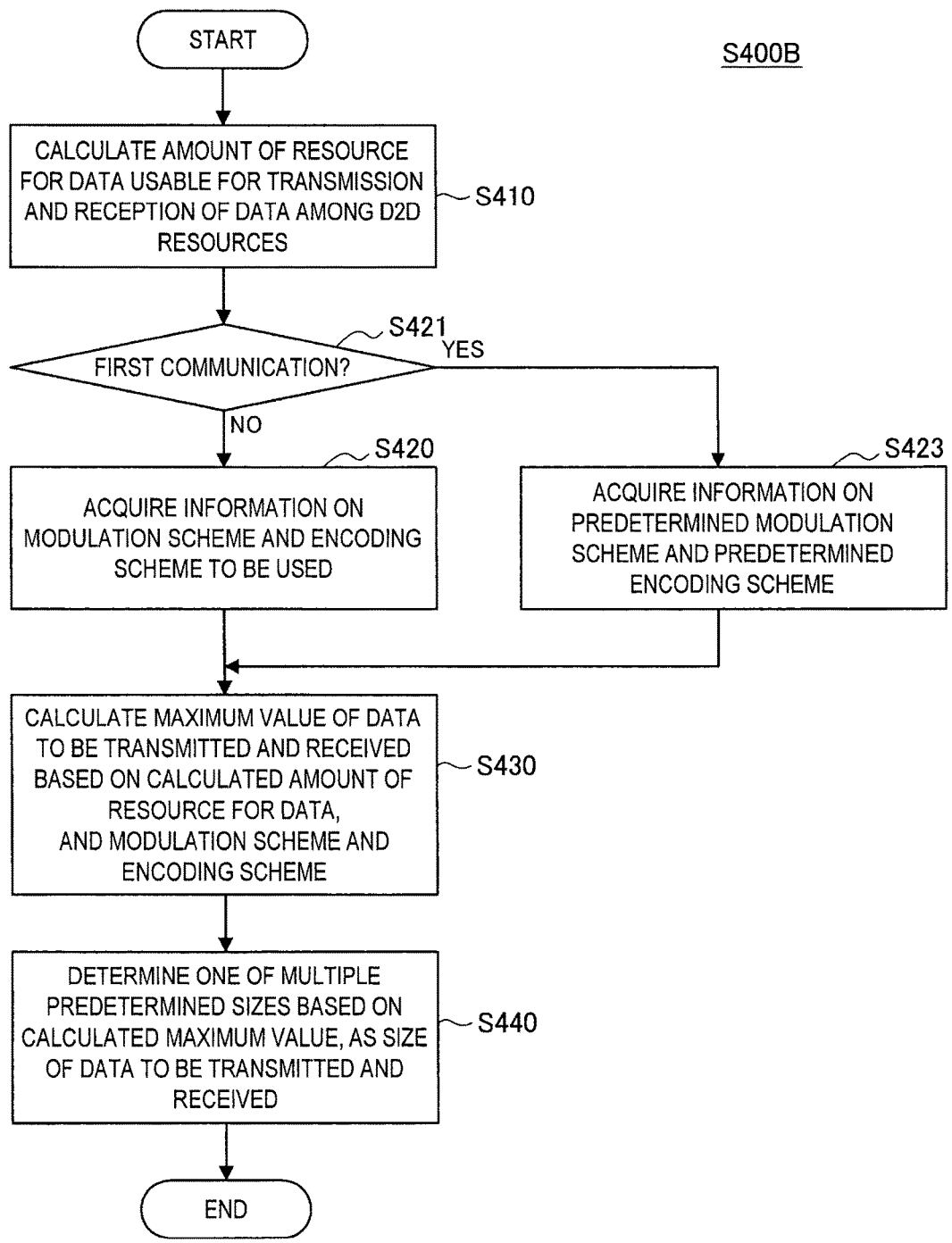
FIG. 20 is a flow chart illustrating a second example of a schematic flow of processing of determining a size of data to be transmitted and received in the D2D communication.

FIG. 20 is a flow chart illustrating a second example of the schematic flow of the processing of determining the size of the data to be transmitted and received in the D2D communication.

The difference between the first example shown in FIG. 19 and the second example shown in FIG. 20 is that Steps S421 and S423 are not included in the first example, but Steps S421 and S423 are included in the second example. Therefore, only Steps S421 and S423 are described here.

At Step S421, the data size determination unit 163 determines whether the D2D communication using the radio resource as a target of the size determination is the first communication. If the D2D communication is the first communication, the processing proceeds to Step S423. Otherwise the processing proceeds to Step S420.

At Step S423, the data size determination unit 163 acquires the information on the predetermined modulation scheme and the predetermined encoding scheme. The predetermined modulation scheme is a modulation scheme having the lowest data rate among a plurality of usable modulation schemes. Further, the predetermined encoding scheme is an encoding scheme having the lowest data rate among a plurality of usable encoding schemes.

In this manner, according to the second example, even when the information related to the channel is short in determining the size of the data for the first communication, it is possible to more accurately transmit and receive the data in the first communication.

Third Example

Figure 21:
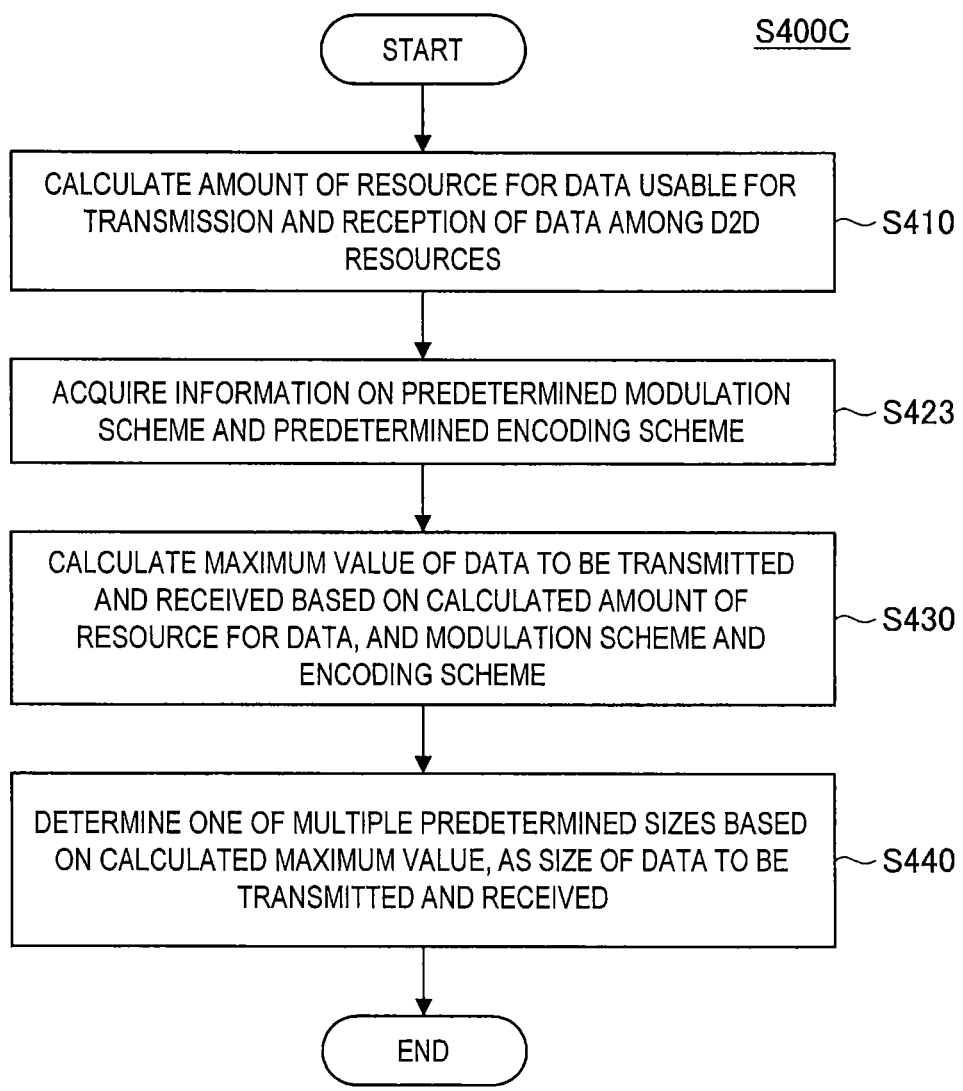
FIG. 21 is a flow chart illustrating a third example of a schematic flow of processing of determining a size of data to be transmitted and received in the D2D communication.

FIG. 21 is a flow chart illustrating a third example of the schematic flow of the processing of determining the size of the data to be transmitted and received in the D2D communication.

The difference between the first example shown in FIG. 19 and the third example shown in FIG. 21 is that Step S420 is included in the first example, but Step S423, instead of Step S420, is included in the third example. Therefore, only Step S423 is described here.

At Step S423, the data size determination unit 163 acquires the information on the predetermined modulation scheme and the predetermined encoding scheme. The predetermined modulation scheme is a modulation scheme having the lowest data rate among a plurality of usable modulation schemes. Further, the predetermined encoding scheme is an encoding scheme having the lowest data rate among a plurality of usable encoding schemes.

In this manner, according to the third example, since the size is determined based on the predetermined modulation scheme and the predetermined encoding scheme, it is not necessary to feed back the information related to the channel from the slave apparatus to the master apparatus unlike Step S310 in FIG. 17, thus allowing the overhead to be suppressed.

Fourth Example

Figure 22:
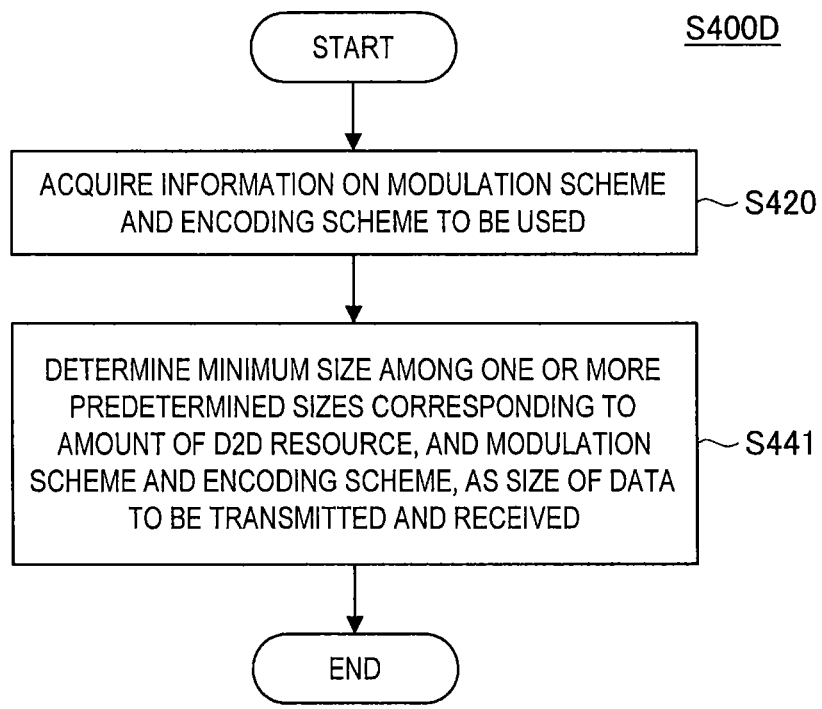
FIG. 22 is a flow chart illustrating a fourth example of a schematic flow of processing of determining a size of data to be transmitted and received in the D2D communication.

FIG. 22 is a flow chart illustrating a fourth example of the schematic flow of the processing of determining the size of the data to be transmitted and received in the D2D communication.

The difference between the first example shown in FIG. 19 and the fourth example shown in FIG. 22 is that Steps S420, S430 and S440 are included in the first example, but Step S441, instead of these Steps, is included in the fourth example. Therefore, only Step S441 is described here.

At Step S441, the data size determination unit 163 determines the minimum size among the one or more predetermined sizes corresponding to the amount of the D2D resource (for example, the number of the PBs), and the modulation scheme and the encoding scheme, as the size of the data to be transmitted and received in the D2D communication. The processing then ends.

In this manner, according to the fourth example, the terminal apparatus 100 may not calculate the amount of the resource for data usable for transmission of the data, thus making it possible to suppress the load on the terminal apparatus 100.

Fifth Example

Figure 23:
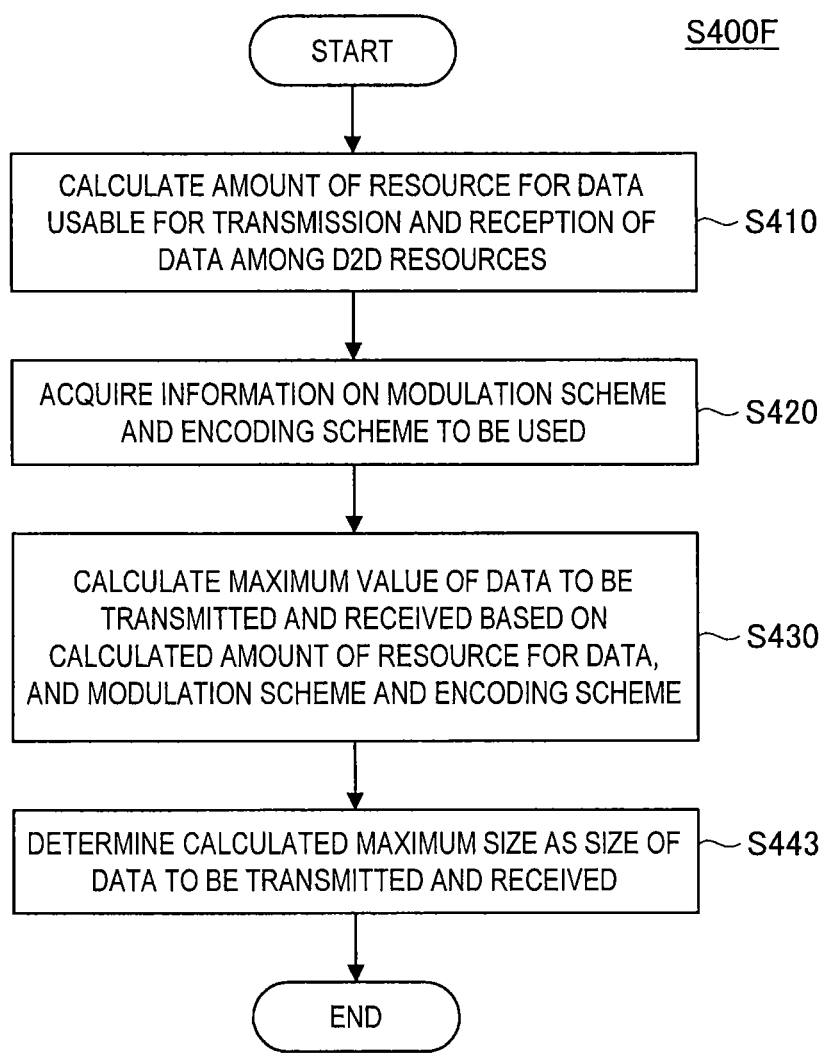
FIG. 23 is a flow chart illustrating a fifth example of a schematic flow of processing of determining a size of data to be transmitted and received in the D2D communication.

FIG. 23 is a flow chart illustrating a fifth example of the schematic flow of the processing of determining the size of the data to be transmitted and received in the D2D communication.

The difference between the first example shown in FIG. 19 and the fifth example shown in FIG. 23 is that Step S440 is included in the first example, but Step S443, instead of Step S440, is included in the fifth example. Therefore, only Step S443 is described here.

At Step S443, the data size determination unit 163 determines the calculated maximum value as the size of the data to be transmitted and received in the D2D communication. The processing then ends.

In this manner, according to the fifth example, it is possible to determine a larger value as the size of the data.

The first example of the processing of determining the size of the data to be transmitted and received in the D2D communication has been described above, and the second example to the fifth example have been described as modifications from the first example. Note that the two or more modifications of the four modifications may be combined. As an example, in the fourth example shown in FIG. 22, Step S420 may be replaced with Step S423 in the third example shown in FIG. 21.

<3.4. First Modification>

Next, with reference to FIG. 24 and FIG. 25, a first modification of the first embodiment will be described.

In the first embodiment, the master apparatus in the LN determines the size of the data to be transmitted and received in the D2D communication. Then, in the case of the D2D communication between the slave apparatuses in the LN, the master apparatus is not directly involved in the D2D communication, but determines the size of the data to be transmitted and received in the D2D communication. Therefore, in the first embodiment described above, the master apparatus will determine the size of the data to be transmitted and received in the D2D communication without acquiring whether or not the resending for the D2D communication between the slave apparatuses is preset (that is, the ACK/NACK for the D2D communication between the slave apparatuses). That is, the master apparatus cannot determine the size of the data in consideration of the resending in the D2D communication between the slave apparatuses. On the other hand, when a hybrid automatic repeat request (HARQ) is used, it is requested that the size of the data should be the same as that of the last transmission in the case of the resending.

Then, according to the first modification of the first embodiment, the slave apparatus fixes the size of the data in consideration of the resending in the D2D communication between the slave apparatuses.

(Communication Control Unit 167)

Especially in the first modification of the first embodiment, when the terminal apparatus 100-1 is the slave apparatus in the LN, the communication control unit 167 controls transmission of the data in consideration of whether the target transmission is the resending.

(Flow of Processing)

Figure 24:
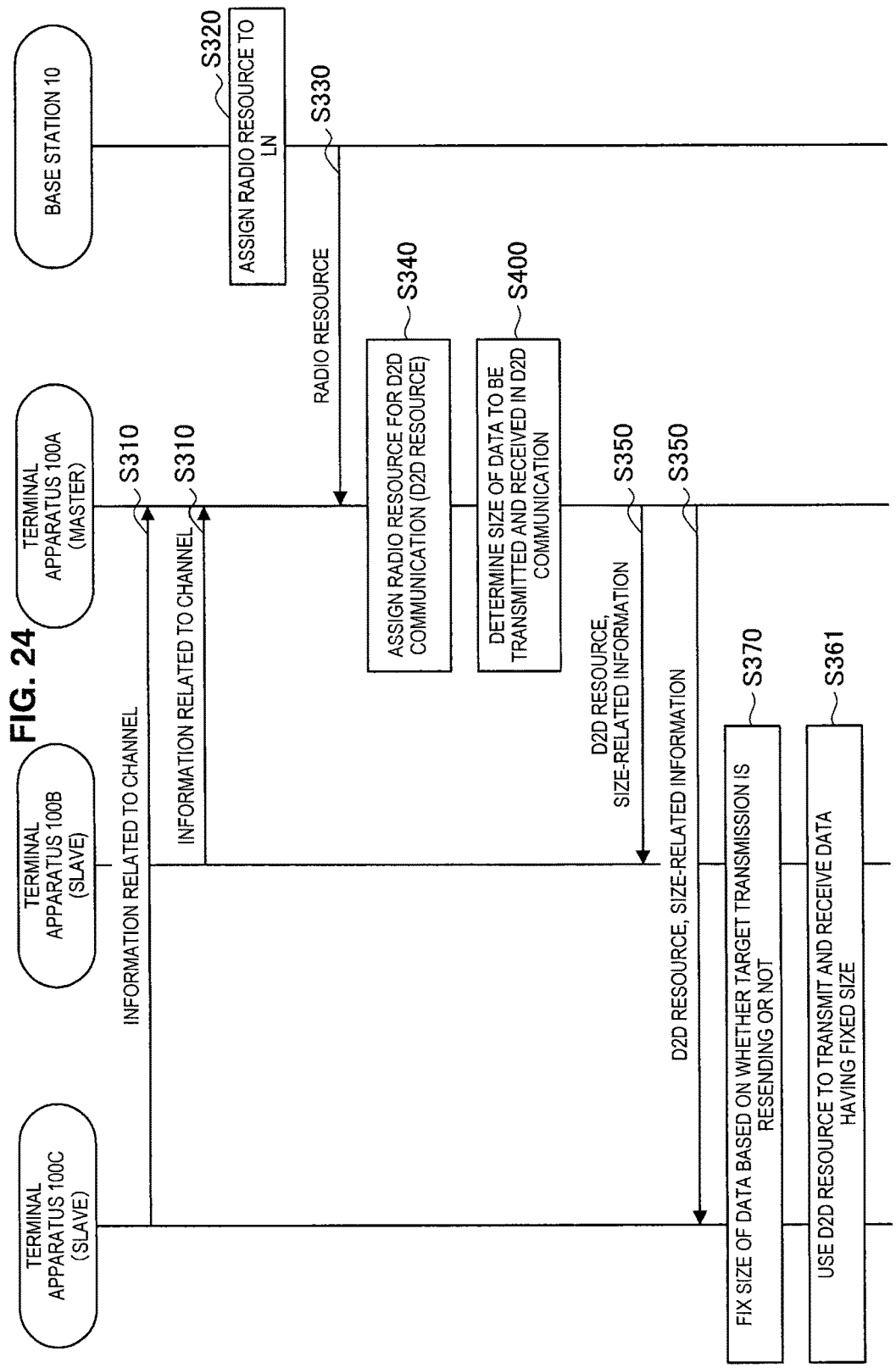
FIG. 24 is a sequence diagram illustrating an example of a schematic flow of communication control processing according to a first modification of the first embodiment.

Communication Control Processing According to First Modification of First Embodiment FIG. 24 is a sequence diagram illustrating an example of a schematic flow of the communication control processing according to the first modification of the first embodiment. In this example, the terminal apparatus 100B and the terminal apparatus 100C as the slave apparatus in the LN perform the D2D communication.

The difference between the first example according to the first embodiment shown in FIG. 17 and an example according to the first modification of the first embodiment shown in FIG. 24 is that Step S360 is included in the first example according to the first embodiment, but Steps S370 and S363, instead of Step S360, are included in the example according to the first modification of the first embodiment. Therefore, only Steps S370 and S363 are described here.

The terminal apparatus 100B and the terminal apparatus 100C as the slave apparatus fix the size of the data on the basis of whether or not the target transmission is the resending (S370). A flow of the processing will be described in detail later.

The terminal apparatus 100B and the terminal apparatus 100C then use the D2D resource to transmit and receive the data having the fixed size (S363).

Flow of the Processing Related to Fixing of Data Size

Figure 25:
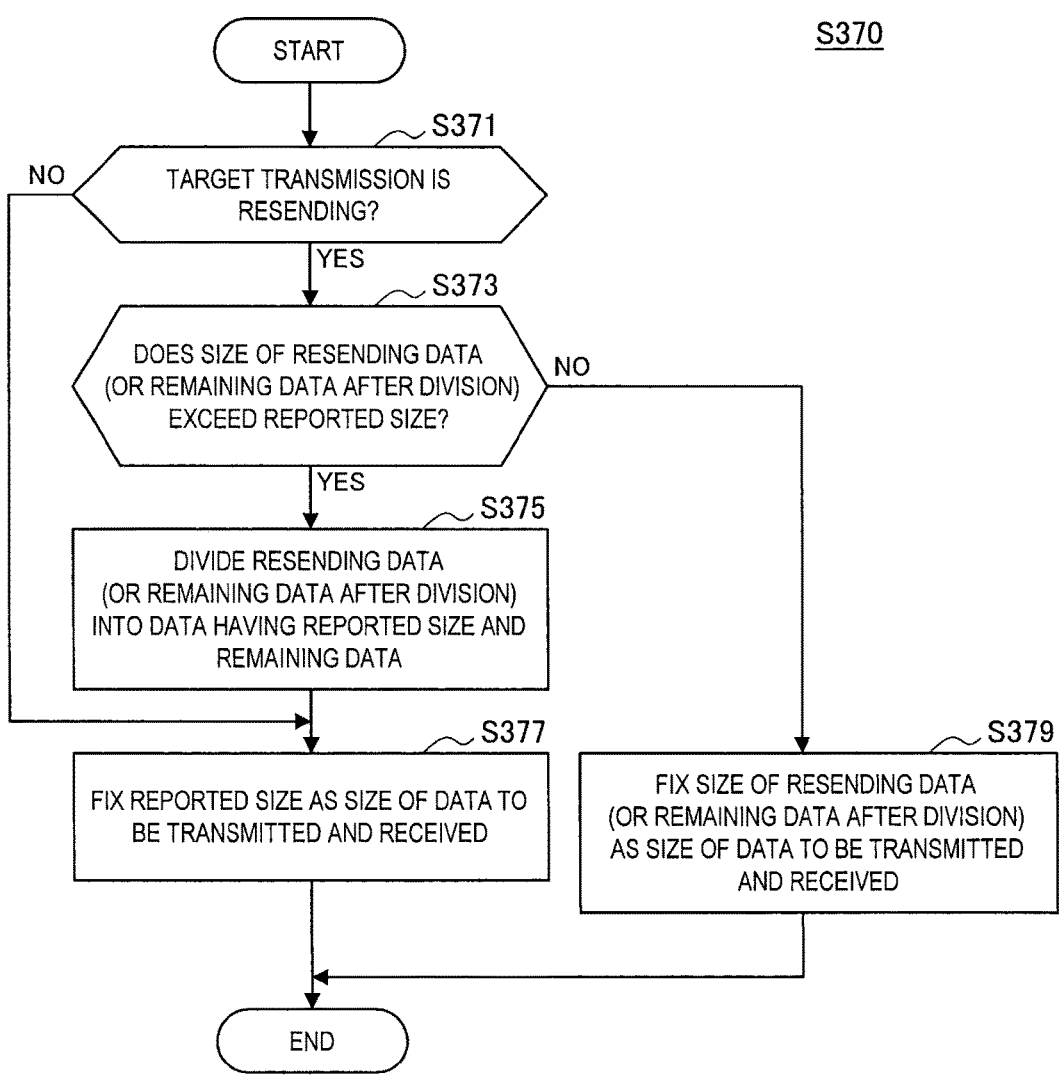
FIG. 25 is a flow chart illustrating an example of a schematic flow of processing of fixing the size of the data to be transmitted and received in the D2D communication.

FIG. 25 is a flow chart illustrating an example of a schematic flow of the processing of fixing the size of the data to be transmitted and received in the D2D communication. The processing is processing in the slave apparatus.

At Step S371, the communication control unit 167 of the terminal apparatus 100 as the slave apparatus determines whether the target transmission (that is, the D2D communication between the slave apparatuses) is the resending. If the target transmission is the resending, the processing proceeds to Step S373. Otherwise the processing proceeds to Step S377.

At Step S373, the communication control unit 167 determines whether the size of the resending data (or the remaining data after division) exceeds the size reported by the master apparatus (that is, the size corresponding to the size-related information). When the size of the resending data exceeds the reported size, the processing proceeds to Step S375. Otherwise the processing proceeds to Step S379.

At Step S375, the communication control unit 167 divides the reported size (or the remaining data after division) into the data having the reported size and the data having the remaining size.

At Step S377, the communication control unit 167 determines the reported size as the size of the data to be transmitted and received in the D2D communication. The processing then ends.

At Step S379, the communication control unit 167 determines the size of the resending data (or the remaining data after division) as the size of the data to be transmitted and received in the D2D communication. The processing then ends.

Note that, when the data is divided and transmitted, the division data is combined and decoded.

The first modification of the first embodiment has been described above. According to the first modification of the first embodiment, even when the terminal apparatus that is not directly involved in the D2D communication determines the size of the data, the data having the size in consideration of the resending is transmitted and received in the D2D communication.

<3.5. Second Modification>

Next, with reference to FIG. 26 to FIG. 28, a second modification of the first embodiment will be described.

In the first embodiment, the master apparatus in the LN determines the size of the data to be transmitted and received in the D2D communication. Then, in the case of the D2D communication between the slave apparatuses in the LN, the master apparatus is not directly involved in the D2D communication, but determines the size of the data to be transmitted and received in the D2D communication. Therefore, in the first embodiment described above, the master apparatus will determine the size of the data to be transmitted and received in the D2D communication without acquiring whether or not the resending for the D2D communication between the slave apparatuses is present (that is, the ACK/NACK for the D2D communication between the slave apparatuses). That is, the master apparatus cannot determine the size of the data in consideration of the resending in the D2D communication between the slave apparatuses. On the other hand, when a hybrid automatic repeat request (HARQ) is used, it is requested that the size of the data should be the same as that of the last transmission in the case of the resending.

According to the second modification of the first embodiment, the slave apparatus feeds back the information related to the resending for the D2D communication between the slave apparatuses (for example, the ACK/NACK) to the master apparatus, and the master apparatus performs the resource control and the determination of the data size in consideration of the present or absence of the resending.

(Communication Control Unit 167)

Especially in the second modification of the first embodiment, when the terminal apparatus 100-1 is the slave apparatus in the LN, the communication control unit 167 feeds back the information related to the resending for the D2D communication between the slave apparatuses to the master apparatus via the radio communication unit 120. For example, the ACK/NACK for the D2D communication between the slave apparatuses is fed back to the master apparatus as the information related to the resending. Note that, for example, the radio resource for such feedback may be assigned by the master apparatus in the LN.

(Radio Resource Information Acquisition Unit 161)

As described above, the terminal apparatus 100-1 (for example, the radio resource information acquisition unit 161) assigns the radio resource for the D2D communication in the LN from among the radio resources reported by the base station 10 as a usable radio resource. The radio resource to be assigned becomes the D2D resource (radio resource usable for the D2D communication). In the first embodiment, the terminal apparatus 100-1, when being the master apparatus in the LN, performs such resource assignment.

Especially in the second modification of the first embodiment, the terminal apparatus 100-1 (for example, the radio resource information acquisition unit 161) considers whether or not the D2D communication between the slave apparatuses (that is, the target transmission) is the resending, to assign the radio resource for the D2D communication between the slave apparatuses. For example, when the target transmission is the resending, from a viewpoint of the time and/or a viewpoint of the amount of the resource, the radio resource is preferentially assigned for the transmission.

Note that it should be appreciated that, even in the D2D communication between the master apparatus and the slave apparatus, the radio resource for the D2D communication may be assigned in consideration of whether or not the D2D communication is the resending.

(Data Size Determination Unit 163)

As described above, the data size determination unit 163 determines the size of the data to be transmitted and received in the D2D communication. In the first embodiment, the terminal apparatus 100-1, when being the master apparatus in the LN, determines the size in this manner.

Especially in the second modification of the first embodiment, the data size determination unit 163 considers whether or not the D2D communication between the slave apparatuses (that is, the target transmission) is the resending to determine the size of the data to be transmitted and received in the D2D communication between the slave apparatuses. For example, when the target transmission is the resending, the size of the data to be transmitted and received is determined in consideration of the size of the resending data.

Note that it should be appreciated that, even in the D2D communication between the master apparatus and the slave apparatus, the radio resource for the D2D communication may be assigned in consideration of whether or not the D2D communication is the resending.

(Flow of Processing)

Figure 26:
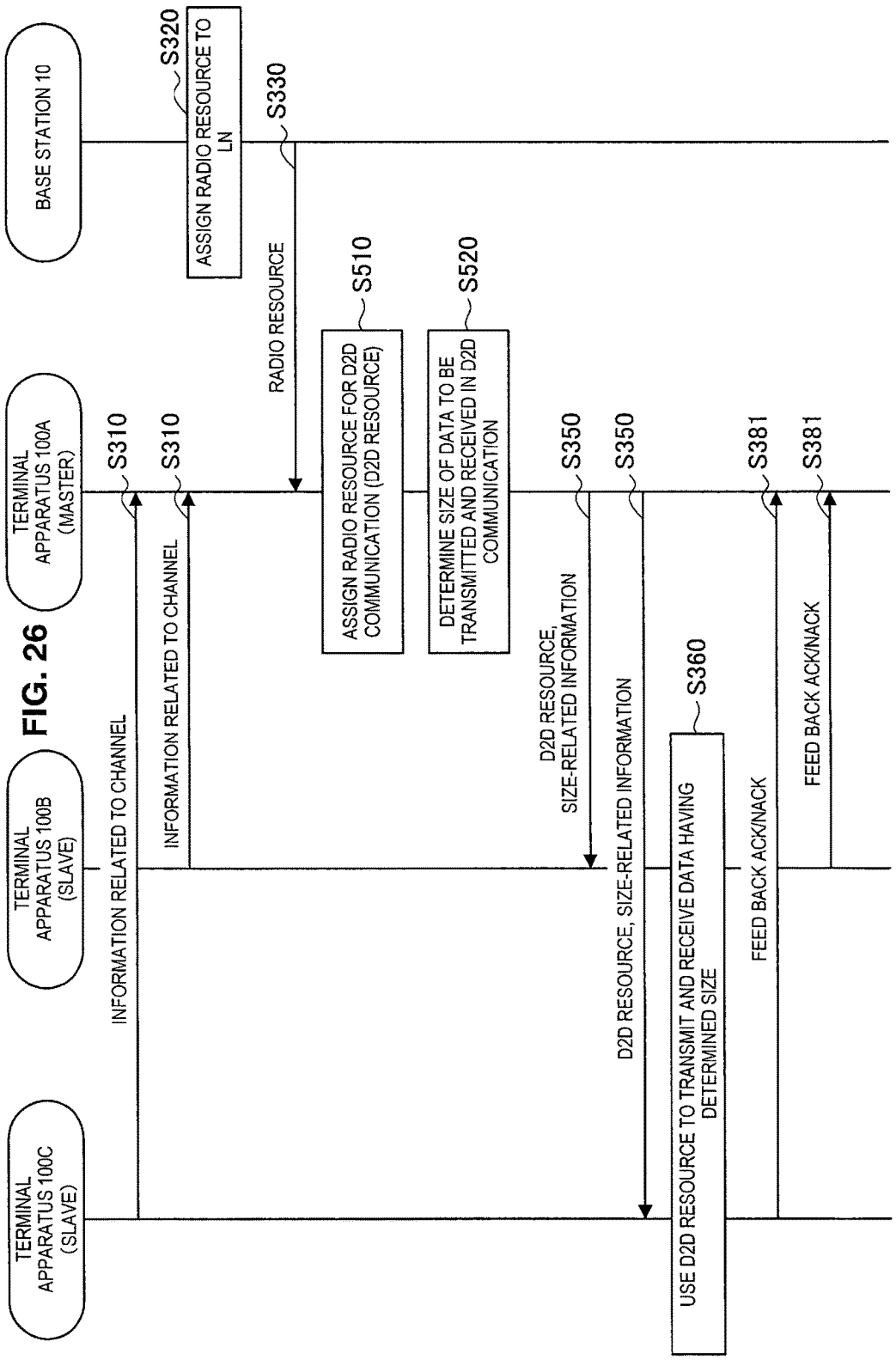
FIG. 26 is a sequence diagram illustrating an example of a schematic flow of communication control processing according to a second modification of the first embodiment.

Communication Control Processing According to Second Modification of First Embodiment FIG. 26 is a sequence diagram illustrating an example of a schematic flow of the communication control processing according to the second modification of the first embodiment. In this example, the terminal apparatus 100B and the terminal apparatus 100C as the slave apparatus in the LN perform the D2D communication.

The difference between the first example according to the first embodiment shown in FIG. 17 and an example according to the second modification of the first embodiment shown in FIG. 26 is that Steps S340 and S400 are included in the first example according to the first embodiment, but Steps S381, S510 and S320, instead of Steps S340 and S400, are included in the example according to the second modification of the first embodiment. Therefore, only Steps S381, S510 and S520 are described here.

After transmission and reception of the data in the D2D communication (S360), the ACK/NACK is fed back between the terminal apparatus 100B and the terminal apparatus 100C that perform the D2D communication. Further, the ACK/NACK is fed back from the terminal apparatus 100B and/or the terminal apparatus 100C to the terminal apparatus 100A as the master terminal (S381).

Further, the terminal apparatus 100A as the master terminal (radio resource information acquisition unit 161) considers whether or not the D2D communication between the terminal apparatus 100B and the terminal apparatus 100C as the slave apparatus (that is, the target transmission) is the resending, to assign the radio resource for the D2D communication (S510). The assigned radio resource becomes the radio resource usable for the D2D communication (D2D resource). A flow of the processing will be described in detail later.

Further, the terminal apparatus 100A as the master terminal (data size determination unit 163) considers whether or not the D2D communication between the terminal apparatus 100B and the terminal apparatus 100C as the slave apparatus (that is, the target transmission) is the resending, to determine the size of the data to be transmitted and received in the D2D communication (S520). A flow of the processing will be described in detail later.

Figure 27:
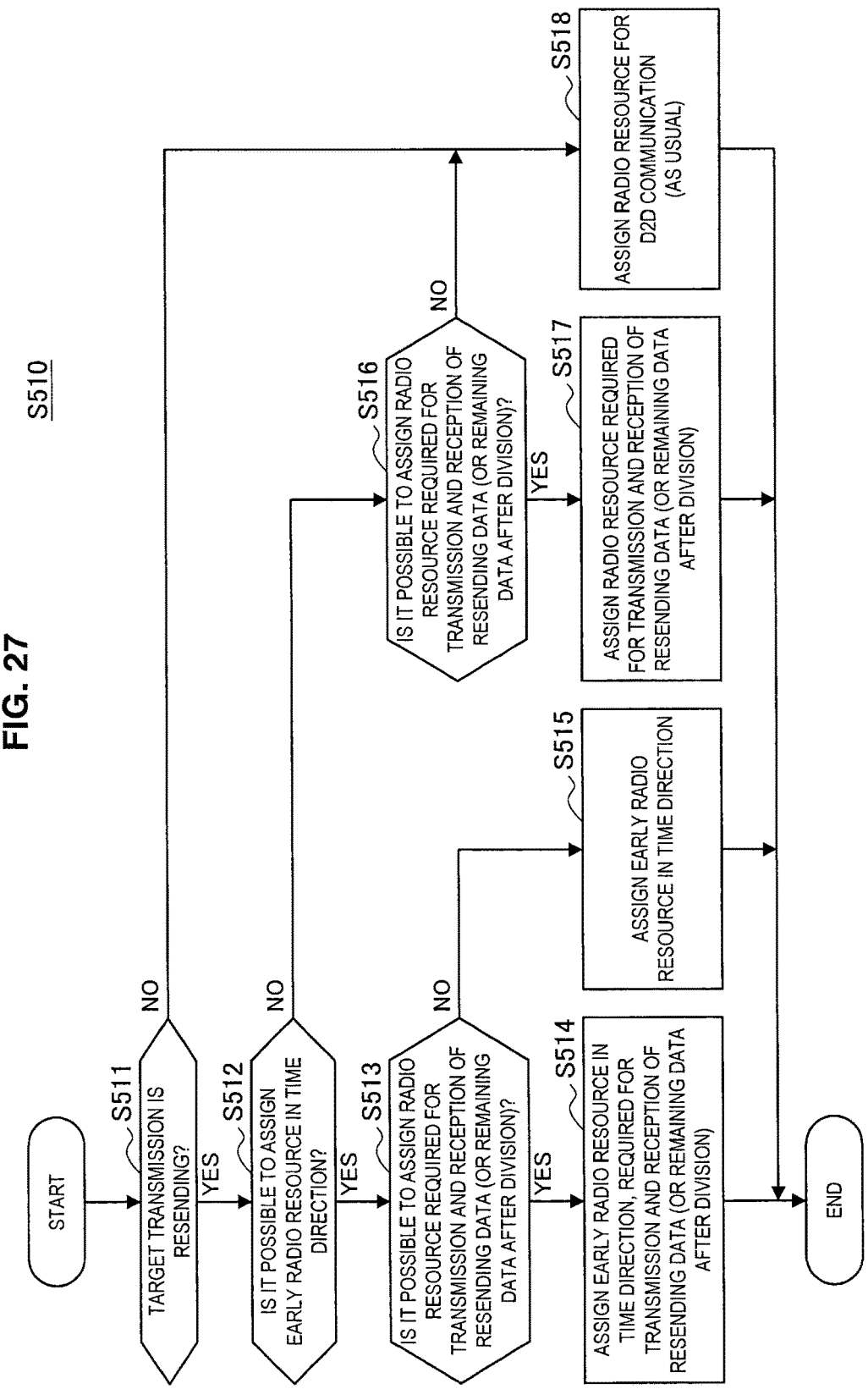
FIG. 27 is a flow chart illustrating an example of a schematic flow of processing of assigning a radio resource for the D2D communication between slave apparatuses in a second modification of the first embodiment.

Flow of Processing Related to Assignment of Radio Resource for D2D Communication FIG. 27 is a flow chart illustrating an example of a schematic flow of the processing of assigning the radio resource for the D2D communication between the slave apparatuses in the second modification of the first embodiment.

At Step S511, the radio resource information acquisition unit 161 of the terminal apparatus 100 as the slave apparatus determines whether the target transmission (that is, the D2D communication between the slave apparatuses) is the resending. If the target transmission is the resending, the processing proceeds to Step S511. Otherwise the processing proceeds to Step S518.

At Step S512, the radio resource information acquisition unit 161 determines whether it is possible to assign an early radio resource in the time direction. If it is possible to assign the radio resource, the processing proceeds to Step S513. Otherwise the processing proceeds to Step S516.

At Step S513, the radio resource information acquisition unit 161 determines whether it is possible to assign a radio resource required for transmission and reception of the resending data (or the remaining data after division). If it is possible to assign the radio resource, the processing proceeds to Step S514. Otherwise the processing proceeds to Step S515.

At Step S514, the radio resource information acquisition unit 161 assigns the early radio resource in the time direction, required for transmission and reception of the resending data (or the remaining data after division) as the radio resource for the D2D communication between the slave apparatuses. The processing then ends.

At Step S515, the radio resource information acquisition unit 161 assigns the early radio resource in the time direction as the radio resource for the D2D communication between the slave apparatuses. The processing then ends.

At Step S516, the radio resource information acquisition unit 161 determines whether it is possible to assign a radio resource required for transmission and reception of the resending data (or the remaining data after division). If it is possible to assign the radio resource, the processing proceeds to Step S517. Otherwise the processing proceeds to Step S518.

At Step S517, the radio resource information acquisition unit 161 assigns the radio resource, required for transmission and reception of the resending data (or the remaining data after division) as the radio resource for the D2D communication between the slave apparatuses. The processing then ends.

At Step S518, the radio resource information acquisition unit 161 assigns the radio resource for the D2D communication between the slave apparatuses as usual. The process then ends.

As described above, the radio resource for the D2D communication between the slave apparatuses is assigned, and the assigned radio resource becomes the radio resource usable for the D2D communication (D2D resource).

Flow of Processing Related to Determination of Size of Data

Figure 28:
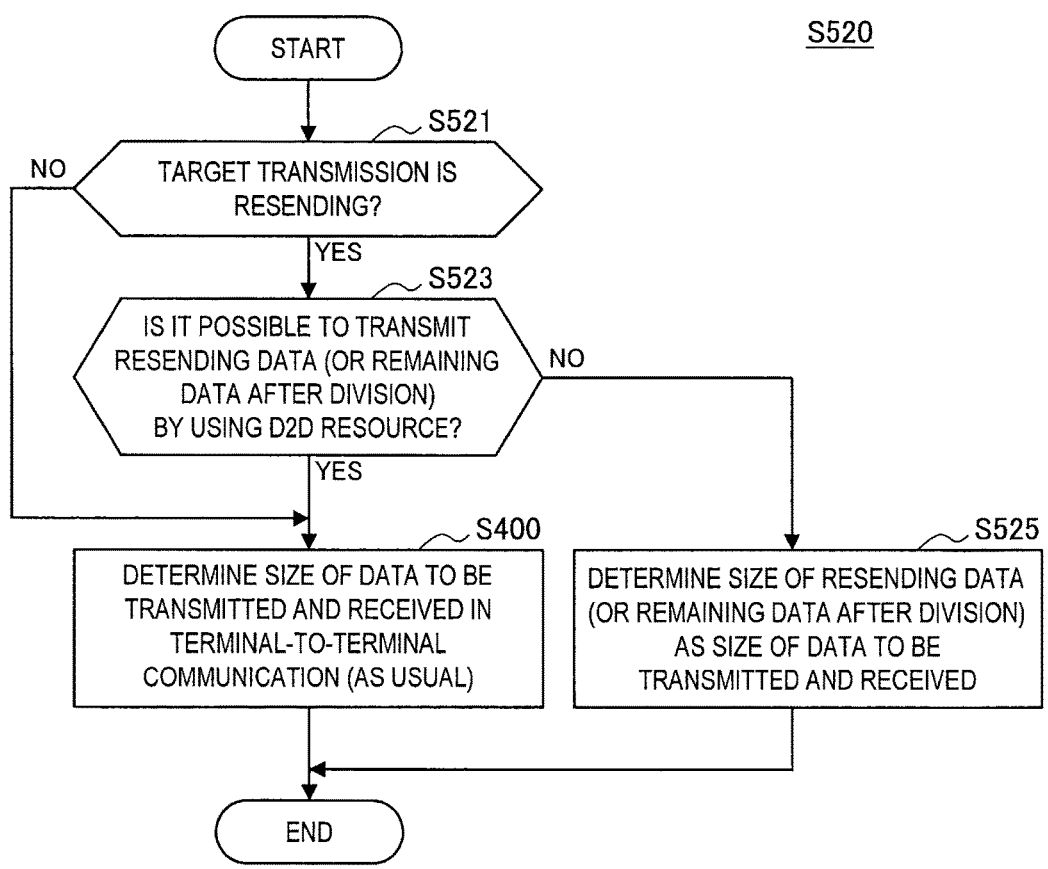
FIG. 28 is a flow chart illustrating an example of a schematic flow of processing of determining a size of data to be transmitted and received in the D2D communication between the slave apparatuses in the second modification of the first embodiment.

FIG. 28 is a flow chart illustrating an example of a schematic flow of the processing of determining the size of the data to be transmitted and received in the D2D communication between the slave apparatuses in the second modification of the first embodiment.

At Step S521, the data size determination unit 163 of the terminal apparatus 100 as the master apparatus determines whether the target transmission (that is, the D2D communication between the slave apparatuses) is the resending. If the target transmission is the resending, the processing proceeds to Step S523. Otherwise the processing proceeds to Step S400.

At Step S523, the data size determination unit 163 determines whether it is possible to transmit the resending data (or the remaining data after division) by using the D2D resource. If it is possible to transmit the resend data (or the remaining data after division), the processing proceeds to Step S525. Otherwise the processing proceeds to Step S400.

At Step S400, the data size determination unit 163, as usual, determines the size of the data to be transmitted and received in the D2D communication. The processing then ends. Note that, when it is not possible to transmit the resending data (or the remaining data after division) by using the D2D resource, the data is appropriately divided in the slave apparatus.

At Step S525, the data size determination unit 163 determines the size of the resending data (or the remaining data after division) as the size of the data to be transmitted and received in the D2D communication. The processing then ends.

The second modification of the first embodiment has been described above. According to the second modification of the first embodiment, even when the terminal apparatus that is not directly involved in the D2D communication determines the size of the data, the data having the size in consideration of the resending is transmitted and received in the D2D communication by using the radio resource in consideration of the resending. As a result, the use efficiency of the radio resource can be improved.

Note that the ACK/NACK for the D2D communication between the slave apparatuses may be fed back not only to the master apparatus but to the base station 10. This feedback may be performed on the channel such as the PUSCH or PUCCH. When the feedback to the base station 10 is present, the base station 10 may also perform the resource control in consideration of the presence or absence (ACK/NACK) of the resending for the D2D communication between the slave apparatuses. For example, when the resending is present, the radio resource may be preferentially assigned to the LN (or the master apparatus) from a viewpoint of the time and/or a viewpoint of the amount of the radio resource, thereby allowing the notification of the usable radio resource in consideration of the resending by the base station. As a result, the use efficiency of the radio resource can be improved.

<3.6. Third Modification>

Next, with reference to FIG. 29, a third modification of the first embodiment will be described.

In the example of the first embodiment described above, the terminal apparatus 100-1 as the master apparatus assigns the radio resource for the D2D communication in the LN from among the radio resources reported by the base station 10 as a usable radio resource.

On the other hand, especially in the third modification of the first embodiment, the base station 10 directly assigns the radio resource for the D2D communication in the LN.

(Radio Resource Information Acquisition Unit 161)

Especially in the third modification of the first embodiment, the radio resource usable for the D2D (D2D resource) is assigned by the base station 10 as the radio resource for the D2D communication, and reported by the base station 10. That is, the base station 10 directly assigns the radio resource for the D2D communication in the LN. The radio resource to be assigned becomes the D2D resource (radio resource usable for the D2D communication). The terminal apparatus 100-1 (for example, the terminal apparatus 100-1 as the master apparatus) is notified of the D2D resource.

Therefore, especially in the third modification of the first embodiment, when the terminal apparatus 100-1 is the master apparatus, the radio resource information acquisition unit 161 acquires the information related to the D2D resource to be reported to the base station 10.

(Flow of Processing)

Figure 29:
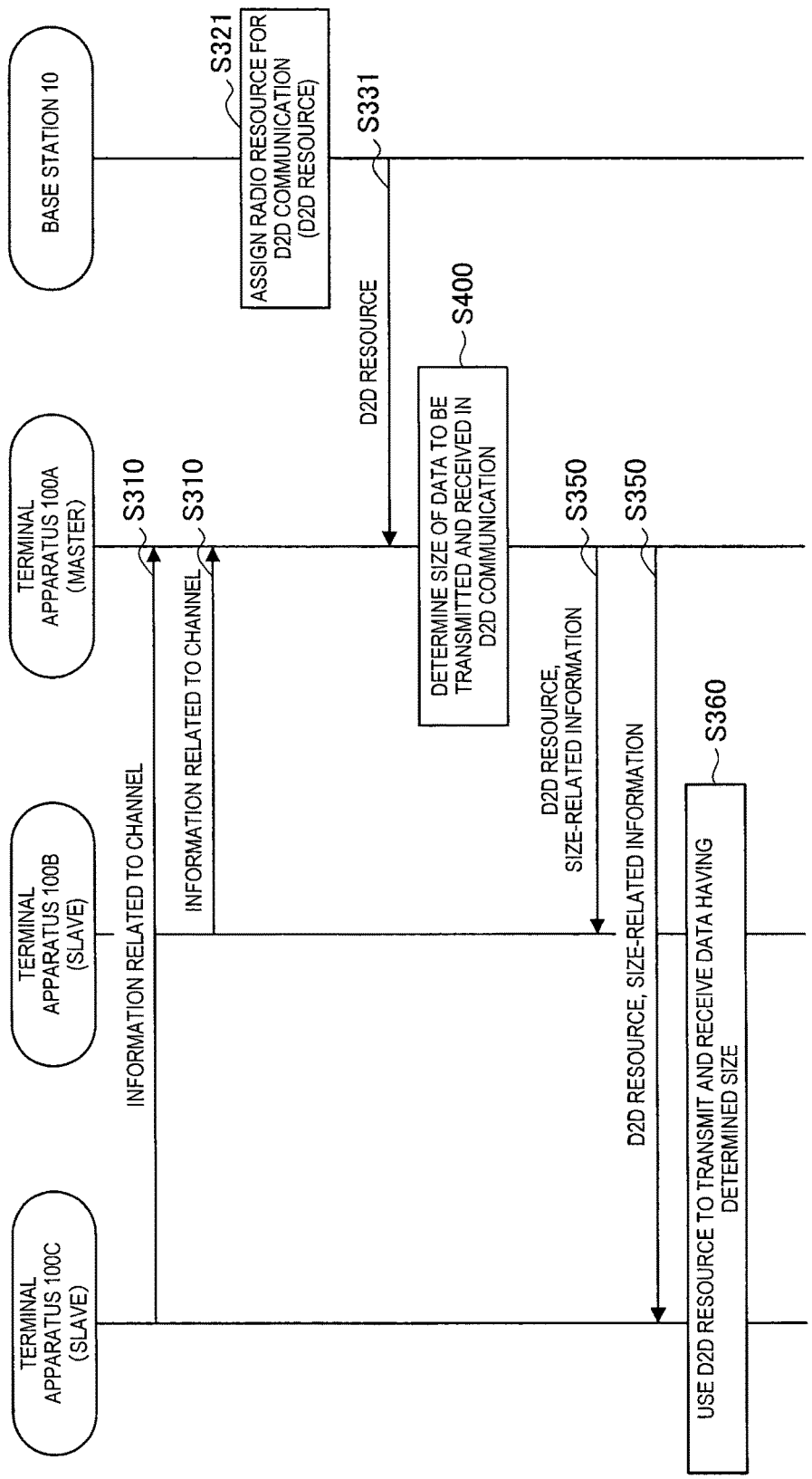
FIG. 29 is a sequence diagram illustrating an example of a schematic flow of communication control processing according to a third modification of the first embodiment.

Communication Control Processing According to Third Modification of First Embodiment FIG. 29 is a sequence diagram illustrating an example of a schematic flow of the communication control processing according to the third modification of the first embodiment. In this example, the terminal apparatus 100B and the terminal apparatus 100C as the slave apparatus in the LN perform the D2D communication.

The difference between the first example according to the first embodiment shown in FIG. 17 and an example according to the third modification of the first embodiment shown in FIG. 29 is that Steps S320, S330 and S340 are included in the first example according to the first embodiment, but Steps S321 and S331, instead of these Steps, are included in the example according to the third modification of the first embodiment. Therefore, only Steps S321 and S331 are described here.

The base station 10, when a predetermined condition is satisfied, assigns the radio resource as a part of the radio resources controllable by the base station 10, as the resource for the D2D communication (S321). The assigned radio resource becomes the radio resource usable for the D2D communication (D2D resource).

The base station 10 then notifies the terminal apparatus 100A as the master apparatus of the D2D resource on any channel (for example, the PDCCH, PDSCH or PBCH) (S331).

Note that the base station 10 may notify the terminal apparatus 100B and the terminal apparatus 100C as the slave apparatus of the D2D resource.

The third modification of the first embodiment has been described above. According to the third modification of the first embodiment, the terminal apparatus 100-1 may not perform the resource control, therefor making it possible to reduce the load on the terminal apparatus 100-1.

Note that the third modification of the first embodiment may be combined with one of the first modification and the second modification of the first embodiment. That is, even in the third modification of the first embodiment, instead of Step S360 shown in FIG. 29, Step S370 and Step S361 shown in FIG. 24 may be performed. Further, even in the third modification of the first embodiment, instead of Steps S340 and S400 shown in FIG. 29, Steps S381, S510 and S520 shown in FIG. 26 may be performed.

<3.7. Fourth Modification>

Next, with reference to FIG. 30 and FIG. 31, a fourth modification of the first embodiment will be described.

In the example of the first embodiment described above, the base station 10 notifies the terminal apparatus 100-1 of the usable radio resource (for example, the radio resource to be assigned to the LN, the radio resource to be assigned to the terminal apparatus 100-1, the radio resource not assigned, or the like). The terminal apparatus 100-1 as the master apparatus then assigns the radio resource for the D2D communication in the LN from among the radio resources reported by the base station 10.

On the other hand, especially in the fourth modification of the first modification, the usable radio resource is not reported by the base station 10, but estimated by the terminal apparatus 100-1.

(Radio Resource Information Acquisition Unit 161)

Especially, in the fourth modification, the radio resource usable for the D2D communication (D2D resource) is a part or all of the radio resources estimated as a usable radio resource. For example, the radio resource information acquisition unit 161 estimates the usable radio resource, to assign a part or all of the radio resources as the radio resource for the D2D communication. The radio resource to be assigned becomes the D2D resource.

Example of Radio Resource Estimated

As an example, the radio resource estimated not to be used by the base station is estimated as a usable radio resource. Specifically, reception power in the target radio resource (for example, a frequency band, a time period or the combination thereof) is measured, and it is determined whether or not the target radio resource is used by the base station, on the basis of the measurement result. As a result, when it is determined that the radio resource is not used by the base station, the radio resource is estimated not to be used by the base station.

Note that, as another example, the radio resource estimated to be used but not to give the interference to the radio communication may be estimated as a usable radio resource. In this case, an interference control function (control of transmission power, or the like) included in the terminal apparatus may be used.

Terminal Apparatus that Performs Estimation

As a first example, the master apparatus in the LN estimates the usable radio resource. That is, the radio resource information acquisition unit 161, when the terminal apparatus 100-1 is the master apparatus in the LN, estimates the usable radio resource. This eliminates the need for transmission and reception of the estimation result in the LN, thereby allowing the overhead to be suppressed.

As a second example, the two or more terminal apparatuses in the LN assume the usable radio resource. For example, all of the master apparatuses and the slave apparatuses in the LN assume the usable radio resource and share it. As an example, the radio resource estimated by all the apparatuses as a usable radio resource may become the D2D resource. This increases the possibility that the D2D resource is the usable radio resource. As another example, the radio resource estimated by at least one apparatus as a usable radio resource may become the D2D resource. This allows more D2D resources to be obtained.

(Flow of Processing)

Communication Control Processing According to Fourth Modification of First Embodiment (in Case of Estimation by Master Apparatus)

Figure 30:
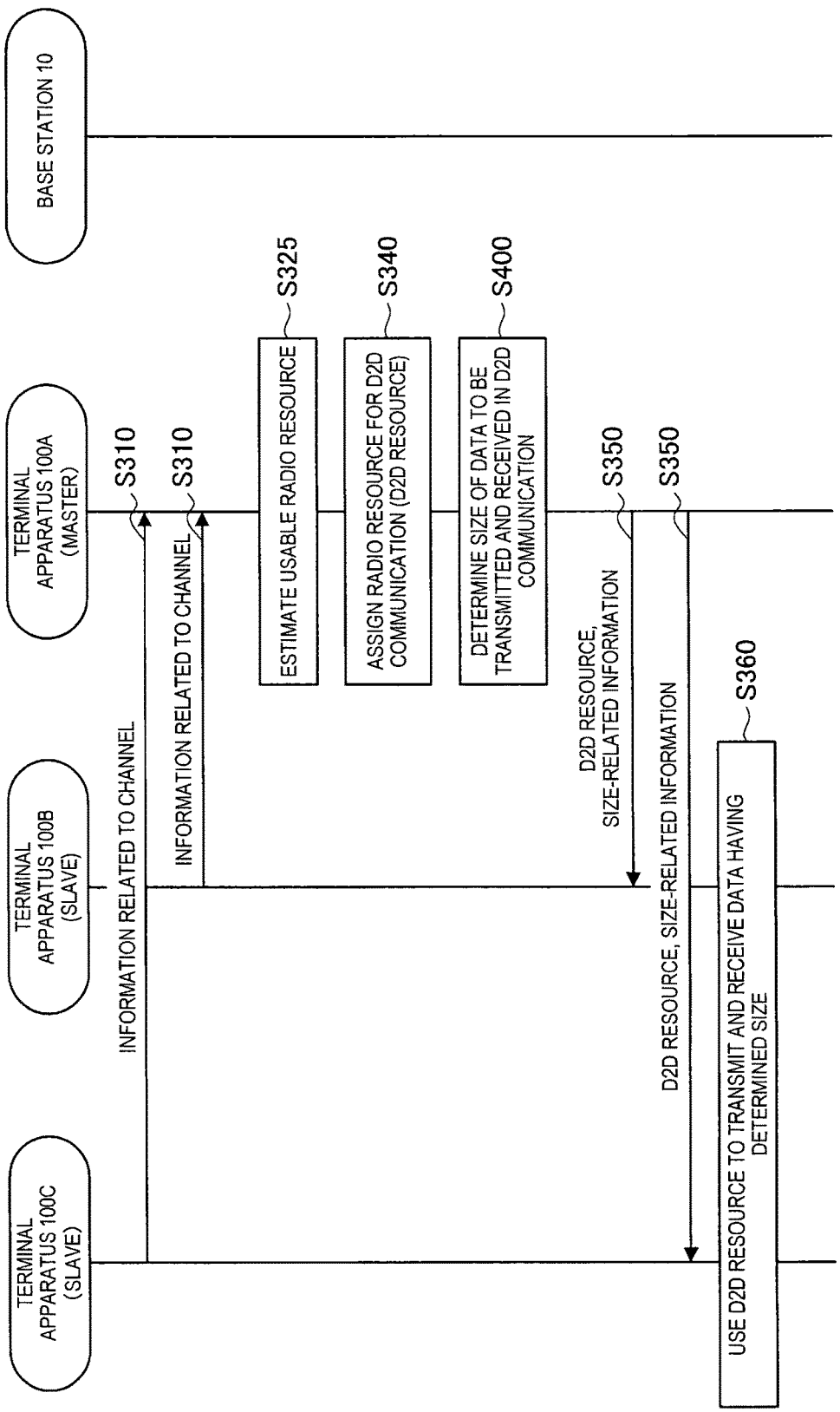
FIG. 30 is a sequence diagram illustrating a first example of a schematic flow of communication control processing according to a fourth modification of the first embodiment.

FIG. 30 is a sequence diagram illustrating an example of a schematic flow of the communication control processing according to a fourth modification of the first embodiment. In this example, the usable radio resource is estimated by the master apparatus.

The difference between the first example according to the first embodiment shown in FIG. 17 and an example according to the fourth modification of the first embodiment shown in FIG. 30 is that Steps S320 and S330 are included in the first example according to the first embodiment, but Step S323, instead of these Steps, is included in the first example according to the fourth modification of the first embodiment. Therefore, Step S323 is described here.

The terminal apparatus 100A (radio resource information acquisition unit 161) as the master apparatus estimates the usable radio resource (S323). The estimated radio resource becomes the radio resource usable for the D2D communication (D2D resource).

Communication Control Processing According to Fourth Modification of First Embodiment (in Case of Estimation by Two or More Apparatus)

Figure 31:
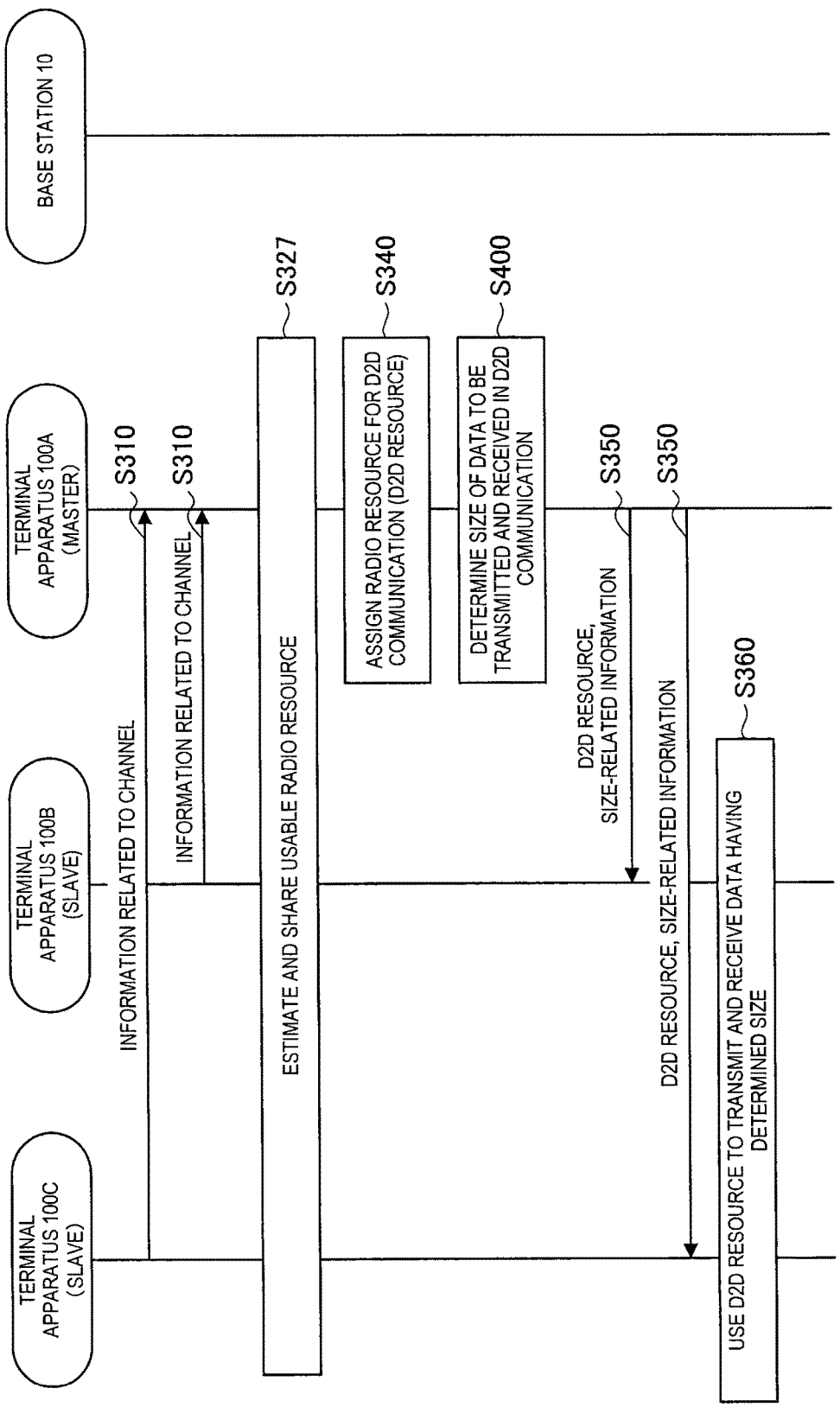
FIG. 31 is a sequence diagram illustrating a second example of a schematic flow of communication control processing according to a fourth modification of the first embodiment.

FIG. 31 is a sequence diagram illustrating a second example of a schematic flow of the communication control processing according to a fourth modification of the first embodiment. In this example, the usable radio resource is estimated by the master apparatus and slave apparatus, and shared.

The difference between the first example according to the fourth modification of the first embodiment shown in FIG. 30 and the second example according to the fourth modification of the first embodiment shown in FIG. 31 is that Step S323 is included in the first example, but Step S325, instead of Step S323, is included in the second example. Therefore, Step S325 is described here.

The terminal apparatus 100A as the master apparatus, and the terminal apparatus 100B and the terminal apparatus 100C as the slave apparatus assume the usable radio resource, and share it (S325).

The fourth modification of the first embodiment has been described above. According to the fourth modification of the first embodiment, the base station 10 may not perform the resource control for the D2D communication. Therefore, even when the D2D communication is performed, the load on the base station 10 can be suppressed.

4. Second Embodiment

Subsequently, with reference to FIG. 32 to FIG. 40, a second embodiment of the present disclosure will be described.

<4.1. Outline>

First, with reference to FIG. 32, the second embodiment will be described. In the second embodiment, as described with reference to FIG. 10, as a form of the D2D communication, the localized network (LN) is adopted. Then, the size of the data to be transmitted and received in the D2D communication is determined by the apparatus (master apparatus or slave apparatus) that performs the D2D communication. A specific example of this point will be described below with reference to FIG. 32.

Figure 32:
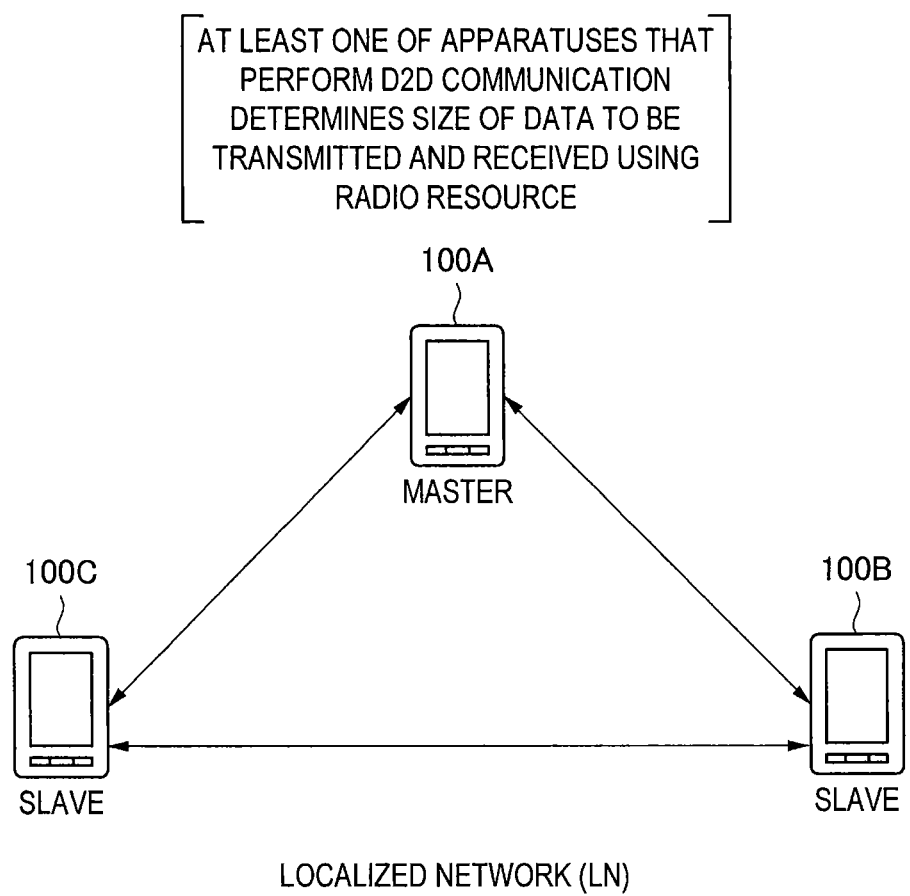
FIG. 32 is an explanatory diagram for explaining an outline of a second embodiment.

FIG. 32 is an explanatory diagram for explaining an outline of the second embodiment. With reference to FIG. 32, three terminal apparatuses 100 forming the localized network (LN) are shown. In this example, the terminal apparatus 100A is the master apparatus in the LN, and the terminal apparatus 100B and the terminal apparatus 100C are the slave terminals in the LN. In the second embodiment, in this way, the LN is adopted as a form of the D2D communication. Then, at least one of the apparatuses that perform the D2D communication within the LN determines the size of the data to be transmitted and received in the D2D communication. As an example, the size of the data to be transmitted and received in the D2D communication between the terminal apparatus 100B as the slave apparatus and the terminal apparatus 100C as the slave apparatus is determined by the terminal apparatus 100B or the terminal apparatus 100C. Further, as another example, the size of the data to be transmitted and received in the D2D communication between the terminal apparatus 100A as the master apparatus and the terminal apparatus 100B as the slave apparatus is determined by the terminal apparatus 100A or the terminal apparatus 100B.

Note that, in the first embodiment, the master apparatus determines the size of the data to be transmitted and received in the D2D communication, but in the second embodiment, the apparatus that performs the D2D communication determines the size of the data to be transmitted and received in the D2D communication regardless of whether it is the master apparatus or the slave apparatus.

<4.2. Function Configuration of Terminal Apparatus>

Figure 33:
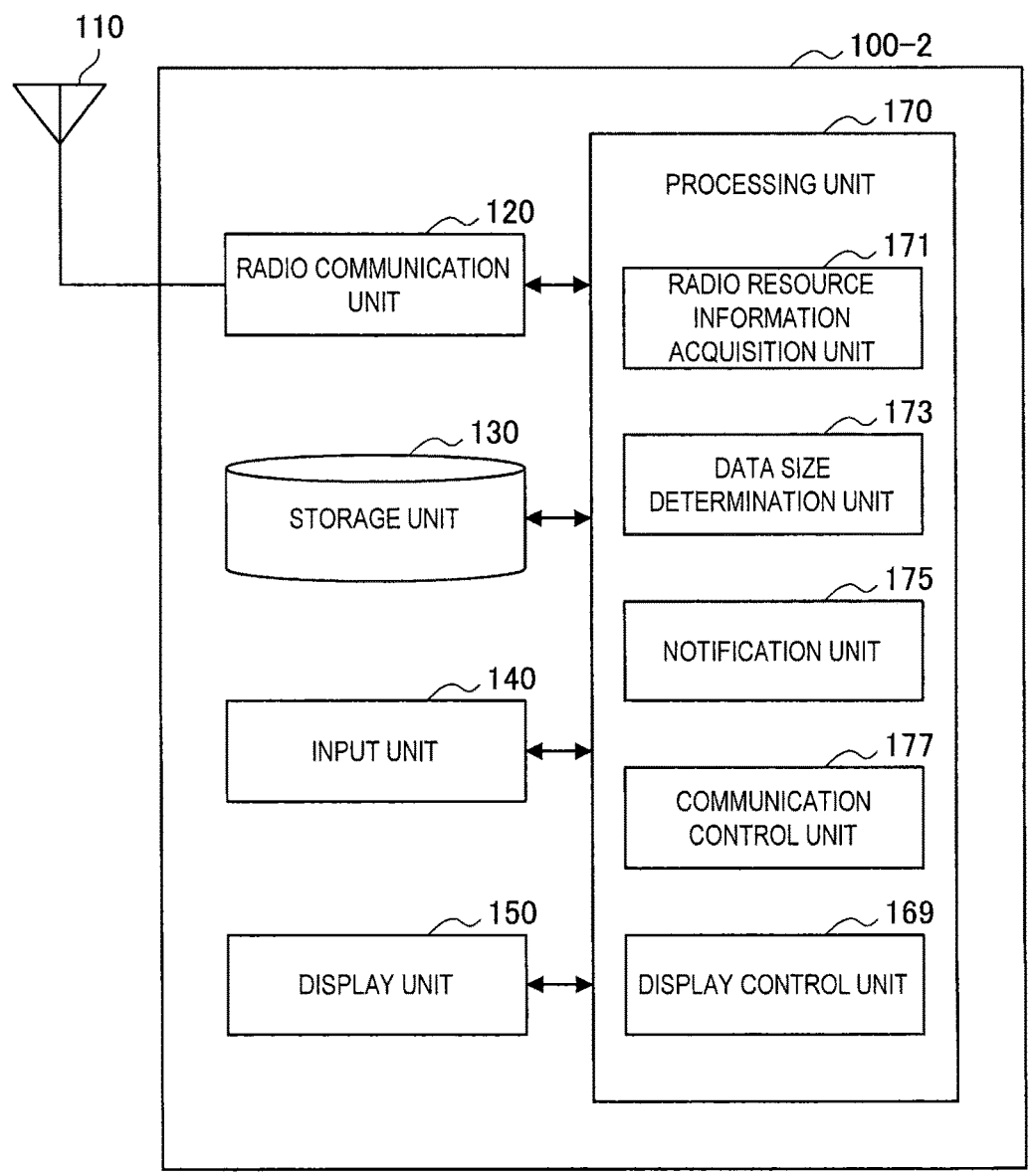
FIG. 33 is a block diagram illustrating an example of a function configuration of a terminal apparatus according to the second embodiment.

With reference to FIG. 33, an example of a function configuration of a terminal apparatus 100-2 according to the second embodiment will be described. FIG. 33 is a block diagram illustrating an example of the function configuration of the terminal apparatus 100-2 according to the second embodiment. With reference to FIG. 33, the terminal apparatus 100-2 includes an antenna unit 110, a radio communication unit 120, a storage unit 130, an input unit 140, a display unit 150, and a processing unit 170.

Here, in the antenna unit 110, the radio communication unit 120, the storage unit 130, the input unit 140, the display unit 150, and the display control unit 169 included in a processing unit 170, there is no deference in particular between the first embodiment and the second embodiment. Therefore, a radio resource information acquisition unit 171, a data size determination unit 173, a notification unit 175 and a communication control unit 177 included in the processing unit 170 are described here.

(Radio Resource Information Acquisition Unit 171)

The radio resource information acquisition unit 171 acquires the information related to the usable radio resource.

Radio Resource Usable for Radio Communication Between Base Station and Terminal Apparatus For example, the radio resource information acquisition unit 171 acquires the information related to the radio resource usable for the radio communication between the base station 10 and a terminal apparatus 100-2 among the radio resources controllable by the base station 10. A content of this point is the same as that described in the first embodiment.

Radio Resource Usable for D2D Communication (D2D Resource)

Especially in an embodiment according to the present disclosure, the radio resource information acquisition unit 171 acquires the radio resource information related to the radio resource usable for the D2D communication (D2D resource), not via the base station 10. As described above, the radio resources controllable by the base station 10 are, for example, the radio resources that can be assigned by the base station 10.

In the second embodiment, when the terminal apparatus 100-2 is the master apparatus, the radio resource information acquisition unit 171 acquires the radio resource information related to the D2D resource, similarly to the radio resource information acquisition unit 161 in the first embodiment. On the other hand, when the terminal apparatus 100-2 is the slave apparatus, the terminal apparatus 100-2 is notified of the D2D resource by the master apparatus. The radio resource information acquisition unit 171 then acquires the radio resource information related to the D2D resource reported by the master apparatus.

(Data Size Determination Unit 173)

The data size determination unit 173 determines the size of the data to be transmitted and received in the D2D communication on the basis of the radio resource information related to the D2D resource.

Especially in the second embodiment, when the terminal apparatus 100-2 perform the D2D communication, the data size determination unit 173 determines the size. Note that, when the other apparatus that performs the D2D communication determines the size and notifies the terminal apparatus 1000-2 of the size, the data size determination unit 173 may not determine the size. As an example, the data size determination unit 173, when the terminal apparatus 100-2 is the apparatus on the transmitting side in the D2D communication, may determine the size, and when the terminal apparatus 100-2 is the apparatus on the receiving side in the D2D communication, may not determine the size. Further, as another example, in the case of the D2D communication between the master apparatus and the slave apparatus, the data size determination unit 173, when the terminal apparatus 100-2 is the master apparatus, may determine the size, and when the terminal apparatus 100-2 is the slave apparatus, may not determine the size.

Note that a specific method for determining the size is similar to the content described in the first embodiment.

(Notification Unit 175)

The notification unit 175 notifies another apparatus that performs the D2D communication of the size-related information related to the size to be determined. Especially in the second embodiment, when the terminal apparatus 100-2 performs the D2D communication and determines the size, the notification unit 175 notifies another apparatus that performs the D2D communication of the size-related information.

Note that a specific content of the size-related information to be reported, and a specific method for the notification are similar to the content described in the first embodiment.

Furthermore, for example, when the terminal apparatus 100-2 is the master apparatus, the notification unit 175 notifies the apparatus that performs the D2D communication of the D2D resource. The notification unit 175 then notifies the apparatus on the transmitting side of the radio resource as the resource for transmission, and notifies the apparatus on the receiving side of the radio resource as the resource for reception. Another apparatus is notified of the radio resource through transmission on the control channel and/or the data channel.

(Communication Control Unit 177)

The communication control unit 177 controls radio communication by the terminal apparatus 100-2. For example, when the terminal apparatus 100-2 performs radio communication with the base station 10, the communication control unit 177 controls radio communication with the base station 10 by the terminal apparatus 100-2.

Especially in an embodiment according to the present disclosure, the communication control unit 177 controls the D2D communication by the terminal apparatus 100-2. Specifically, when the terminal apparatus 100-2 performs the D2D communication, the communication control unit 177 uses the radio resource (D2D resource) usable for the D2D communication, to transmit or receive the data having the determined data size.

Note that, in the second embodiment, the terminal apparatus 100-2, when performing the D2D communication and not determining the size of the data to be transmitted and received in the D2D communication, is notified of the size-related information by another apparatus that performs the D2D communication. In this case, the terminal apparatus 100-2 can identify the size of the data to be transmitted and received in the D2D communication by a method similar to the method described in the first embodiment.

<4.3. Flow of Processing>

Next, with reference to FIG. 34 and FIG. 35, an example of the communication control processing according to the second embodiment will be described.

(Overall Flow of Communication Control Processing)

First, with reference to FIG. 34 and FIG. 35, a schematic flow of the communication control processing according to the second embodiment will be described.

Case of D2D Communication Between Slave Apparatuses

Figure 34:
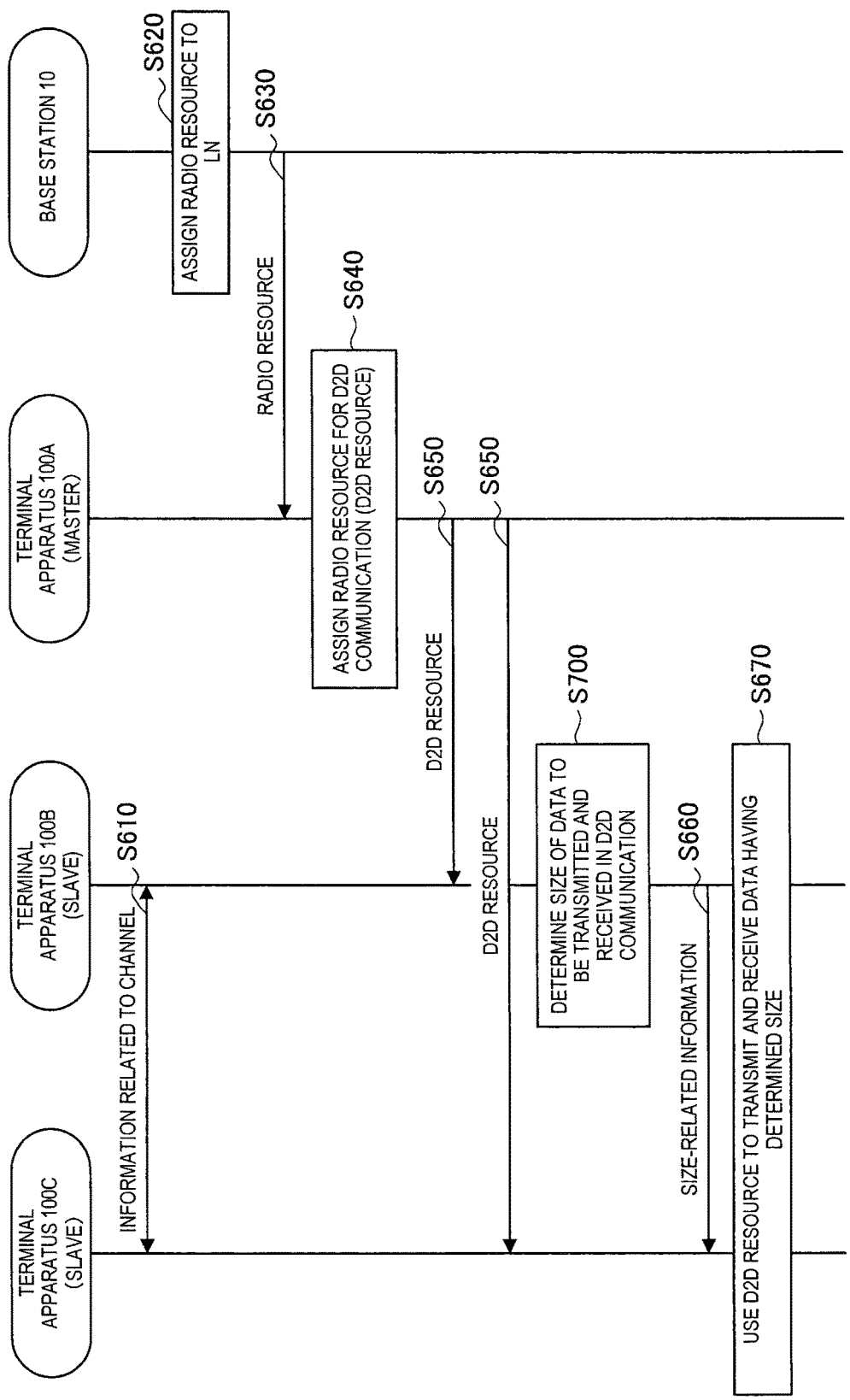
FIG. 34 is a sequence diagram illustrating a first example of a schematic flow of communication control processing according to the second embodiment.

FIG. 34 is a sequence diagram illustrating a first example of the schematic flow of the communication control processing according to the second embodiment. In this example, the terminal apparatus 100B and the terminal apparatus 100C as the slave apparatus in the LN perform the D2D communication.

The terminal apparatus 100 estimates a state of the channel that can be used for the D2D communication. For example, the terminal apparatus 100 estimates the state of the channel by receiving the reference signal to be transmitted by another terminal apparatus 100. Then, for example, the information related to the channel is fed back between the terminal apparatuses 100 that performs the D2D communication (S610). The information related to the channel is the channel state information (CSI), and includes the CQI, RI, PMI, RSRP, RSRQ, and the like. Note that the information related to the channel may be fed back also to the master apparatus and/or the base station 10.

Further, the base station 10, when a predetermined condition is satisfied, assigns the radio resource as a part of the radio resources controllable by the base station 10 to the LN (S620). Note that, when the information related to the channel is fed back also to the base station 10, the base station 10 may assign the radio resource in consideration of the information.

The base station 10 then notifies the terminal apparatus 100A as the master apparatus of the radio resource assigned to the LN on any channel (for example, the PDCCH, PDSCH or PBCH) (S630).

After that, the terminal apparatus 100A (radio resource information acquisition unit 171) as the master apparatus assigns the radio resource for the D2D communication in the LN from among the radio resources assigned to the LN (S640). The assigned radio resource becomes the radio resource usable for the D2D communication (D2D resource). Note that, when the information related to the channel is fed back also to the terminal apparatus 100A as the master apparatus, the terminal apparatus 100A may assigns the radio resource in consideration of the information.

The terminal apparatus 100A (notification unit 175) then notifies the apparatuses that perform the D2D communication (the terminal apparatus 100B and the terminal apparatus 100C) of the D2D resource (S650).

Then, the terminal apparatus 100B (data size determination unit 173) as one of the apparatuses that perform the D2D communication determines the size of the data to be transmitted and received in the D2D communication (S700). A flow of the processing will be described later.

Then, the terminal apparatus 100B (notification unit 175) notifies another apparatus that performs the D2D communication (the terminal apparatus 100C) of the size-related information related to the determined size (S660). Note that the D2D resource may be reported together with the size-related information.

Thereafter, the terminal apparatus 100B and the terminal apparatus 100C use the D2D resource to transmit and receive the data having the determined size (S670).

Case of D2D Communication Between Master Apparatus and Slave Apparatus

Figure 35:
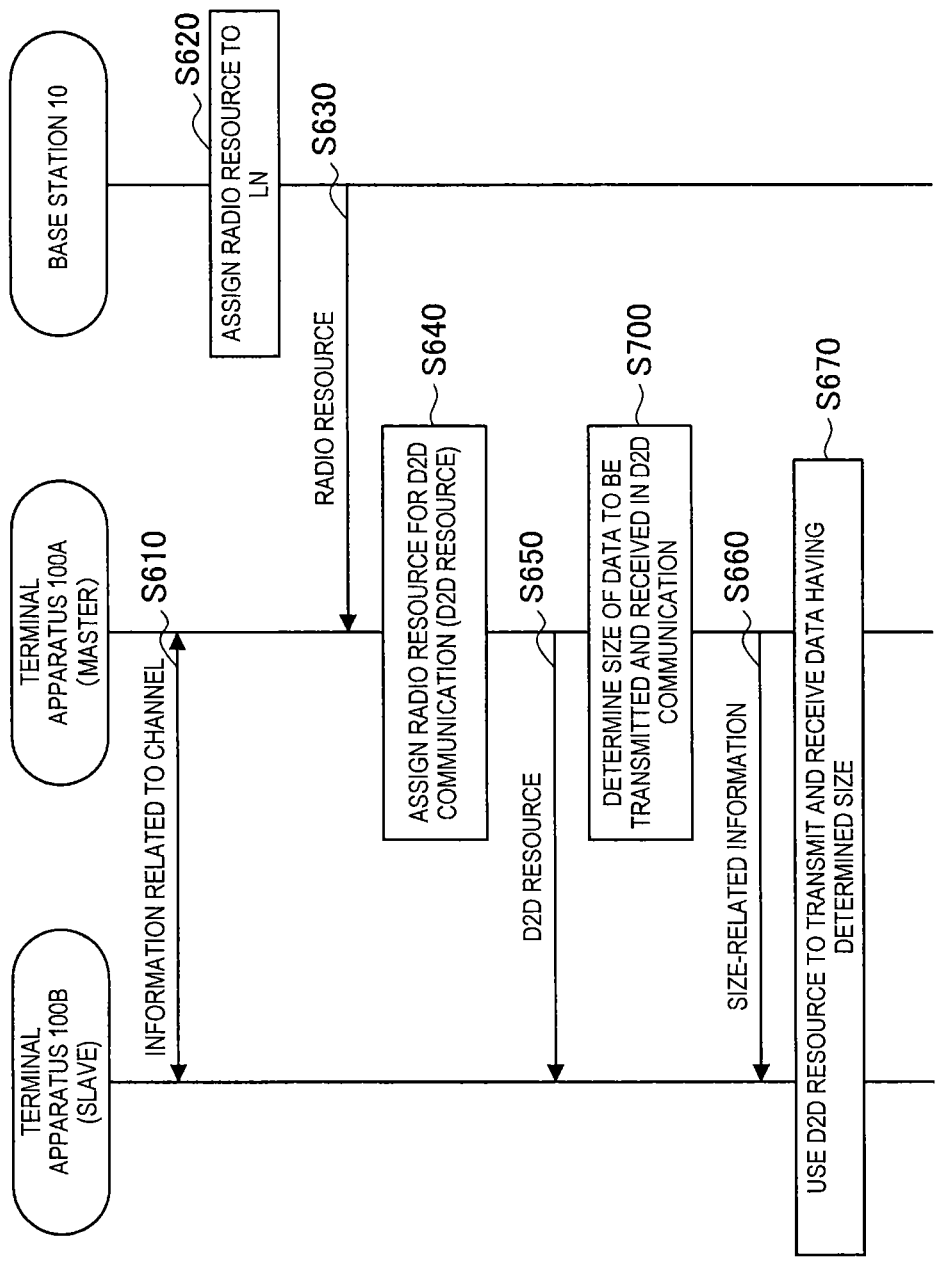
FIG. 35 is a sequence diagram illustrating a second example of a schematic flow of communication control processing according to the second embodiment.

FIG. 35 is a sequence diagram illustrating a second example of the schematic flow of the communication control processing according to the second embodiment. In this case, the terminal apparatus 100A as the master apparatus and the terminal apparatus 100B as the slave apparatus perform the D2D communication.

The first example shown in FIG. 34 is similar to the second example shown in FIG. 35 except for the difference of whether or not the master apparatus is included in the apparatuses for performing D2D communication.

(Flow of Processing Related to Determination of Size of Data)

In the second embodiment, as an example of the processing of determining the size of the data to be transmitted and received in the D2D communication, the first example (FIG. 19), the second example (FIG. 20), the fourth example (FIG. 22) and the fifth example (FIG. 23) among the examples of the processing described in the first embodiment may be applied.

<4.4. First Modification>

Next, with reference to FIG. 36, a first modification of the second embodiment will be described.

In the second embodiment, the apparatus that performs the D2D communication determines the size of the data to be transmitted and received in the D2D communication. In the case of the D2D communication between the slave apparatuses in the LN, the master apparatus is not directly involved in the D2D communication, but assigns the radio resource for the D2D communication. Therefore, in the second embodiment described above, the master apparatus will assign the radio resource for the D2D communication without acquiring whether or not the resending for the D2D communication between the slave apparatuses is present (that is, the ACK/NACK for the D2D communication between the slave apparatuses). As a result, the more radio resources than necessary are assigned to transmission of the data to be resent, possibly resulting in a waste of the radio resource. Further, the necessary radio resource is not assigned to the data to be resent, possibly taking a time for the resending.

Therefore, according to the first modification of the second embodiment, the slave apparatus feeds back the information related to the resending for the D2D communication between the slave apparatuses (for example, the ACK/NACK) to the master apparatus, and the master apparatus performs the resource control in consideration of the present or absence of the resending.

(Communication Control Unit 177)

Especially in the first modification of the second embodiment, when the terminal apparatus 100-2 is the slave apparatus in the LN, the communication control unit 177 feeds back the information related to the resending for the D2D communication between the slave apparatuses to the master apparatus via the radio communication unit 120. For example, the ACK/NACK for the D2D communication between the slave apparatuses is fed back to the master apparatus as the information related to the resending. Note that, for example, the radio resource for such feedback may be assigned by the master apparatus in the LN.

(Radio Resource Information Acquisition Unit 171)

As described above, the terminal apparatus 100-2 (for example, the radio resource information acquisition unit 171) assigns the radio resource for the D2D communication in the LN from among the radio resources reported by the base station 10 as a usable radio resource. The radio resource to be assigned becomes the D2D resource (radio resource usable for the D2D communication). In the second embodiment, the terminal apparatus 100-2, when being the master apparatus in the LN, performs such resource assignment.

Especially in the first modification of the second embodiment, the terminal apparatus 100-2 (for example, the radio resource information acquisition unit 171) considers whether or not the D2D communication between the slave apparatuses (that is, the target transmission) is the resending, to assign the radio resource for the D2D communication between the slave apparatuses. For example, when the target transmission is the resending, from a viewpoint of the time and/or a viewpoint of the amount of the resource, the radio resource is preferentially assigned for the transmission.

Note that it should be appreciated that, even in the D2D communication between the master apparatus and the slave apparatus, the radio resource for the D2D communication may be assigned in consideration of whether or not the D2D communication is the resending.

(Flow of Processing)

Figure 36:
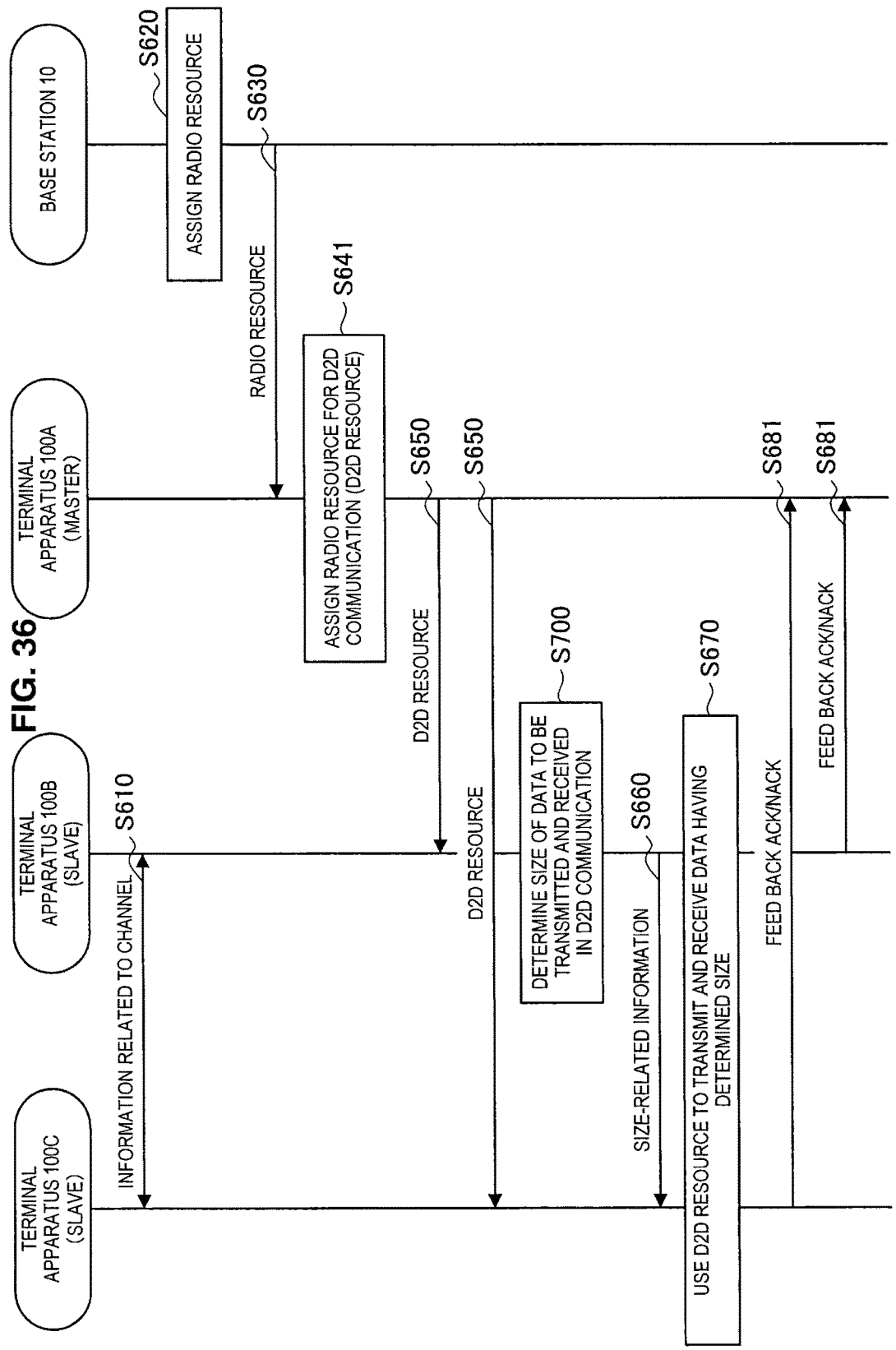
FIG. 36 is a sequence diagram illustrating an example of a schematic flow of communication control processing according to a first modification of the second embodiment.

Communication Control Processing According to First Modification of Second Embodiment FIG. 36 is a sequence diagram illustrating an example of a schematic flow of the communication control processing according to the first modification of the second embodiment. In this example, the terminal apparatus 100B and the terminal apparatus 100C as the slave apparatus in the LN perform the D2D communication.

The difference between the first example according to the second embodiment shown in FIG. 34 and an example according to the first modification of the second embodiment shown in FIG. 36 is that Step S640 is included in the first example according to the second embodiment, but Steps S641 and S681, instead of Step S640, are included in the example according to the second modification of the first embodiment. Therefore, only Steps S641 and S681 are described here.

After transmission and reception of the data in the D2D communication between slave apparatuses (S670), the ACK/NACK is fed back between the terminal apparatus 100B and the terminal apparatus 100C that perform the D2D communication. Further, the ACK/NACK is fed back from the terminal apparatus 100B and/or the terminal apparatus 100C to the terminal apparatus 100A as the master terminal (S681).

Further, the terminal apparatus 100A as the master terminal (radio resource information acquisition unit 171) considers whether or not the D2D communication between the terminal apparatus 100B and the terminal apparatus 100C as the slave apparatus (that is, the target transmission) is the resending, to assign the radio resource for the D2D communication (S641). The assigned radio resource becomes the radio resource usable for the D2D communication (D2D resource). A flow of the processing will be described later.

Flow of Processing Related to Assignment of Radio Resource for D2D Communication In the first modification of the second embodiment, as an example of the processing of assigning the radio resource for the D2D communication, the example of the processing described in the second modification of the first embodiment with reference to FIG. 27 may be applied.

The first modification of the second embodiment has been described above. According to the first modification of the second embodiment, even when the terminal apparatus that is not directly involved in the D2D communication determines the size of the data, the data is transmitted and received in the D2D communication by using the radio resource in consideration of the resending. As a result, the use efficiency of the radio resource can be improved.

Note that the ACK/NACK for the D2D communication between the slave apparatuses may be fed back not only to the master apparatus but to the base station 10. This feedback may be performed on the channel such as the PUSCH or PUCCH. When the feedback to the base station 10 is present, the base station 10 may also perform the resource control in consideration of the presence or absence (ACK/NACK) of the resending for the D2D communication between the slave apparatuses. For example, when the resending is present, the radio resource may be preferentially assigned to the LN (or the master apparatus) from a viewpoint of the time and/or a viewpoint of the amount of the radio resource, thereby allowing the notification of the usable radio resource in consideration of the resending by the base station. As a result, the use efficiency of the radio resource can be improved.

<4.5. Second Modification>

Next, with reference to FIG. 37, a second modification of the second embodiment will be described.

In the example of the second embodiment described above, the terminal apparatus 100-2 as the master apparatus assigns the radio resource for the D2D communication in the LN from among the radio resources reported by the base station 10 as a usable radio resource.

On the other hand, especially in the second modification of the second embodiment, the base station 10 directly assigns the radio resource for the D2D communication in the LN.

(Radio Resource Information Acquisition Unit 171)

Especially in the second modification of the second embodiment, the radio resource usable for the D2D (D2D resource) is assigned by the base station 10 as the radio resource for the D2D communication, and reported by the base station 10. That is, the base station 10 directly assigns the radio resource for the D2D communication in the LN. The radio resource to be assigned becomes the D2D resource (radio resource usable for the D2D communication). The terminal apparatus 100-2 (for example, the terminal apparatus 100-2 as the master apparatus) is notified of the D2D resource.

Therefore, especially in the second modification of the second embodiment, when the terminal apparatus 100-2 is the master apparatus, the radio resource information acquisition unit 171 acquires the information related to the D2D resource to be reported to the base station 10.

(Flow of Processing)

Figure 37:
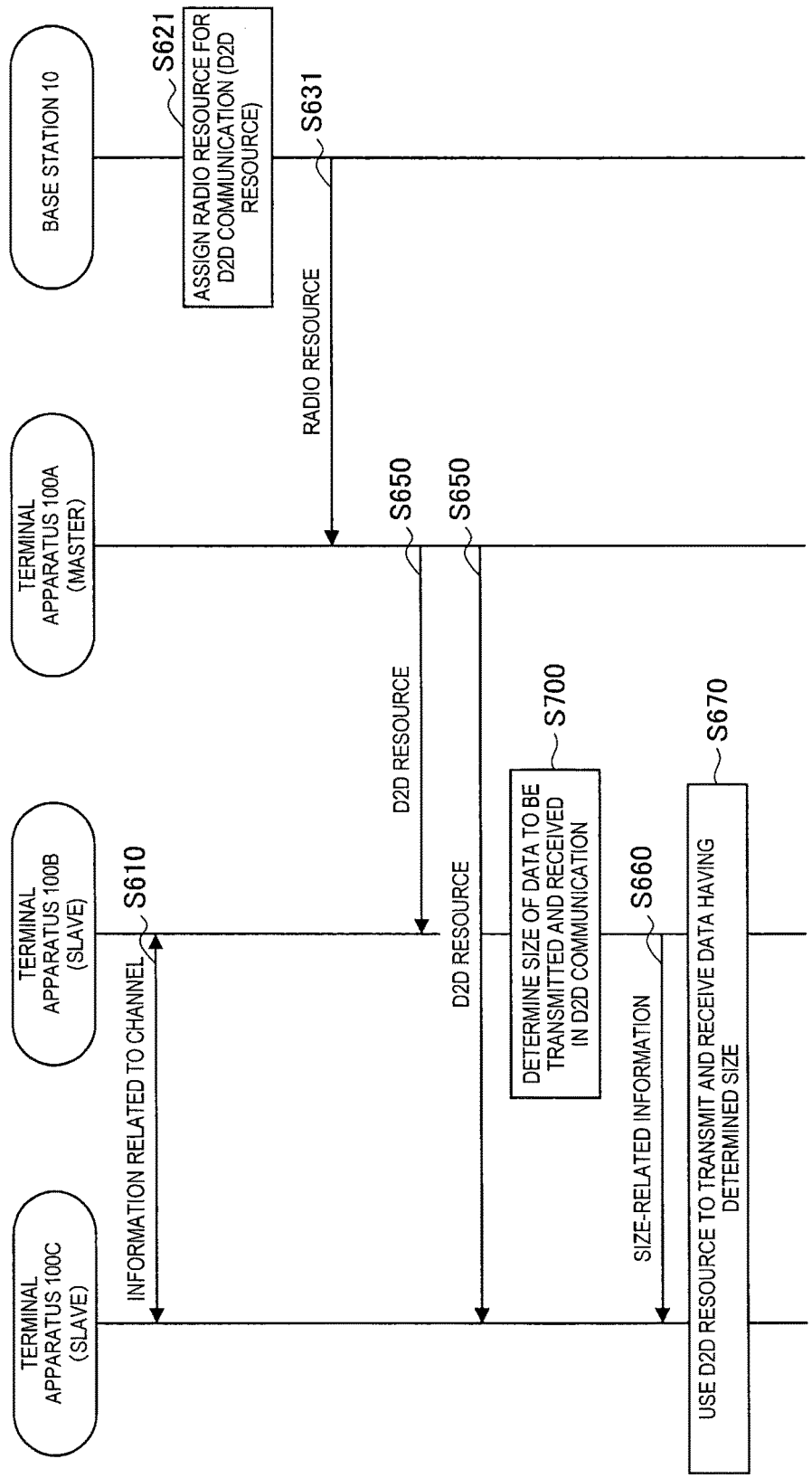
FIG. 37 is a sequence diagram illustrating an example of a schematic flow of communication control processing according to a second modification of the second embodiment.

Communication Control Processing According to Second Modification of Second Embodiment FIG. 37 is a sequence diagram illustrating an example of a schematic flow of the communication control processing according to the second modification of the second embodiment. In this example, the terminal apparatus 100B and the terminal apparatus 100C as the slave apparatus in the LN perform the D2D communication.

The difference between the first example according to the second embodiment shown in FIG. 34 and an example according to the second modification of the second embodiment shown in FIG. 37 is that Steps S620, S630 and S640 are included in the first example according to the second embodiment, but Steps S621 and S631, instead of these Steps, are included in the example according to the second modification of the second embodiment. Therefore, only Steps S621 and S631 are described here.

The base station 10, when a predetermined condition is satisfied, assigns the radio resource as a part of the radio resources controllable by the base station 10, as the resource for the D2D communication (S621). The assigned radio resource becomes the radio resource usable for the D2D communication (D2D resource).

The base station 10 then notifies the terminal apparatus 100A as the master apparatus of the D2D resource on any channel (for example, the PDCCH, PDSCH or PBCH) (S631).

Note that the base station 10 may notify the terminal apparatus 100B and the terminal apparatus 100C as the slave apparatus of the D2D resource.

The second modification of the second embodiment has been described above. According to the second modification of the second embodiment, the terminal apparatus 100-2 may not perform the resource control, therefor making it possible to reduce the load on the terminal apparatus 100-2.

Note that the second modification of the second embodiment may be combined with the first modification of the second embodiment. That is, also in the second modification of the second embodiment, similarly to the first modification of the second embodiment, the information related to the resending (ACK/NACK) may be fed back to the base station 10.

<4.6. Third Modification>

Next, with reference to FIG. 38 to FIG. 40, a third modification of the second embodiment will be described.

In the example of the second embodiment described above, the base station 10 notifies the terminal apparatus 100-2 of the usable radio resource (for example, the radio resource to be assigned to the LN, the radio resource to be assigned to the terminal apparatus 100-2, the radio resource not assigned, or the like). The terminal apparatus 100-2 as the master apparatus then assigns the radio resource for the D2D communication in the LN from among the radio resources reported by the base station 10.

On the other hand, especially in the third modification of the second modification, the usable radio resource is not reported by the base station 10, but estimated by the terminal apparatus 100-2.

(Radio Resource Information Acquisition Unit 171)

Especially in the third modification, the radio resource usable for the D2D communication (D2D resource) is a part or all of the radio resources estimated as a usable radio resource. For example, the radio resource information acquisition unit 171 estimates the usable radio resources. Then, for example, the radio resource information acquisition unit 171 assigns a part or all of the estimated radio resources as the radio resource for the D2D communication, and acquires the radio resource information related to the radio resource (that is, the D2D resource). Note that the radio resource information acquisition unit 171 may consider the estimated radio resource as the D2D resource to acquire the radio resource information related to the estimated radio resource.

Note that the example of the estimated radio resource, and the apparatus that performs the estimation are similar to the content described in the fourth modification of the first embodiment.

(Flow of Processing)

Communication Control Processing According to Third Modification of Second Embodiment (in Case of Estimation by Master Apparatus)

Figure 38:
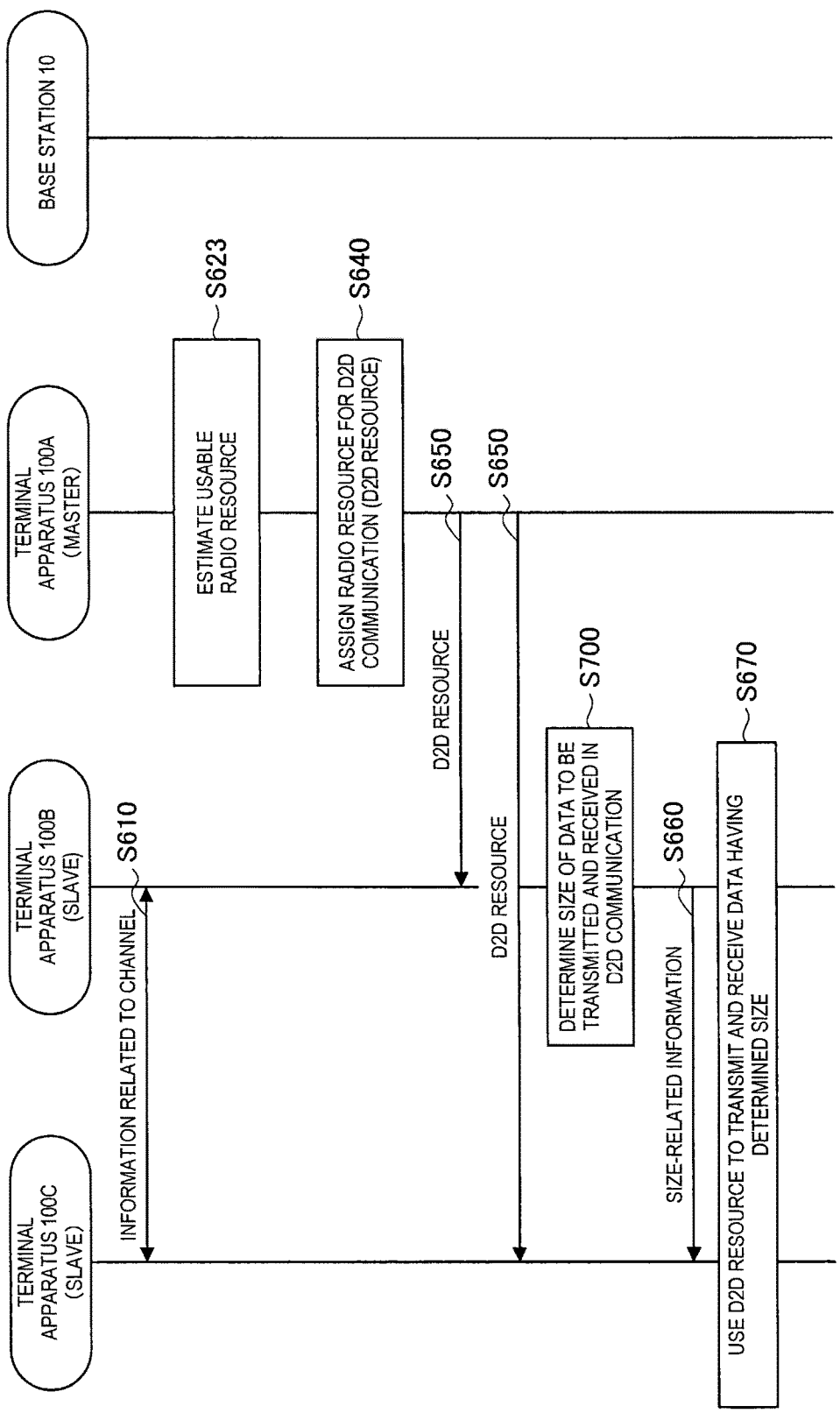
FIG. 38 is a sequence diagram illustrating a first example of a schematic flow of communication control processing according to a third modification of the second embodiment.

FIG. 38 is a sequence diagram illustrating a first example of a schematic flow of communication control processing according to the third modification of the second embodiment. In this example, the usable radio resources are estimated by the master apparatus. Then, the radio resource for the D2D communication is assigned from among the estimated radio resources.

The difference between the first example according to the second embodiment shown in FIG. 34 and an example according to the third modification of the second embodiment shown in FIG. 38 is that Steps S620 and S630 are included in the first example according to the second embodiment, but Step S623, instead of these Steps, is included in the first example according to the third modification of the second embodiment. Therefore, Step S623 is described here.

The terminal apparatus 100A (radio resource information acquisition unit 171) as the master apparatus estimates the usable radio resource (S623).

Communication Control Processing According to Third Modification of Second Embodiment (in Case of Estimation by Two or More Apparatuses)

Figure 39:
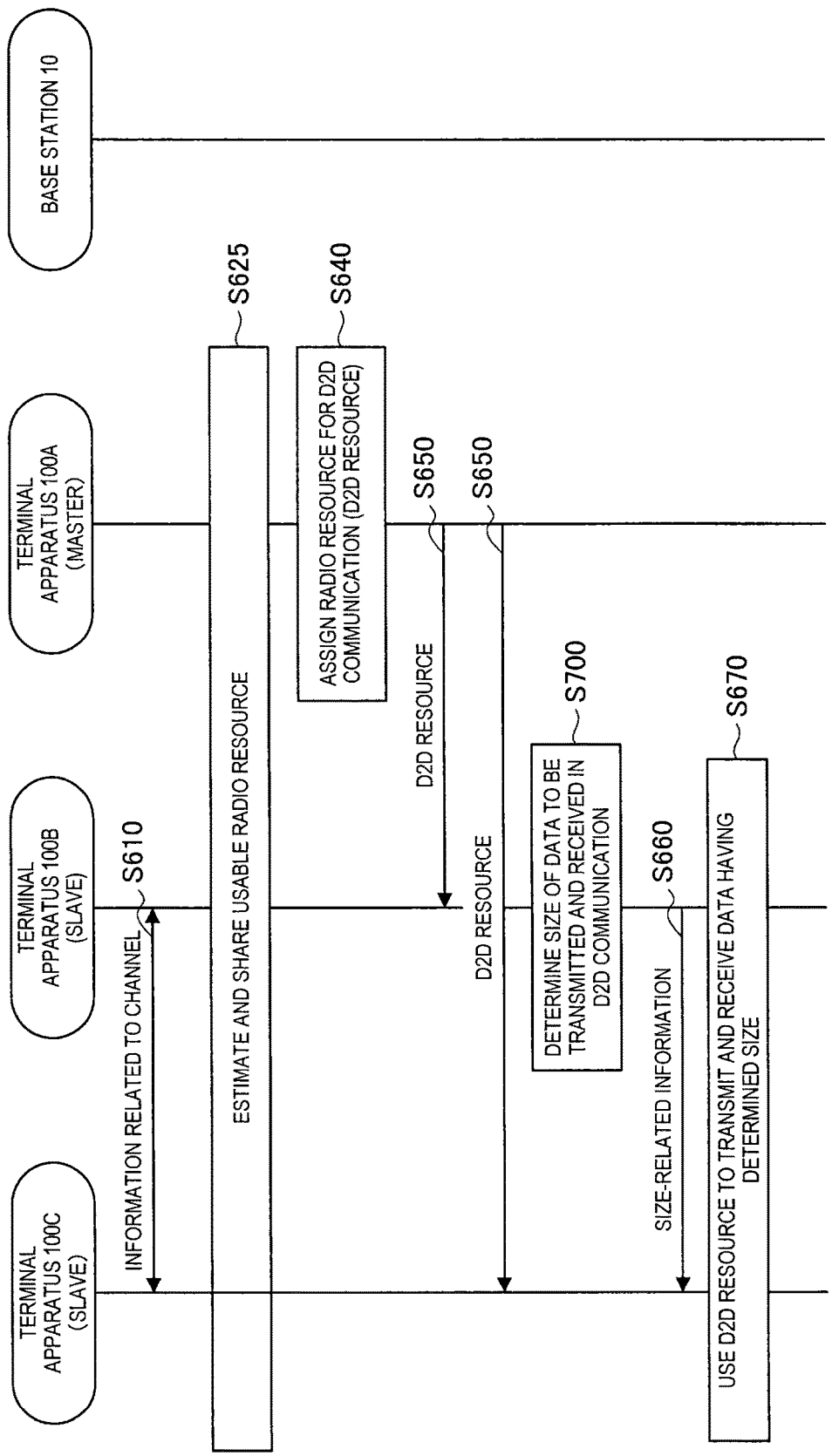
FIG. 39 is a sequence diagram illustrating a second example of a schematic flow of communication control processing according to a third modification of the second embodiment.

FIG. 39 is a sequence diagram illustrating a second example of a schematic flow of communication control processing according to the third modification of the second embodiment. In this example, the usable radio resources are estimated by the master apparatus and slave apparatus, and shared. Then, the radio resource for the D2D communication is assigned from among the estimated radio resources.

The difference between the first example according to the third modification of the second embodiment shown in FIG. 38 and the second example according to the third modification of the second embodiment shown in FIG. 39 is that Step S623 is included in the first example, but Step S625, instead of Step S623, is included in the second example. Therefore, Step S325 is described here.

The terminal apparatus 100A as the master apparatus, and the terminal apparatus 100B and the terminal apparatus 100C as the slave apparatus assume the usable radio resource, and share it (S625).

Communication Control Processing According to Third Modification of Second Embodiment (in Case of No Resource Assignment)

Figure 40:
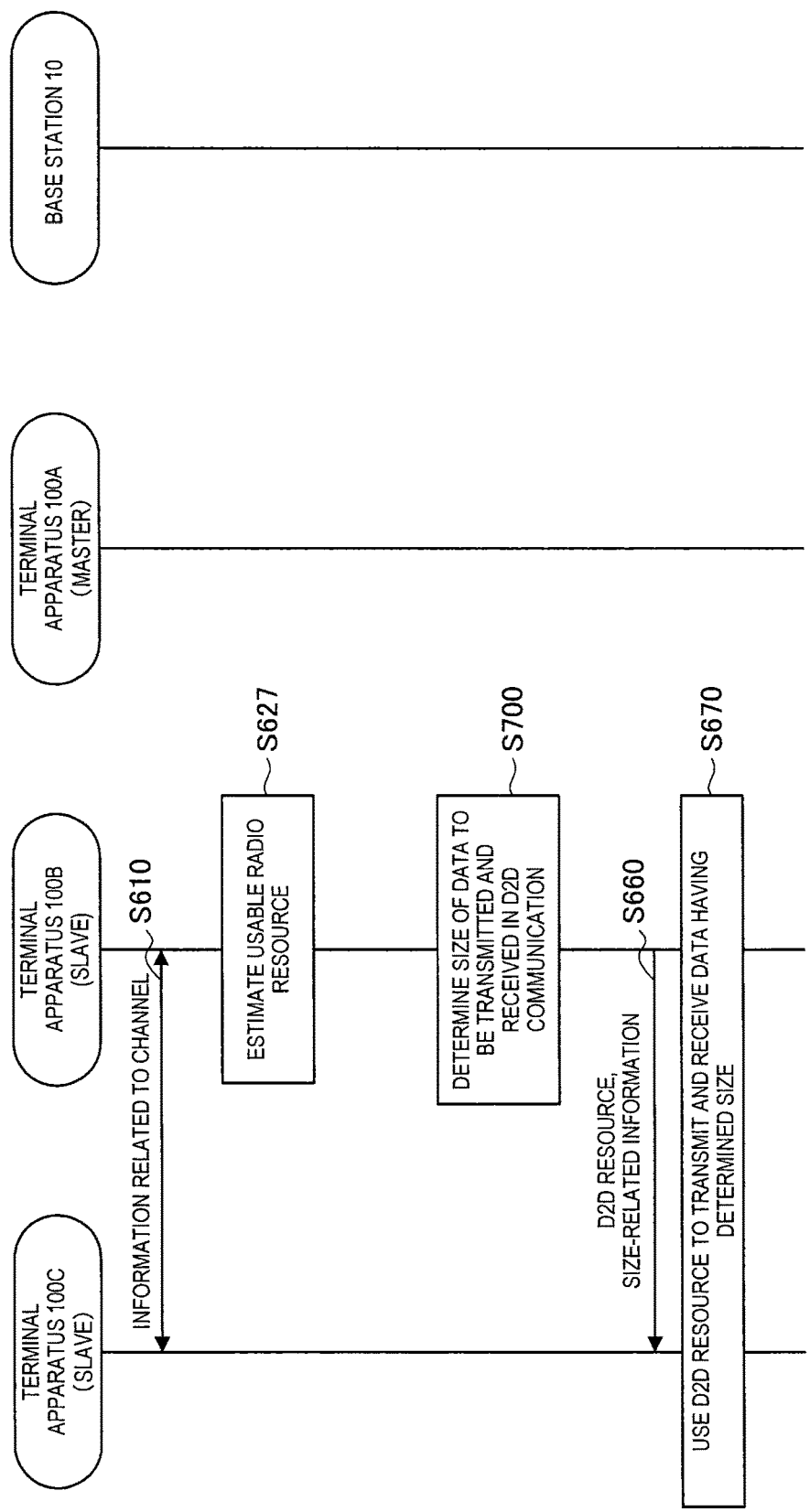
FIG. 40 is a sequence diagram illustrating a third example of a schematic flow of communication control processing according to a third modification of the second embodiment.

FIG. 40 is a sequence diagram illustrating a third example of the schematic flow of the communication control processing according to the third modification of the second embodiment. In this example, the usable radio resource is estimated by the master apparatus. Then, the estimated radio resource is considered as a radio resource usable for the D2D communication (D2D resource). That is, the radio resource for the D2D communication is not assigned.

The difference between the first example according to the third modification of the second embodiment shown in FIG. 38 and the third example according to the third modification of the second embodiment shown in FIG. 40 is that Steps S623, S640, S650 and D660 are included in the first example, but Steps S627 and S661, instead of these Steps, are included in the third example. Therefore, Steps S627 and S661 are described here.

The terminal apparatus 100B (radio resource information acquisition unit 171) estimates the usable radio resource (S627). Then, in this example, the estimated radio resource becomes the radio resource usable for the D2D communication (D2D resource).

The terminal apparatus 100B notifies the terminal apparatus 100C as the apparatus on the opposite side in the D2D communication of the D2D resource and the size-related information (S661).

Note that the example that the apparatus that performs the D2D communication is only the slave apparatus has been described, but the apparatus that performs the D2D communication may include the master apparatus. Further, the example that the one apparatus (terminal apparatus 100B) performs the estimation has been described, but another apparatus (the terminal apparatus 100A or terminal apparatus 100C) may perform the estimation, or the two or more apparatuses (for example, the terminal apparatus 100A, terminal apparatus 100B and terminal apparatus 100C) may perform the estimation.

The third modification of the second embodiment has been described above. According to the third modification of the second embodiment, the base station 10 may not perform the resource control for the D2D communication. Therefore, even when the D2D communication is performed, the load on the base station 10 can be suppressed.

5. Third Embodiment

Subsequently, with reference to FIG. 41 to FIG. 46, a third embodiment of the present disclosure will be described.

<5.1. Outline>

First, with reference to FIG. 41, an outline of the second embodiment will be described. In the third embodiment, the D2D communication individually performed as described with reference to FIG. 11 is adopted as a form of the D2D communication. That is, the LN is not adopted unlike the first embodiment and the second embodiment. Then, the size of the data to be transmitted and received in the D2D communication is determined by the apparatus that performs the D2D communication. A specific example of this point will be described with reference to FIG. 41.

Figure 41:
FIG. 41 is an explanatory diagram for explaining an outline of a third embodiment.

FIG. 41 is an explanatory diagram for explaining the outline of the third embodiment. With reference to FIG. 41, the two terminal apparatuses 100 that perform the D2D communication are shown. In this example, the terminal apparatus 100A and the terminal apparatus 100B perform the D2D communication. At least one of the terminal apparatus 100A and the terminal apparatus 100B that perform the D2D communication determines the data to be transmitted and received in the D2D communication.

<5.2. Function Configuration of Terminal Apparatus>

Figure 42:
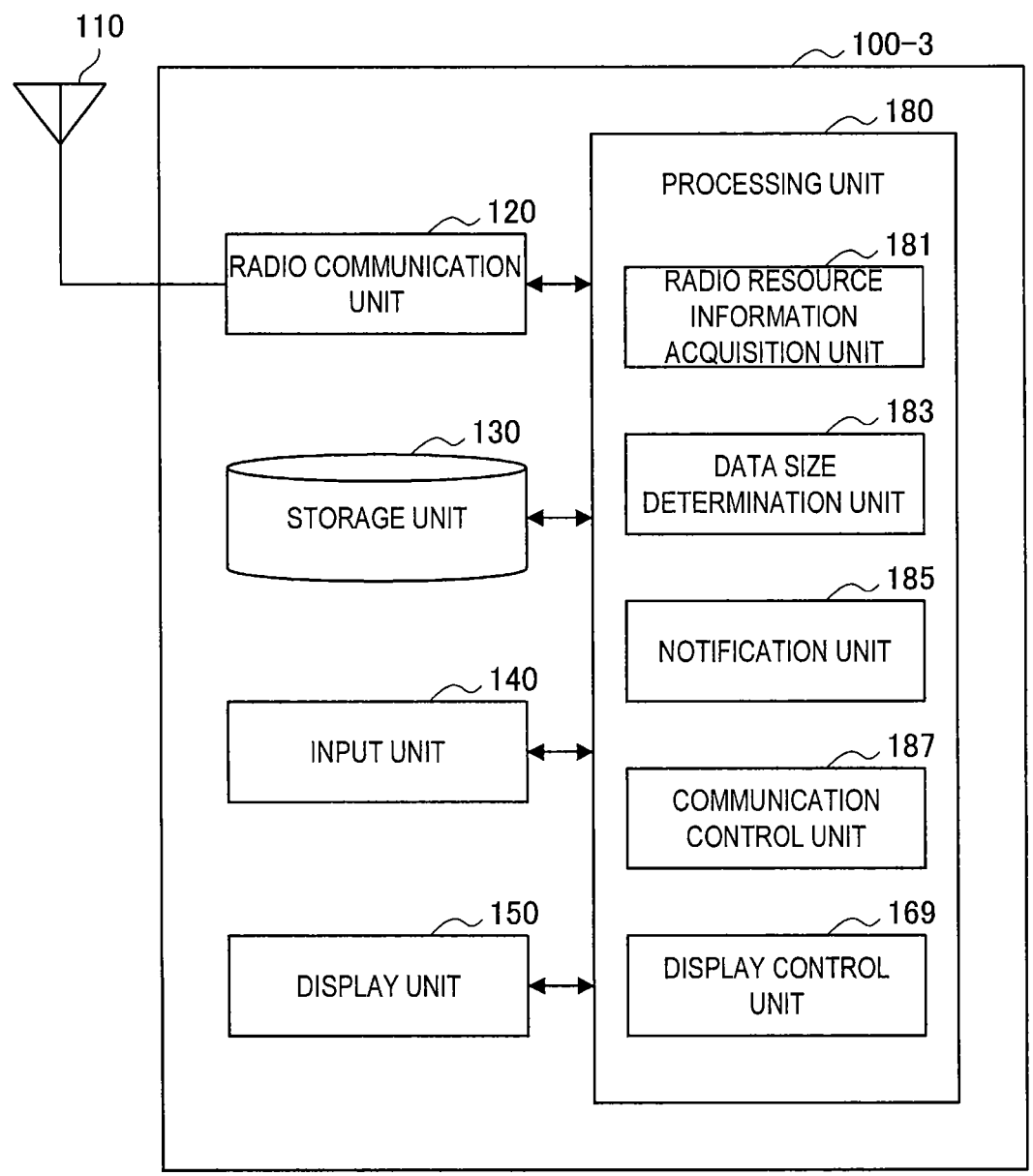
FIG. 42 is a block diagram illustrating an example of a function configuration of a terminal apparatus according to the third embodiment.

With reference to FIG. 42, an example of a function configuration of a terminal apparatus 100-3 according to the third embodiment will be described. FIG. 42 is a block diagram illustrating an example of the function configuration of the terminal apparatus 100-3 according to the third embodiment. With reference to FIG. 42, the terminal apparatus 100-3 includes an antenna unit 110, a radio communication unit 120, a storage unit 130, an input unit 140, a display unit 150, and a processing unit 180.

Here, in the antenna unit 110, the radio communication unit 120, the storage unit 130, the input unit 140, the display unit 150, and the display control unit 169 included in a processing unit 180, there is no deference in particular between the first embodiment and the second embodiment. Therefore, a radio resource information acquisition unit 181, a data size determination unit 183, a notification unit 185 and a communication control unit 187 included in the processing unit 180 are described here.

(Radio Resource Information Acquisition Unit 181)

The radio resource information acquisition unit 181 acquires the information related to the usable radio resource.

Radio Resource Usable for Radio Communication Between Base Station and Terminal Apparatus For example, the radio resource information acquisition unit 181 acquires the information related to the radio resource usable for the radio communication between the base station 10 and a terminal apparatus 100-3 among the radio resources controllable by the base station 10. A content of this point is the same as that described in the first embodiment.

Radio Resource Usable for D2D Communication (D2D Resource)

Especially in an embodiment according to the present disclosure, the radio resource information acquisition unit 181 acquires the radio resource information related to the radio resource usable for the D2D communication (D2D resource), not via the base station 10. As described above, the radio resources controllable by the base station 10 are, for example, the radio resources that can be assigned by the base station 10.

In the third embodiment, the terminal apparatus 100-3 is notified of the D2D resource by the base station 10. The radio resource information acquisition unit 181 then acquires the radio resource information related to the D2D resource reported by the base station 10.

(Data Size Determination Unit 183)

The data size determination unit 183 determines the size of the data to be transmitted and received in the D2D communication on the basis of the radio resource information related to the D2D resource.

Especially in the third embodiment, when the terminal apparatus 100-3 perform the D2D communication, the data size determination unit 183 determines the size. Note that, when the other apparatus that performs the D2D communication determines the size and notifies the terminal apparatus 1000-3 of the size, the data size determination unit 183 may not determine the size. As an example, the data size determination unit 183, when the terminal apparatus 100-3 is the apparatus on the transmitting side in the D2D communication, may determine the size, and when the terminal apparatus 100-3 is the apparatus on the receiving side in the D2D communication, may not determine the size.

Note that a specific method for determining the size is similar to the content described in the first embodiment.

(Notification Unit 185)

The notification unit 185 notifies another apparatus that performs the D2D communication of the size-related information related to the size to be determined. Especially in the third embodiment, when the terminal apparatus 100-3 performs the D2D communication and determines the size, the notification unit 185 notifies another apparatus that performs the D2D communication of the size-related information.

Note that a specific content of the size-related information to be reported, and a specific method for the notification are similar to the content described in the first embodiment.

(Communication Control Unit 187)

The communication control unit 187 controls radio communication by the terminal apparatus 100-3. For example, when the terminal apparatus 100-3 performs radio communication with the base station 10, the communication control unit 187 controls radio communication with the base station 10 by the terminal apparatus 100-3.

Especially in an embodiment according to the present disclosure, the communication control unit 187 controls the D2D communication by the terminal apparatus 100-3. Specifically, when the terminal apparatus 100-3 performs the D2D communication, the communication control unit 187 uses the radio resource (D2D resource) usable for the D2D communication, to transmit or receive the data having the determined data size.

Note that, in the third embodiment, the terminal apparatus 100-3, when performing the D2D communication and not determining the size of the data to be transmitted and received in the D2D communication, is notified of the size-related information by another apparatus that performs the D2D communication. In this case, the terminal apparatus 100-3 can identify the size of the data to be transmitted and received in the D2D communication by a method similar to the method described in the first embodiment.

<5.3. Flow of Processing>

Figure 43:
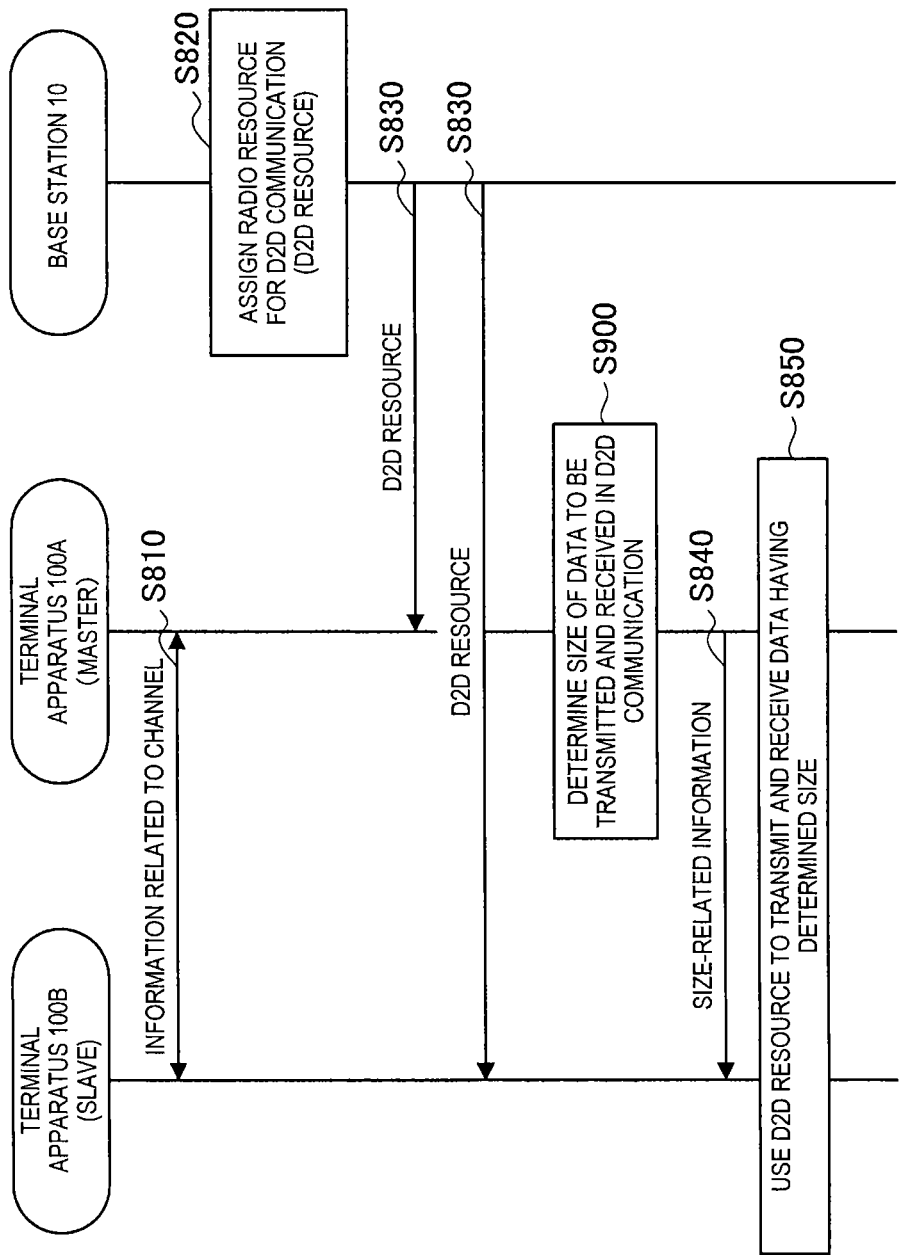
FIG. 43 is a sequence diagram illustrating an example of a schematic flow of communication control processing according to the third embodiment.

Next, with reference to FIG. 43, the communication control processing according to the third embodiment will be described. FIG. 43 is a sequence diagram illustrating an example of a schematic flow of the communication control processing according to the third embodiment.

The terminal apparatus 100 estimates a state of the channel that can be used for the D2D communication. For example, the terminal apparatus 100 estimates the state of the channel by receiving the reference signal to be transmitted by another terminal apparatus 100. Then, for example, the information related to the channel is fed back between the terminal apparatuses 100 that performs the D2D communication (S810). The information related to the channel is the channel state information (CSI), and includes the CQI, RI, PMI, RSRP, RSRQ, and the like. Note that the information related to the channel may be fed back also to the base station 10.

Further, the base station 10, when a predetermined condition is satisfied, assigns the radio resource as a part of the radio resources controllable by the base station 10 to the terminal apparatus 100 that performs the D2D communication (S820). Note that, when the information related to the channel is fed back also to the base station 10, the base station 10 may assign the radio resource in consideration of the information.

The base station 10 then notifies the terminal apparatuses 100 (that is, the terminal apparatus 100A and terminal apparatus 100B) of the radio resource assigned to the terminal apparatuses that perform the D2D communication on any channel (for example, the PDCCH, PDSCH or PBCH) (S830).

Then, the terminal apparatus 100B (data size determination unit 183) as one of the apparatuses that perform the D2D communication determines the size of the data to be transmitted and received in the D2D communication (S900). A flow of the processing will be described later.

Then, the terminal apparatus 100B (notification unit 185) notifies another apparatus that performs the D2D communication (the terminal apparatus 100C) of the size-related information related to the determined size (S840). Note that the D2D resource may be reported together with the size-related information.

Thereafter, the terminal apparatus 100B and the terminal apparatus 100C use the D2D resource to transmit and receive the data having the determined size (S850).

In the third embodiment, as an example of the processing of determining the size of the data to be transmitted and received in the D2D communication (S900), the first example (FIG. 19), the second example (FIG. 20), the fourth example (FIG. 22) and the fifth example (FIG. 23) among the examples of the processing described in the first embodiment may be applied.

<5.4. First Modification>

Next, with reference to FIG. 44, a first modification of the third embodiment will be described.

In the third embodiment, the apparatus that performs the D2D communication determines the size of the data to be transmitted and received in the D2D communication. The base station 10 is not directly involved in the D2D communication, but assigns the radio resource for the D2D communication. Therefore, in the third embodiment described above, the base station 10 will assign the radio resource for the D2D communication without acquiring whether or not the resending for the D2D communication is present (that is, the ACK/NACK for the D2D communication). As a result, the more radio resources than necessary are assigned to transmission of the data to be resent, possibly resulting in a waste of the radio resource. Further, the necessary radio resource is not assigned to the data to be resent, possibly taking a time for the resending.

Then, according to the first modification of the third embodiment, the terminal apparatus 100 that performs the D2D communication feeds back the information related to the resending for the D2D communication (for example, the ACK/NACK) to the base station 10, and the base station 10 performs the resource control in consideration of the presence or absence of the resending.

(Communication Control Unit 187)

Especially in the first modification of the third embodiment, when the terminal apparatus 100-3 performs the D2D communication, the communication control unit 187 feeds back the information related to the resending for the D2D communication to the base station 10 via the radio communication unit 120. For example, as the information related to the resending, the ACK/NACK for the D2D communication is fed back to the base station 10. Note that, for example, the radio resource for such feedback may be assigned by the base station 10.

(Flow of Processing)

Figure 44:
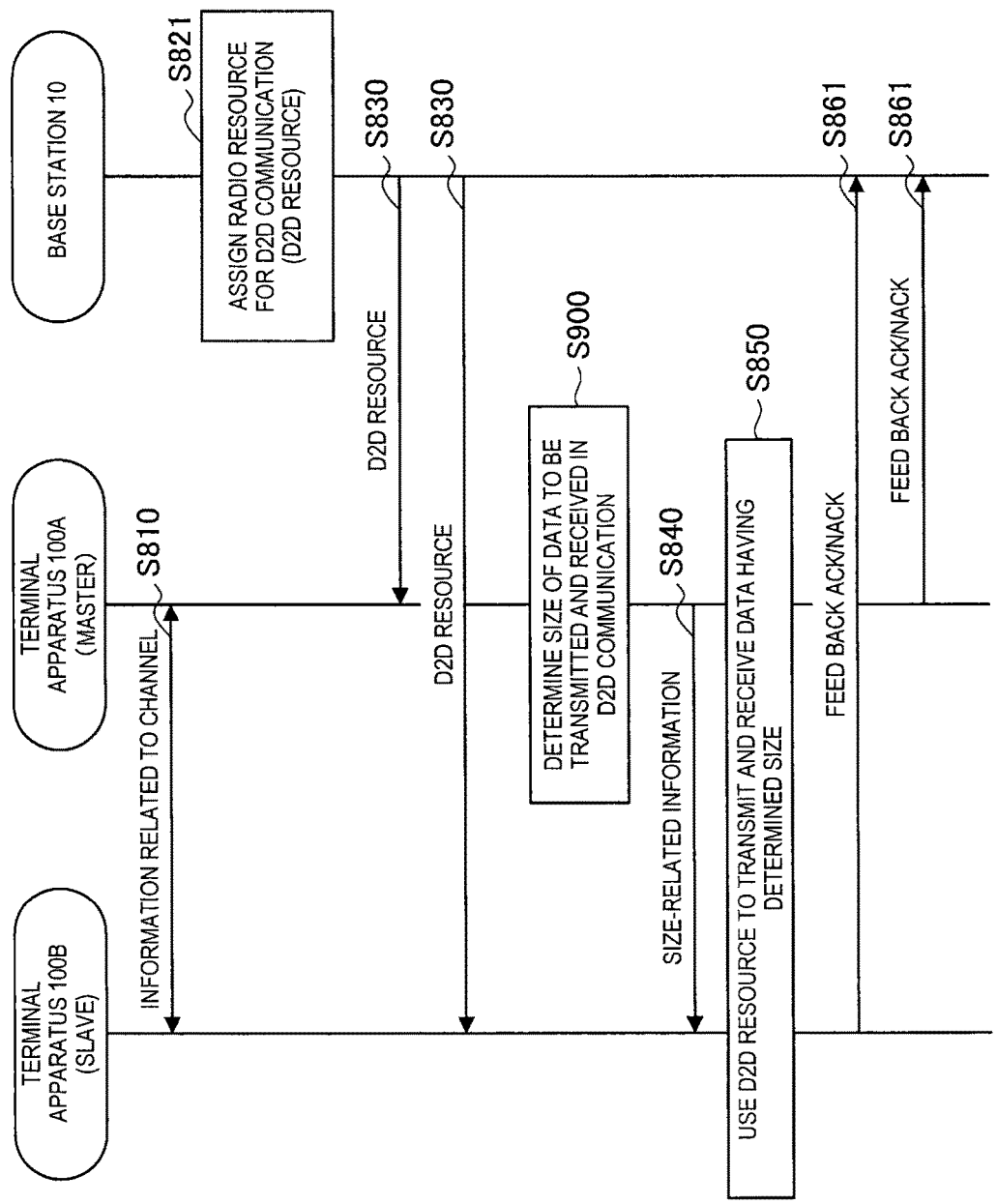
FIG. 44 is a sequence diagram illustrating an example of a schematic flow of communication control processing according to a first modification of the third embodiment.

FIG. 44 is a sequence diagram illustrating an example of a schematic flow of communication control processing according to a first modification of the third embodiment.

The difference between an example according to the third embodiment shown in FIG. 43 and an example according to the first modification of the third embodiment shown in FIG. 44 is that Step S820 is included in the example according to the third embodiment, but Steps S821 and S861, instead of Step S820, are included in the example according to the first modification of the third embodiment. Therefore, only Steps S821 and S861 are described here.

After transmission and reception of the data in the D2D communication (S850), the ACK/NACK is fed back between the terminal apparatus 100A and the terminal apparatus 100B that perform the D2D communication. Further, the ACK/NACK is fed back from the terminal apparatus 100A and/or the terminal apparatus 100B to the base station 10 (S861).

Furthermore, the base station 10 considers whether or not the D2D communication between the terminal apparatus 100A and the terminal apparatus 100B (that is, the target transmission) is the resending, to assign the radio resource for the D2D communication (S821). The assigned radio resource becomes the radio resource usable for the D2D communication (D2D resource).

The first modification of the third embodiment has been described above. According to the first modification of the third embodiment, the data is transmitted and received in the D2D communication by the radio resource in consideration of the resending. As a result, the use efficiency of the radio resource can be improved.

<5.5. Second Modification>

Next, with reference to FIG. 45 and FIG. 46, a second modification of the third embodiment will be described.

In the example of the third embodiment described above, the base station 10 notifies the terminal apparatus 100-3 of the usable radio resource (for example, the radio resource to be assigned to the terminal apparatus 100-3, and the radio resource not assigned).

On the other hand, especially in the second modification of the third modification, the usable radio resource is not reported by the base station 10, but estimated by the terminal apparatus 100-3.

(Radio Resource Information Acquisition Unit 181)

Especially in the second modification, the radio resource usable for the D2D communication (D2D resource) is a part or all of the radio resources estimated as a usable radio resource. For example, the radio resource information acquisition unit 181 estimates the usable radio resource. Then, for example, the radio resource information acquisition unit 181 considers the estimated radio resource as the D2D resource to acquire the radio resource information related to the estimated radio resource.

Note that the example of the estimated radio resource, and the apparatus that performs the estimation are similar to the content described in the fourth modification of the first embodiment.

(Flow of Processing)

Communication Control Processing According to Second Modification of Third Embodiment (in Case of Estimation by One Apparatus)

Figure 45:
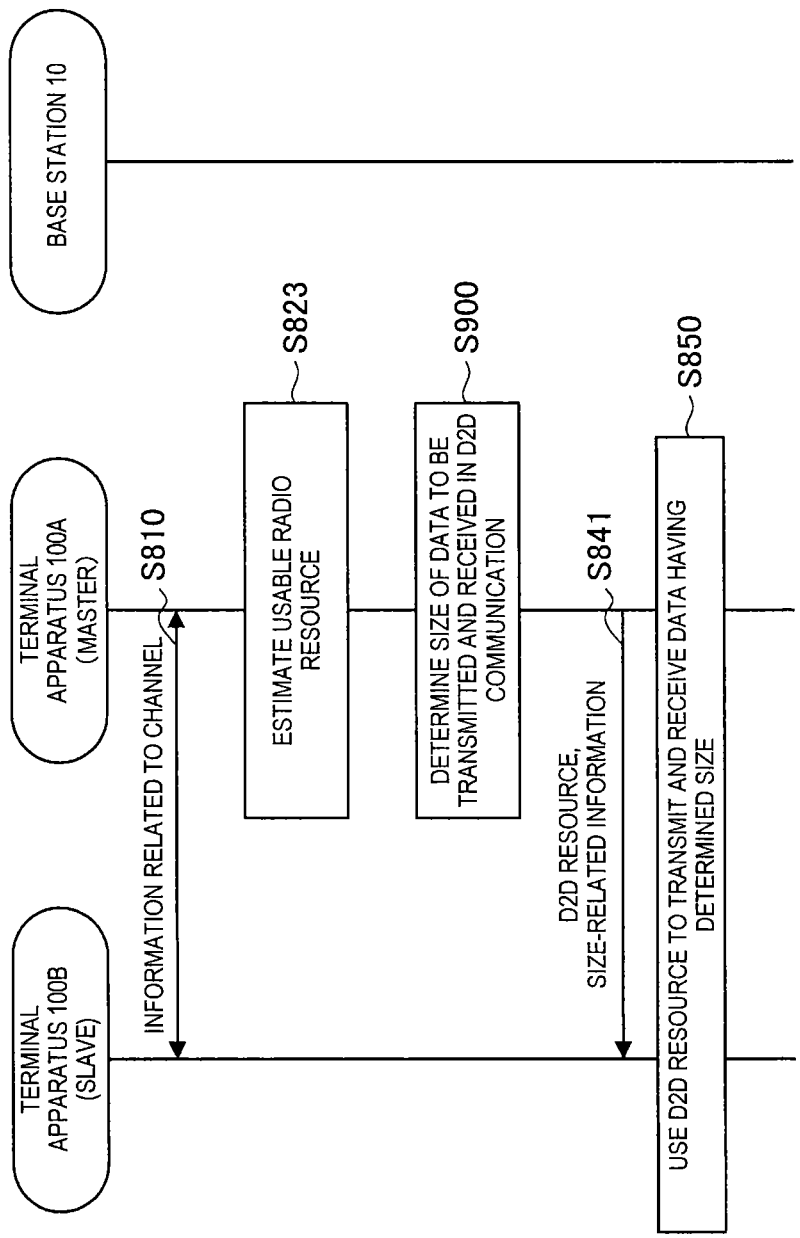
FIG. 45 is a sequence diagram illustrating a first example of a schematic flow of communication control processing according to a second modification of the third embodiment.

FIG. 45 is a sequence diagram illustrating a first example of a schematic flow of the communication control processing according to the second modification of the third embodiment. In this example, the usable radio resource is estimated by the one apparatus that performs the D2D communication. Then, the estimated radio resource becomes the radio resource for the D2D communication (D2D resource).

The difference between an example according to the third embodiment shown in FIG. 43 and an example according to the second modification of the third embodiment shown in FIG. 45 is that Steps S820, S830 and S840 are included in the example according to the third embodiment, but Steps S823 and S841, instead of these Steps, are included in the first example according to the third modification of the second embodiment. Therefore, only Steps S823 and S841 are described here.

The terminal apparatus 100A (radio resource information acquisition unit 181) that performs the D2D communication estimates the usable radio resource (S823).

The terminal apparatus 100A notifies the terminal apparatus 100B as the apparatus on the opposite side in the D2D communication of the D2D resource and the size-related information (S841).

Communication Control Processing According to Second Modification of Third Embodiment (in Case of Estimation by Both Apparatuses)

Figure 46:
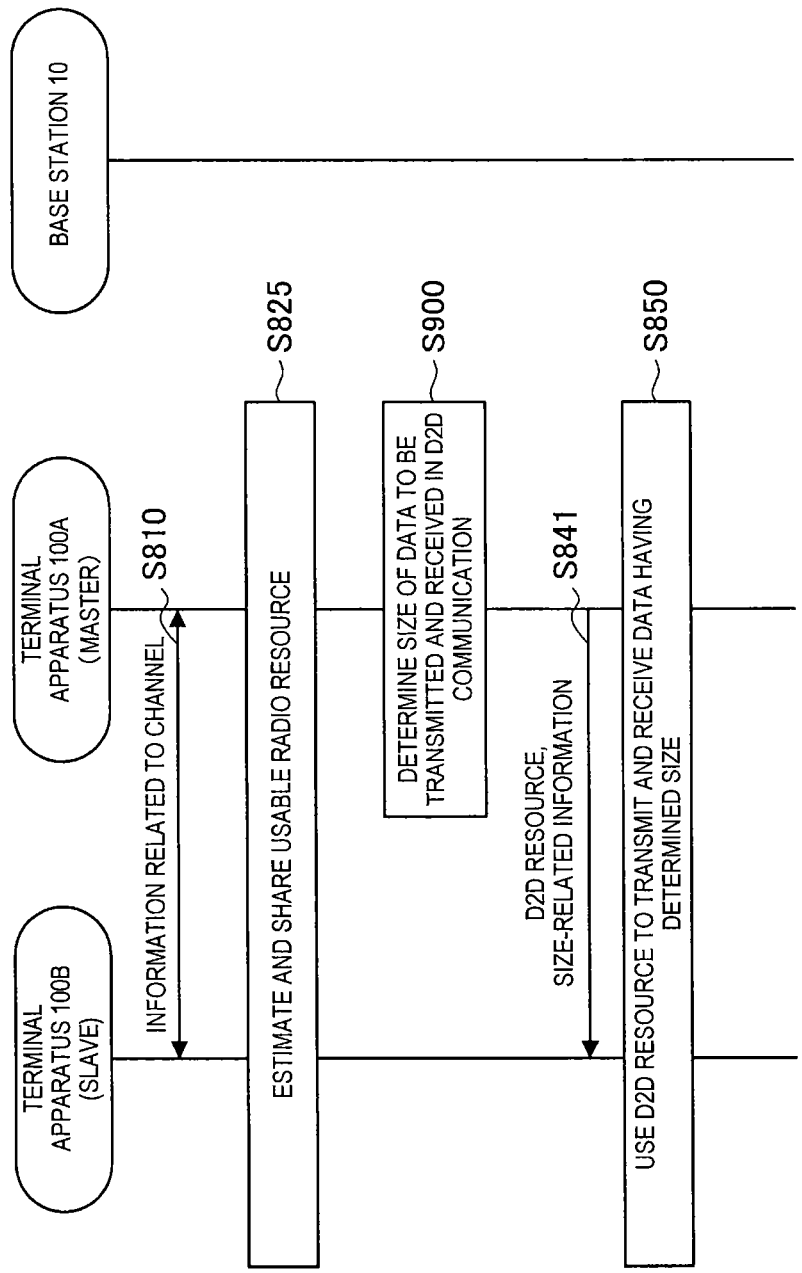
FIG. 46 is a sequence diagram illustrating a second example of a schematic flow of communication control processing according to a second modification of the third embodiment.

FIG. 46 is a sequence diagram illustrating a second example of a schematic flow of the communication control processing according to the second modification of the third embodiment. In this example, the usable radio resource is estimated by both apparatuses that perform the D2D communication. Then, the estimated radio resource becomes the radio resource for the D2D communication (D2D resource).

The difference between the first example according to the second modification of the third embodiment shown in FIG. 45 and the second example according to the second modification of the third embodiment shown in FIG. 45 is that Step S823 is included in the first example, but Step S825, instead of Step S823, is included in the second example. Therefore, Step S825 is described here.

The terminal apparatus 100A and the terminal apparatus 100B that perform the D2D communication assume the usable radio resource, and share it (S825).

The second modification of the third embodiment has been described above. According to the second modification of the third embodiment, the base station 10 may not perform the resource control for the D2D communication. Therefore, even when the D2D communication is performed, the load on the base station 10 can be suppressed.

6. Related Periphery Operation

Subsequently, with reference to FIG. 47 to FIG. 53, a related periphery operation will be described.

(Upper Limit of Transmission Power)

Normally, in the radio communication between the base station and the terminal apparatus, the terminal apparatus performs transmission power control. In this case, a maximum value or an upper limit of transmission power of the terminal apparatus 100 is specified. As an example, an upper limit of 23 dBm is specified.

Meanwhile, a distance between the nodes may be short in the D2D communication compared with radio communication between the base station and the terminal apparatus (that is, normal radio communication). Therefore, the transmission power of the terminal apparatus in the D2D communication may be likely to be smaller than the transmission power of the terminal apparatus in radio communication between the base station 10 and the terminal apparatus.

Therefore, the upper limit of the transmission power in the D2D communication may be specified separately from the upper limit of the transmission power in the normal radio communication. Further, the upper limit of the transmission power in the D2D communication may be lower than the upper limit of the transmission power in the normal radio communication.

This can reduce the interference caused by the terminal apparatus that performs the D2D communication, preventing setting of excessive power of the terminal apparatus.

(Selection of Modulation Scheme and Encoding Scheme)

For example, in the LTE, in radio communication between the base station and the terminal apparatus (that is, normal radio communication), measurement information such as the CQI, RI, PMI is periodically fed back from the terminal apparatus to the base station. Therefore, at the start of the normal radio communication, the modulation scheme and the encoding scheme corresponding to the channel state can be selected.

Meanwhile, in the case where the D2D communication is adopted, when the channel state between the terminal apparatuses in addition to the channel state between the terminal apparatus and the base station will be fed back, it may be difficult to secure the radio resource for the feedback.

As a countermeasure, as a first example, as described above, in the D2D communication, when the predetermined modulation scheme and the predetermined encoding scheme are used in the first communication, and the feedback of the channel state becomes possible after the communication, the appropriate modulation scheme and the encoding scheme are used.

As a second example, even when the feedback is impossible or the feedback is not present, if the reception has succeeded successively a predetermined number of continuous times on the basis of the ACK/NACK, the modulation scheme and/or the encoding scheme with the higher data rate is used.

As a third example, even when the feedback is impossible or the feedback is not present, if the reception has successively failed in a predetermined number of continuous times on the basis of the ACK/NACK, the modulation scheme and the encoding scheme with the lower data rate is used.

(Operation Related to RLC)

In a case of the communication system conforming to the LTE, an operation of a radio link control (RLC) sublayer of a layer 2 (L2) can be divided into the operation of the normal radio communication between the base station and the terminal apparatus and the operation of the D2D communication, thereby allowing the operation of the RLC in the D2D communication to be more simplified.

Figure 47:
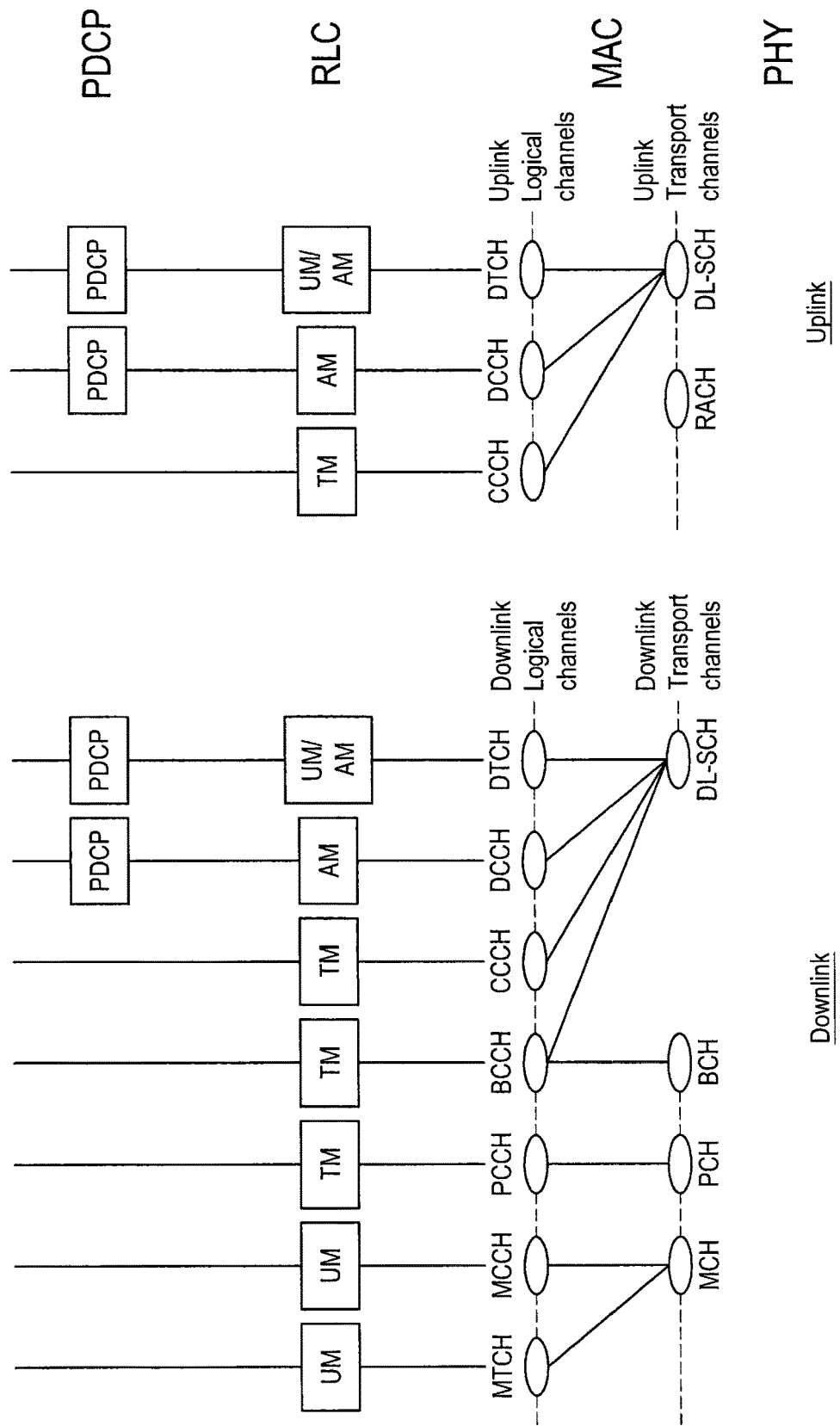
FIG. 47 is a first explanatory diagram for explaining a position of RLC in L2 of LTE.
Figure 48:
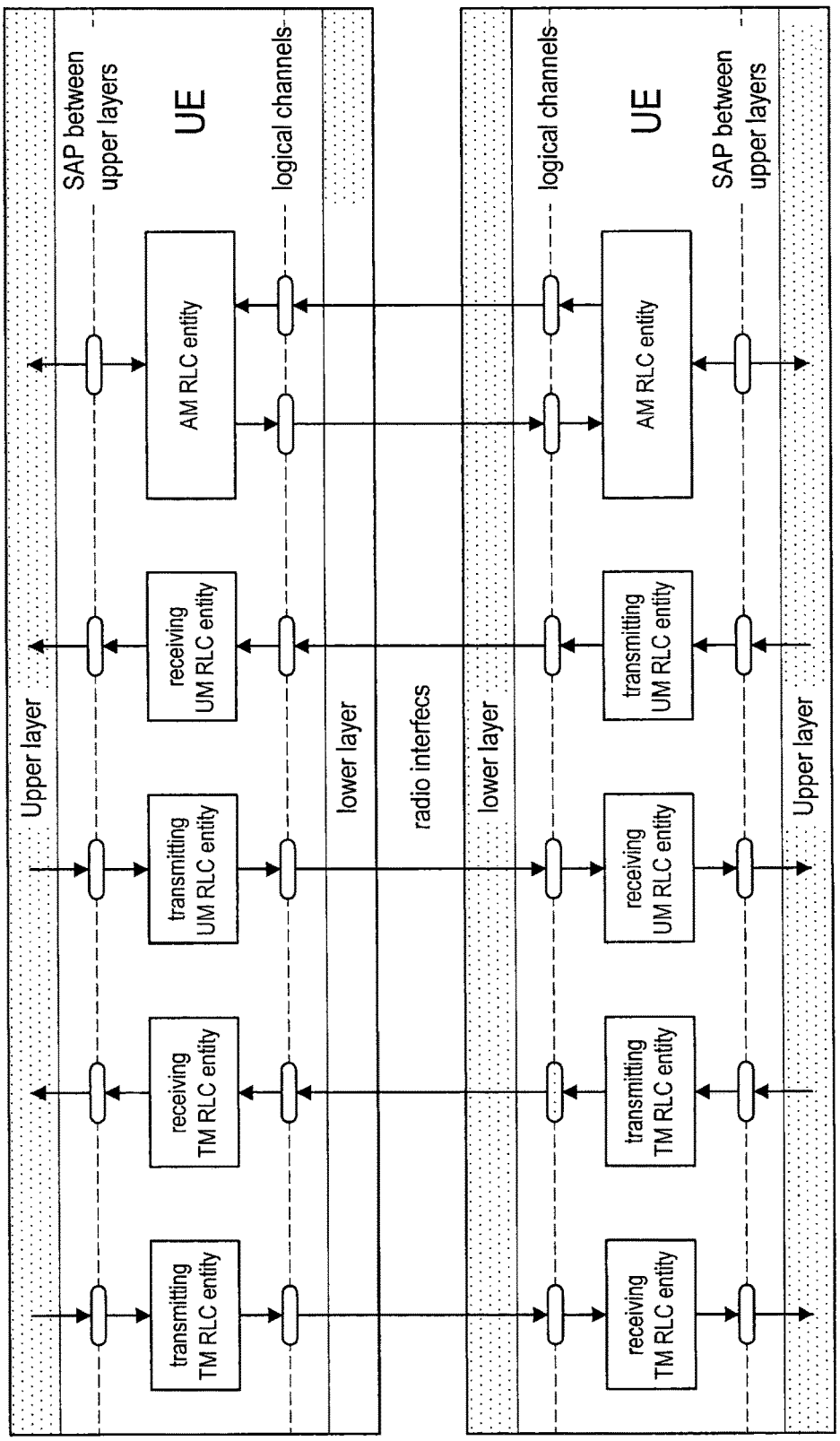
FIG. 48 is a second explanatory diagram for explaining a position of RLC in L2 of LTE.

FIG. 47 and FIG. 48 are an explanatory diagram for explaining a position of the RLC in the L2 of the LTE. As show in FIG. 47, as the sublayer of the L2, the medium access control (MAC), the RLC and the packet data convergence protocol (PDPC) are shown. The RLC has three modes of a transparent mode (TM), an unacknowledge mode (UM), and an acknowledge mode (AM). Each mode is related to a logical channel as an interface between the RLC and the subordinate MAC. Further, as shown in FIG. 48, the RLC is present in both of the eNodeB and the UE. Note that main functions of the RLC include integration and division of the data to be exchanged with the subordinate MAC, duplicate detection of the data delivered from the MAC, the ARQ, and the like.

The modes of the RLC and the logical channels are related to a type of data (control data, user data or the like). In the D2D communication, it is basically considered that the user data is transmitted and received between the terminal apparatuses. Therefore, only a part of the logical channels prepared for the normal radio communication (that is, the radio communication between the base station and the terminal apparatus) will be used in the D2D communication.

Therefore, in the D2D communication, the logical channels and the modes of the RLC can be limited in advance, thereby allowing the RLC to be simplified, and allowing error processing to be executed when inappropriate data is delivered to the RLC.

Figure 49:
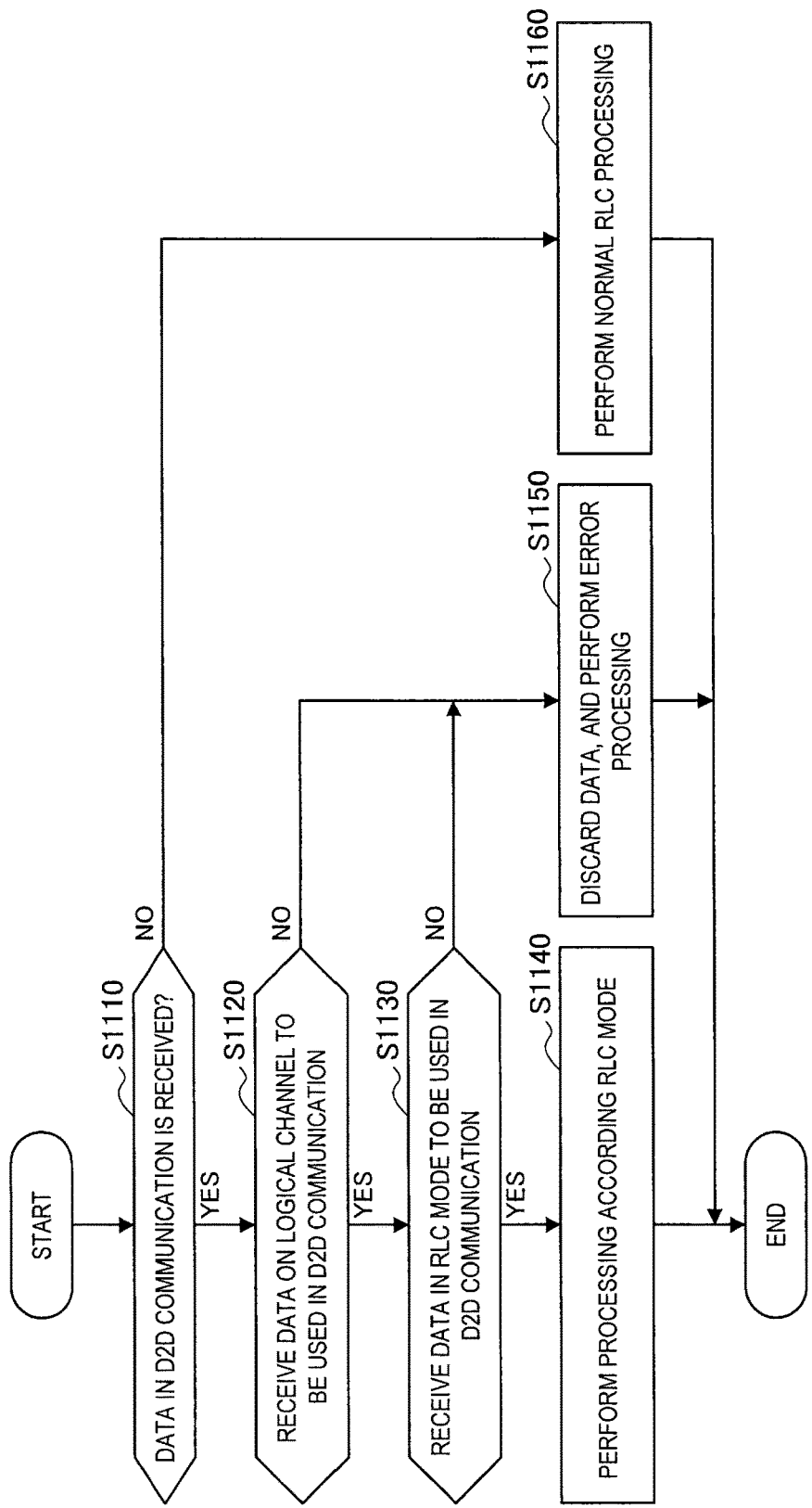
FIG. 49 is a flow chart illustrating an example of a schematic flow of processing of the RLC when the D2D communication is adopted.

FIG. 49 is a flow chart illustrating an example of a schematic flow of the processing of the RLC when the D2D communication is adopted. First, whether data of the D2D communication has been received is determined (S1110), and if the data of the D2D communication is not acquired, normal RLC processing is executed (S1160). When the data of the D2D communication is acquired, whether the data on the logical channel used in the D2D communication has been received is determined (S1120). When the received data is not the data on the logical channel, the data is discarded and error processing is performed (S1150). Further, whether the data in the RLC mode used in the D2D communication has been received is determined (S1130), when the received data is not the data in the RLC mode, the data is discarded and the error processing is performed (S1150). On the other hand, when the received data is the data in the RLC mode, processing according to the RLC mode is performed (S1140).

As a first example, in the D2D communication, only the UM and AM are used among the RLC modes. In this case, for example, the logical channel related to cell control is not used, and only a multicast control channel (MCCH), a multicast traffic channel (MTCH), a dedicated control channel (DCCH) and a dedicated traffic channel (DTCH) are used. Further, as a second example, in the D2D communication, only the AM is used among the RLC modes. In this case, the logical channel related to the cell control is not used, and only the DCCH and DTCH are used.

(Number of HARQ Processes)

Number of HARQ Processes Simultaneously Operating

In the LTE, the resending in a transport block unit is possible. When one transport block is generated for the new transmission, the one transport block is tied to one HARQ process. In the HARQ processes, operations of a series of transmission and reception, ACK/NACK, resending/reception (if necessary) are repeated until a predetermined condition is satisfied. The predetermined condition is to complete the correct reception of the transport block, to reach an upper limit of the number of resending, an end of a timer, or the like.

A maximum number of the HARQ processes simultaneously operating is specified. For example, the maximum number of the HARQ processes is 8 in each of the downlink and the uplink in the FDD. On the other hand, in the TDD, the maximum number is specified for each TDD configuration.

FIG. 50 is an explanatory diagram for explaining the maximum number of the HARQ processes related to the downlink of the TDD. In the 3GPP technology standard (TS 36.213), as shown in FIG. 50, the maximum number of the HARQ processes for downlink data is specified for each TDD configuration. The use of the maximum number of the HARQ processes allows the downlink data to be transmitted and received in each downlink subframe without generating a usage loss of the radio resource in any downlink subframe.

Separation of Maximum Number of HARQ Processes

As a first example, the maximum number of the HARQ processes may be set in each of the normal radio communication (that is, the radio communication between the base station and the terminal apparatus) and the D2D communication. This makes it possible to reduce an effect on the normal radio communication even when the D2D communication is adopted.

Furthermore, the maximum number of the HARQ processes for the D2D communication may be set to a value smaller than the maximum number of the HARQ processes for the normal radio communication. This is because it is considered that the possibility that a plurality of applications operate is lower in the D2D communication, so the number of the HARQ processes simultaneously operating may be also smaller. As a result, it is possible to reduce an amount of a memory required for the HARQ processes, and suppress power consumption by the operation of the HARQ processes.

Figure 51:
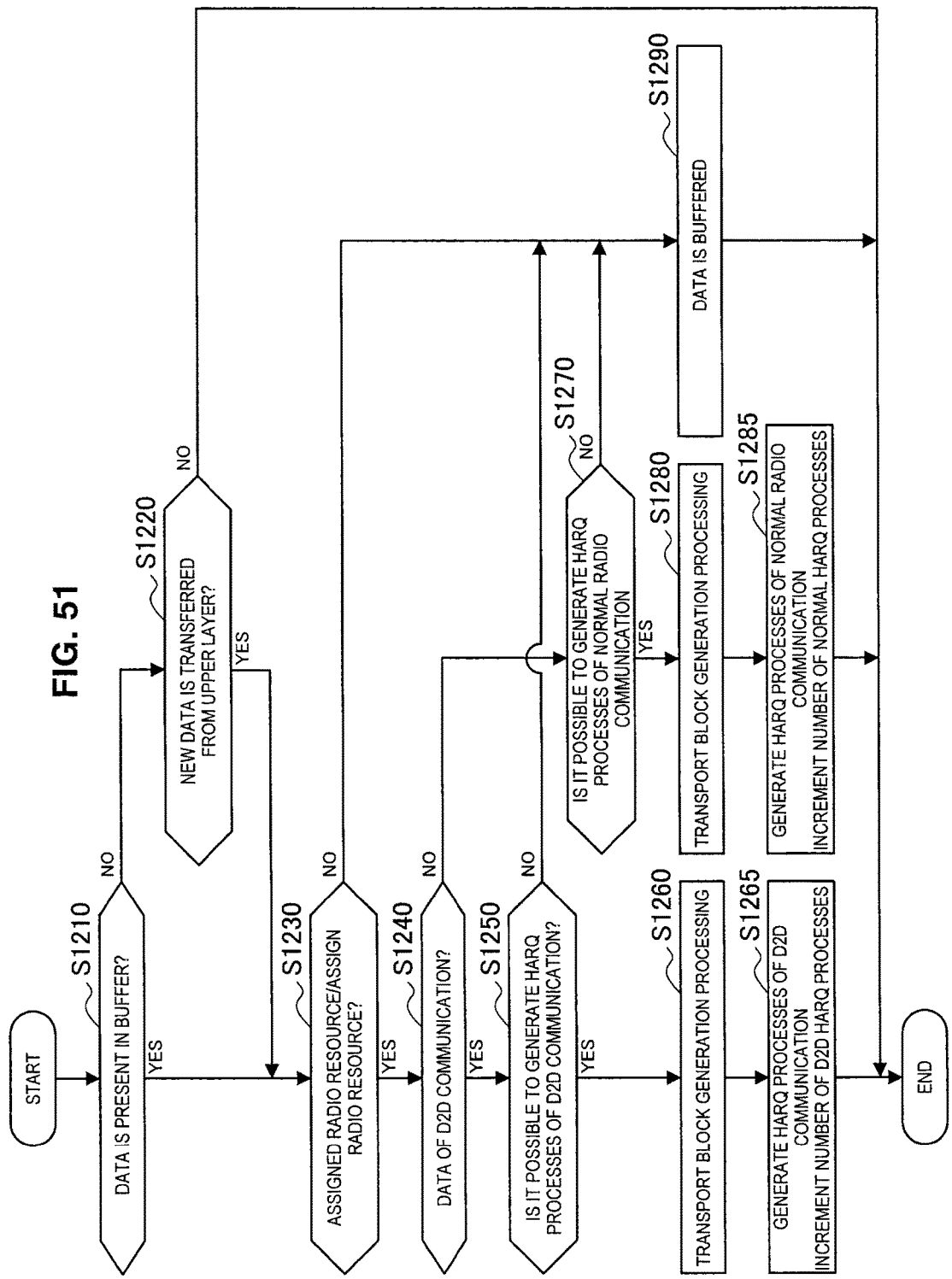
FIG. 51 is a flow chart illustrating an example of a schematic flow of control processing when the maximum number of the HARQ processes is set in each of normal radio communication and the D2D communication.

FIG. 51 is a flow chart illustrating an example of a schematic flow of the control processing when the maximum number of the HARQ processes is set in each of the normal radio communication and the D2D communication. When the transport block to be transmitted by the D2D communication is generated by such processing (S1260), the HARQ processes of the D2D communication are generated, and the number of the D2D HARQ processes is incremented (S1265). When the transport block to be transmitted by the normal communication (radio communication between the base station and the terminal apparatus) is generated (S1270), the HARQ processes of the normal communication are generated, and the number of the normal HARQ processes is incremented (S1275).

Integration of Maximum Number of HARQ Processes

As a second example, the maximum number may be set for a total value of the number of the HARQ processes of the normal radio communication (that is, radio communication between the base station and the terminal apparatus and the number of the HARQ processes of the D2D communication.

Figure 52:
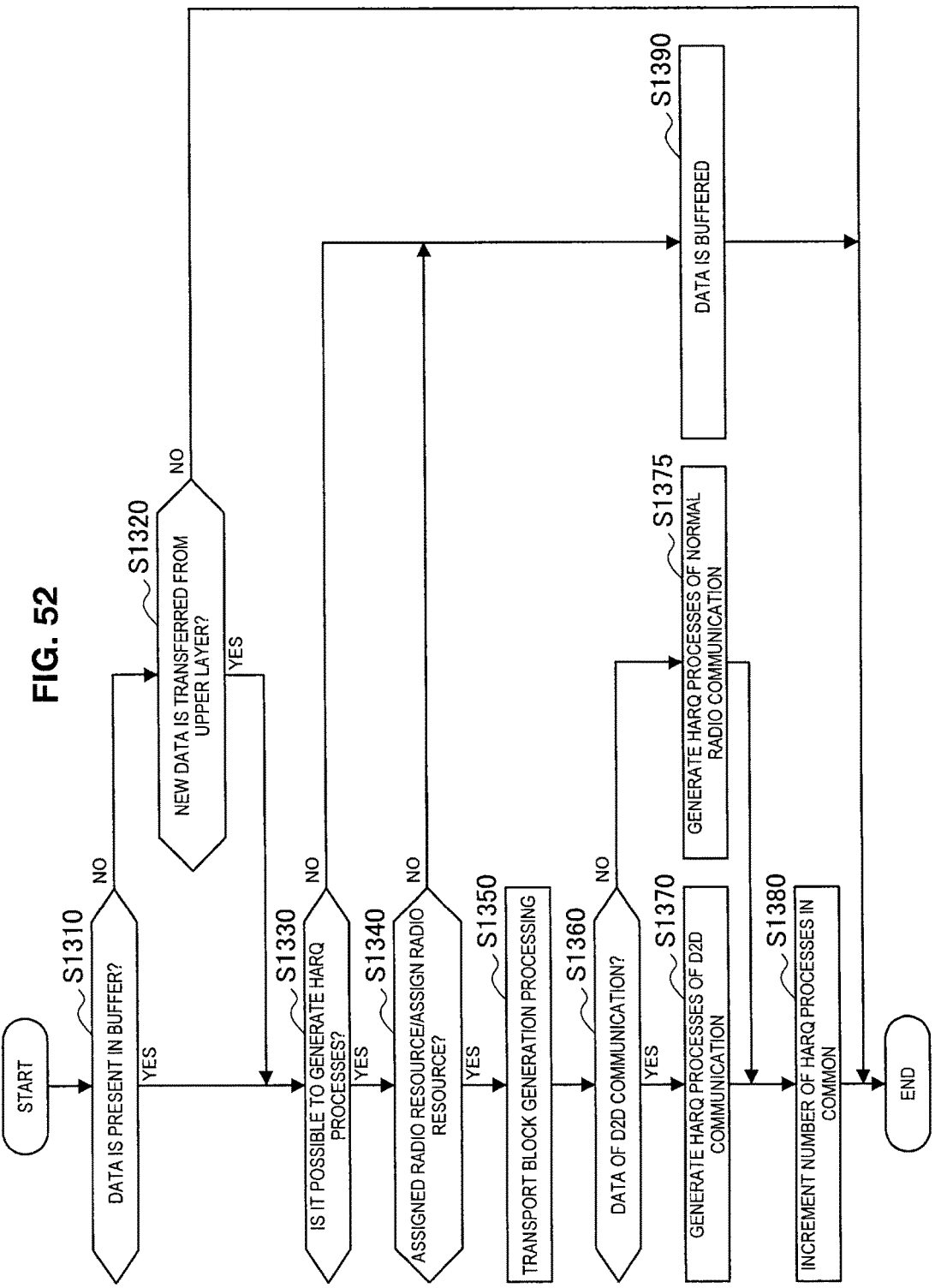
FIG. 52 is a flow chart illustrating an example of a schematic flow of the control processing when the maximum number of the HARQ processes is set in both of the normal radio communication and the D2D communication.

FIG. 52 is a flow chart illustrating an example of a schematic flow of the control processing when the maximum number of the HARQ processes is set in both of the normal radio communication and the D2D communication. Even when the HARQ processes of the D2D communication are generated by such processing (S1370), and even when the HARQ processes of the normal radio communication are generated by such processing (S1375), the number of the HARQ processes in common is incremented (S1380).

No Resending in HARQ Processes of D2D Communication

Note that, in the D2D communication, the resending by the HARQ processes may not be performed. This is because it is considered that the D2D communication is likely to be radio communication at a comparatively short distance, so the propagation state is more stable. As a first example of a specific method, the number of the resending in the HARQ processes may be set to 0. Further, as a second example, the HARQ processes may not be generated for the D2D communication.

Figure 53:
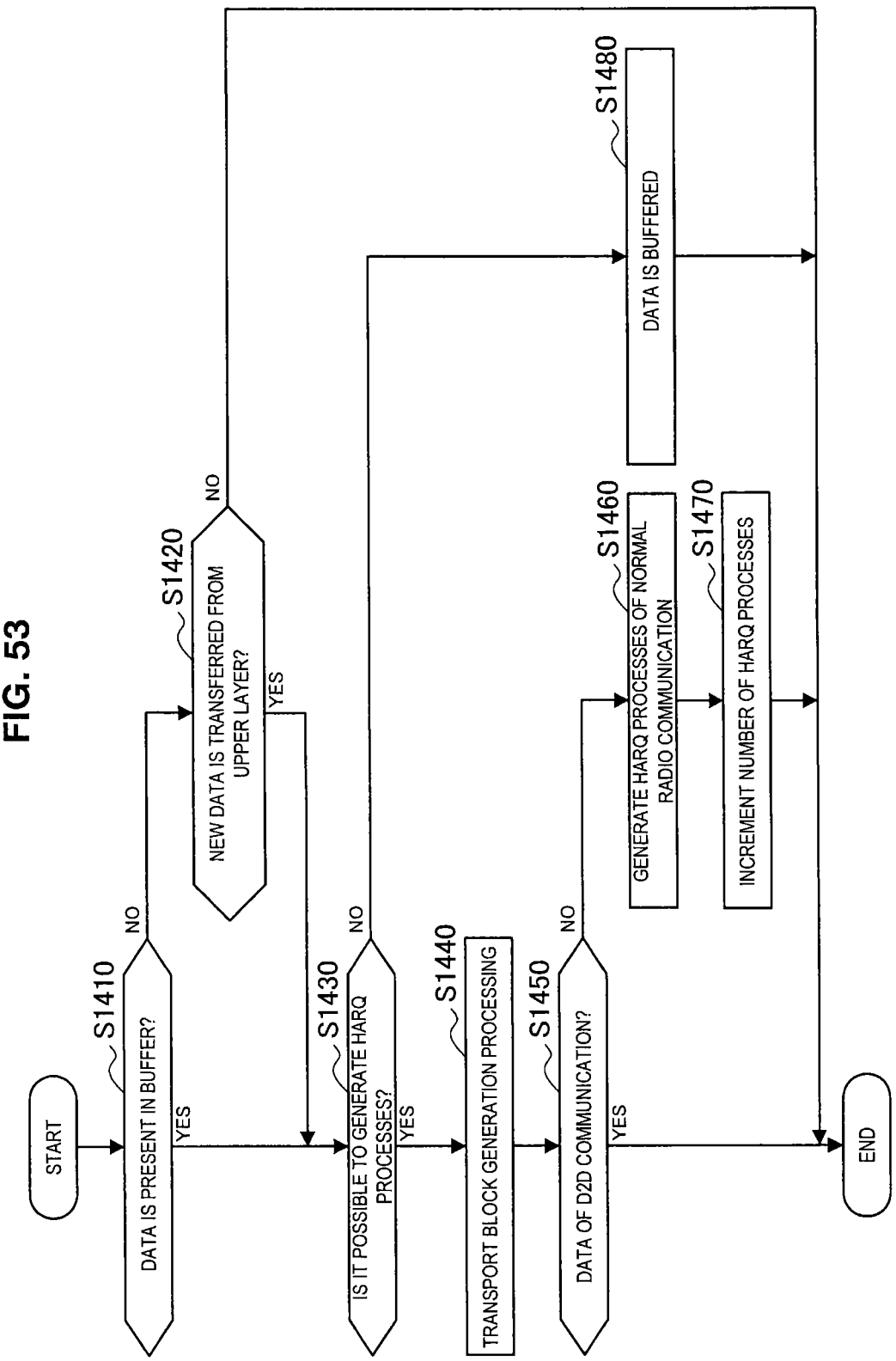
FIG. 53 is a flow chart illustrating an example of a schematic flow of the control processing when the HARQ processes are not generated for the D2D communication.

FIG. 53 is a flow chart illustrating an example of a schematic flow of the control processing when the HARQ processes are not generated for the D2D communication. Even when the transport block of the D2D communication is generated by such processing (S1440, S1450), the HARQ processes of the D2D communication are not generated. On the other hand, the HARQ processes of the normal radio communication are generated (S1460), the number of the HARQ processes is incremented according to the generation (S1470).

If the HARQ processes are not generated for the D2D communication in this manner, it is possible to reduce a memory required for the HARQ processes and to suppress power consumption by the operation of the HARQ processes.

Parameters of HARQ Processes

Parameters (a timer, the number of resending, and the like) may be different between the HARQ processes of the normal radio communication and the HARQ processes of the D2D communication. For example, since a frequency of assignment of the radio resource is lower in the D2D communication, a longer timer may be set. Further, for example, since it is considered that a communication distance is shorter and a change in propagation environment is smaller in the D2D communication, the smaller number of the resending may be set.

Operation of HARQ Processes in Node that does not Perform D2D Communication

As described above, the ACK/NACK for the D2D communication can be fed back also to the node (for example, the base station, the master apparatus) that does not directly perform the D2D communication. In this case, for example, the HARQ processes or other equivalent processes may be generated and operated. Further, such processes may manage the number of resending, a timer, transmission data size and the like. Further, such processes may update management information on the basis of information from the apparatus that performs the D2D communication.

The node that does not directly perform the D2D communication, when assigning the radio resource for the D2D communication, may consider the number of the HARQ processes. For example, when the number of the HARQ processes does not reach the maximum number, the radio resource for the D2D communication may be newly assigned, and when the number of the HARQ processes reaches the maximum number, the radio resource for the D2D communication may not be newly assigned.

7. Application Examples

The technology according to an embodiment of the present disclosure may be applied to various products. For example, the terminal apparatus 100 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The terminal apparatus 100 may also be realized as a terminal (that is also referred to as a machine type communication (MTC) terminal) that performs machine-to-machine (M2M) communication. Furthermore, at least a part of elements of the terminal apparatus 100 may be realized as a radio communication module (such as an integrated circuit module including a single die) mounted on each of the terminals.

First Application Example

Figure 54:
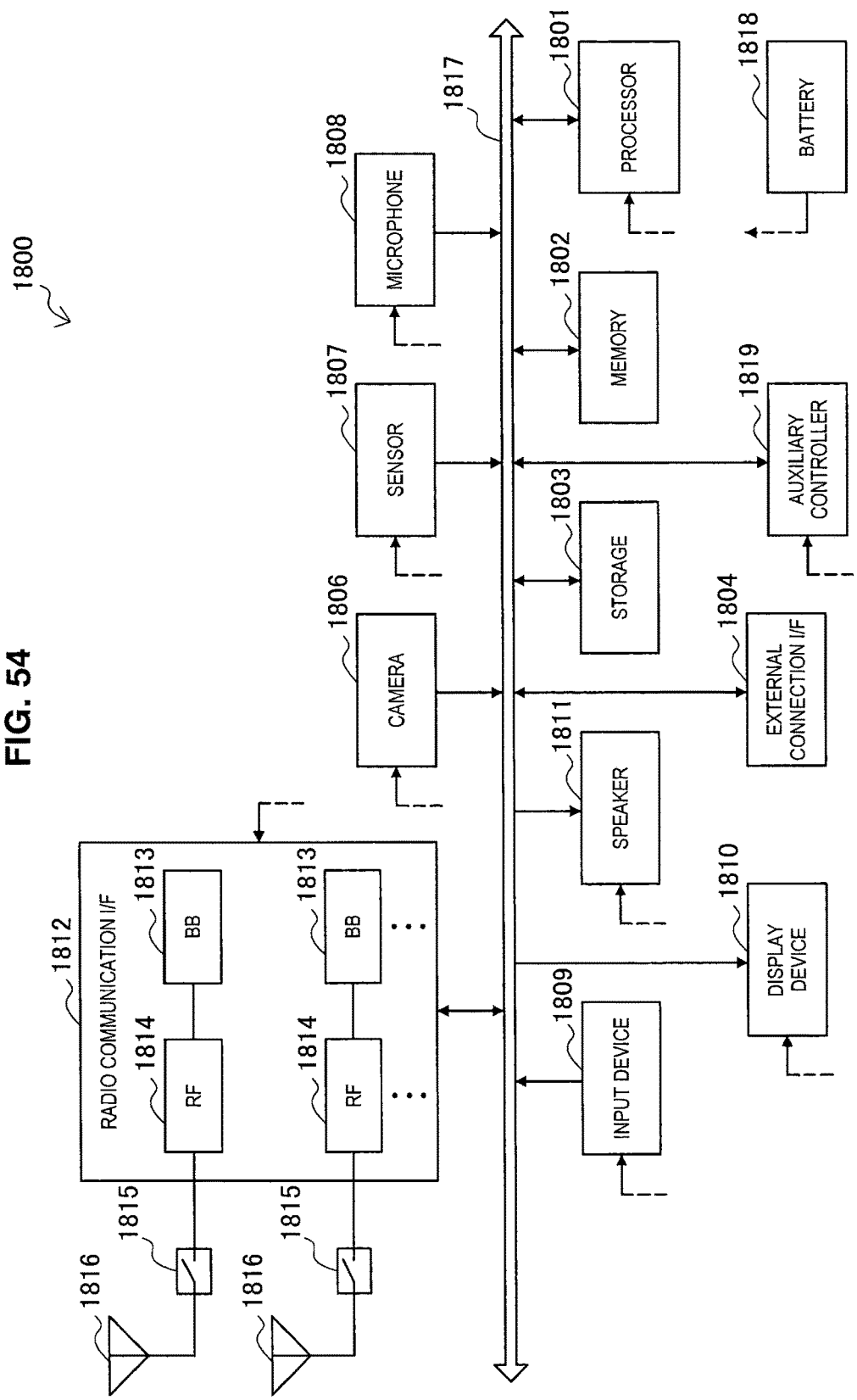
FIG. 54 is a block diagram illustrating an example of a schematic configuration of a smartphone.

FIG. 54 is a block diagram illustrating an example of the schematic configuration of a smartphone 1800 to which the technology of the present disclosure may be applied. The smartphone 1800 includes a processor 1801, a memory 1802, a storage 1803, an external connection interface 1804, a camera 1806, a sensor 1807, a microphone 1808, an input device 1809, a display device 1810, a speaker 1811, a radio communication interface 1812, one or more antenna switches 1815, one or more antennas 1816, a bus 1817, a battery 1818, and an auxiliary controller 1819.

The processor 1801 may be, for example, a CPU or a system on chip (SoC), and controls functions of an application layer and another layer of the smartphone 1800. The memory 1802 includes a RAM and a ROM, and stores a program that is executed by the processor 1801, and data. The storage 1803 may include a storage medium such as a semiconductor memory and a hard disk. The external connection interface 1804 is an interface for connecting an external device such as a memory card and a universal serial bus (USB) device to the smartphone 1800.

The camera 1806 includes an image sensor such as a charge coupled device (CCD) and a complementary metal oxide semiconductor (CMOS), and generates a captured image. The sensor 1807 may include a group of sensors such as a measurement sensor, a gyro sensor, a geomagnetic sensor, and an acceleration sensor. The microphone 1808 converts sounds that are input to the smartphone 1800 to audio signals. The input device 1809 includes, for example, a touch sensor configured to detect touch onto a screen of the display device 1810, a keypad, a keyboard, a button, or a switch, and receives an operation or an information input from a user. The display device 1810 includes a screen such as a liquid crystal display (LCD) and an organic light-emitting diode (OLED) display, and displays an output image of the smartphone 1800. The speaker 1811 converts audio signals that are output from the smartphone 1800 into sounds.

The radio communication interface 1812 supports any cellular communication scheme such as LTE and LTE-Advanced, and performs radio communication. The radio communication interface 1812 may typically include, for example, a BB processor 1813 and an RF circuit 1814. The BB processor 1813 may perform, for example, encoding/decoding, modulating/demodulating, and multiplexing/demultiplexing, and performs various types of signal processing for radio communication. Meanwhile, the RF circuit 1814 may include, for example, a mixer, a filter, and an amplifier, and transmits and receives radio signals via the antenna 1816. The radio communication interface 1812 may also be a one chip module that has the BB processor 1813 and the RF circuit 1814 integrated thereon. The radio communication interface 1812 may include the multiple BB processors 1813 and the multiple RF circuits 1814, as illustrated in FIG. 54. Note that FIG. 54 illustrates the example in which the radio communication interface 1812 includes the multiple BB processors 1813 and the multiple RF circuits 1814, but the radio communication interface 1812 may also include a single BB processor 1813 or a single RF circuit 1814.

Furthermore, in addition to a cellular communication scheme, the radio communication interface 1812 may support another type of radio communication scheme such as a short-distance wireless communication scheme, a near field communication scheme, and a radio local area network (LAN) scheme. In that case, the radio communication interface 1812 may include the BB processor 1813 and the RF circuit 1814 for each radio communication scheme.

Each of the antenna switches 1815 switches connection destinations of the antennas 1816 among multiple circuits (such as circuits for different radio communication schemes) included in the radio communication interface 1812.

Each of the antennas 1816 includes a single or multiple antenna elements (such as multiple antenna elements included in an MIMO antenna), and is used for the radio communication interface 1812 to transmit and receive radio signals. The smartphone 1800 may include the multiple antennas 1816, as illustrated in FIG. 54. Note that FIG. 54 illustrates the example in which the smartphone 1800 includes the multiple antennas 1816, but the smartphone 1800 may also include a single antenna 1816.

Furthermore, the smartphone 1800 may include the antenna 1816 for each radio communication scheme. In that case, the antenna switches 1815 may be omitted from the configuration of the smartphone 1800.

The bus 1817 connects the processor 1801, the memory 1802, the storage 1803, the external connection interface 1804, the camera 1806, the sensor 1807, the microphone 1808, the input device 1809, the display device 1810, the speaker 1811, the radio communication interface 1812, and the auxiliary controller 1819 to each other. The battery 1818 supplies power to blocks of the smartphone 1800 illustrated in FIG. 54 via feeder lines, which are partially shown as dashed lines in the figure. The auxiliary controller 1819 operates a minimum necessary function of the smartphone 1800, for example, in a sleep mode.

In the smartphone 1800 shown in FIG. 54, the radio resource information acquisition unit 161 and the data size determination unit 163 (and the notification unit 165) described with reference to FIG. 13 may be implemented in the radio communication interface 1812. Further, at least a part of these configuration elements may be implemented in the processor 1801 or the auxiliary controller 1819. As an example, the smartphone 1800 may mount a module including a part (for example, the BB processor 1813) or all of the radio communication interface 1812, the processor 1801, and/or the auxiliary controller 1819, and the radio resource information acquisition unit 161 and the data size determination unit 163 (and the notification unit 165) may be implemented in the module. In this case, the module may store a program for allowing the processor to function as the radio resource information acquisition unit 161 and the data size determination unit 163 (and the notification unit 165) (in other words, a program allowing the processor to execute operations of the radio resource information acquisition unit 161 and the data size determination unit 163 (and the notification unit 165)), and may execute the program. As another example, the program for allowing the processor to function as the radio resource information acquisition unit 161 and the data size determination unit 163 (and the notification unit 165) is installed to the smartphone 1800, and the radio communication interface 1812 (for example, the BB processor 1813), the processor 1801, and/or the auxiliary controller 1819 may execute the program. As described above, as the apparatus including the radio resource information acquisition unit 161 and the data size determination unit 163 (and the notification unit 165), the smartphone 1800 or the module may be provided, and the program for allowing the processor to function as the radio resource information acquisition unit 161 and the data size determination unit 163 (and the notification unit 165) may be provided. Further, a readable recording medium storing the program may be provided. In terms of these points, the radio resource information acquisition unit 171 and the data size determination unit 173 (and the notification unit 175) described with reference to FIG. 33 are also similar to the radio resource information acquisition unit 161 and the data size determination unit 163 (and the notification unit 165), and the radio resource information acquisition unit 181 and the data size determination unit 183 (and the notification unit 185) described with reference to FIG. 42 are also similar to the radio resource information acquisition unit 161 and the data size determination unit 163 (and the notification unit 165).

Second Application Example

Figure 55:
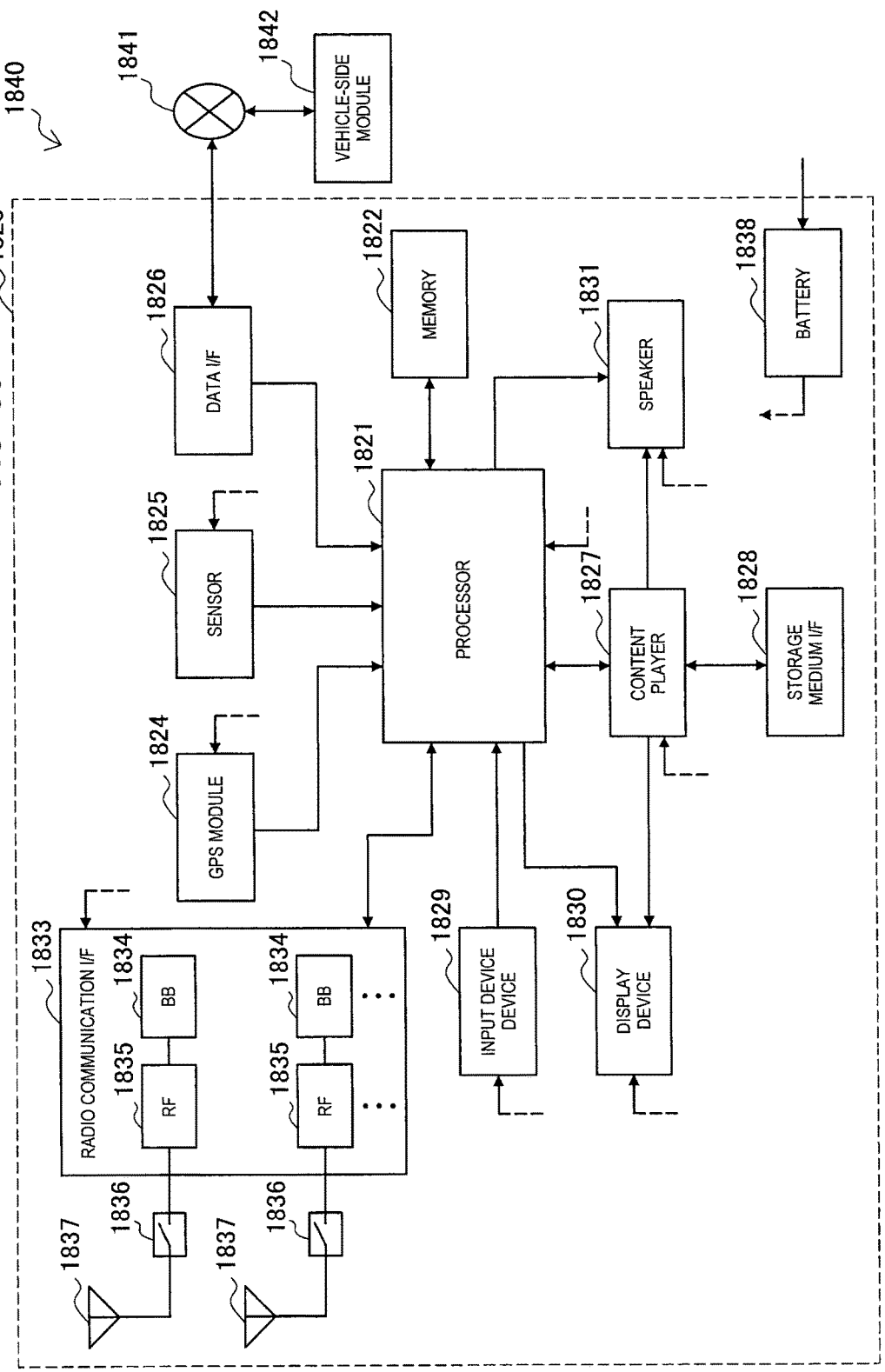
FIG. 55 is a block diagram illustrating an example of a schematic configuration of a car navigation apparatus.

FIG. 55 is a block diagram illustrating an example of the schematic configuration of a car navigation apparatus 1820 to which the technology of the present disclosure may be applied. The car navigation apparatus 1820 includes a processor 1821, a memory 1822, a global positioning system (GPS) module 1824, a sensor 1825, a data interface 1826, a content player 1827, a storage medium interface 1828, an input device 1829, a display device 1830, a speaker 1831, a radio communication interface 1833, one or more antenna switches 1836, one or more antennas 1837, and a battery 1838.

The processor 1821 may be, for example, a CPU or a SoC, and controls a navigation function and another function of the car navigation apparatus 1820. The memory 1822 includes a RAM and a ROM, and stores a program that is executed by the processor 1821, and data.

The GPS module 1824 uses GPS signals received from a GPS satellite to measure a position (such as latitude, longitude, and altitude) of the car navigation apparatus 1820. The sensor 1825 may include a group of sensors such as a gyro sensor, a geomagnetic sensor, and an air pressure sensor. The data interface 1826 is connected to, for example, an in-vehicle network 1841 via a terminal that is not shown, and acquires data generated by the vehicle, such as vehicle speed data.

The content player 1827 reproduces content stored in a storage medium (such as a CD and a DVD) that is inserted into the storage medium interface 1828. The input device 1829 includes, for example, a touch sensor configured to detect touch onto a screen of the display device 1830, a button, or a switch, and receives an operation or an information input from a user. The display device 1830 includes a screen such as a LCD or an OLED display, and displays an image of the navigation function or content that is reproduced. The speaker 1831 outputs sound of the navigation function or the content that is reproduced.

The radio communication interface 1833 supports any cellular communication scheme such as LET and LTE-Advanced, and performs radio communication. The radio communication interface 1833 may typically include, for example, a BB processor 1834 and an RF circuit 1835. The BB processor 1834 may perform, for example, encoding/decoding, modulating/demodulating, and multiplexing/demultiplexing, and performs various types of signal processing for radio communication. Meanwhile, the RF circuit 1835 may include, for example, a mixer, a filter, and an amplifier, and transmits and receives radio signals via the antenna 1837. The radio communication interface 1833 may be a one chip module having the BB processor 1834 and the RF circuit 1835 integrated thereon. The radio communication interface 1833 may include the multiple BB processors 1834 and the multiple RF circuits 1835, as illustrated in FIG. 55. Note that FIG. 55 illustrates the example in which the radio communication interface 1833 includes the multiple BB processors 1834 and the multiple RF circuits 1835, but the radio communication interface 1833 may also include a single BB processor 1834 or a single RF circuit 1835.

Furthermore, in addition to a cellular communication scheme, the radio communication interface 1833 may support another type of radio communication scheme such as a short-distance wireless communication scheme, a near field communication scheme, and a radio LAN scheme. In that case, the radio communication interface 1833 may include the BB processor 1834 and the RF circuit 1835 for each radio communication scheme.

Each of the antenna switches 1836 switches connection destinations of the antennas 1837 among multiple circuits (such as circuits for different radio communication schemes) included in the radio communication interface 1833.

Each of the antennas 1837 includes a single or multiple antenna elements (such as multiple antenna elements included in an MIMO antenna), and is used for the radio communication interface 1833 to transmit and receive radio signals. The car navigation apparatus 1820 may include the multiple antennas 1837, as illustrated in FIG. 55. Note that FIG. 55 illustrates the example in which the car navigation apparatus 1820 includes the multiple antennas 1837, but the car navigation apparatus 1820 may also include a single antenna 1837.

Furthermore, the car navigation apparatus 1820 may include the antenna 1837 for each radio communication scheme. In that case, the antenna switches 1836 may be omitted from the configuration of the car navigation apparatus 1820.

The battery 1838 supplies power to blocks of the car navigation apparatus 1820 illustrated in FIG. 55 via feeder lines that are partially shown as dashed lines in the figure. The battery 1838 accumulates power supplied form the vehicle.

In the car navigation apparatus 1820 shown in FIG. 55, the radio resource information acquisition unit 161 and the data size determination unit 163 (and the notification unit 165) described with reference to FIG. 13 may be implemented in the radio communication interface 1833. Further, at least a part of these configuration elements may be implemented in the processor 1821. As an example, the car navigation apparatus 1820 may mount a module including a part (for example, the BB processor 1834) or all of the radio communication interface 1833, and/or the processor 1821, and the radio resource information acquisition unit 161 and the data size determination unit 163 (and the notification unit 165) may be implemented in the module. In this case, the module may store a program for allowing the processor to function as the radio resource information acquisition unit 161 and the data size determination unit 163 (and the notification unit 165) (in other words, a program allowing the processor to execute operations of the radio resource information acquisition unit 161 and the data size determination unit 163 (and the notification unit 165)), and may execute the program. As another example, the program for allowing the processor to function as the radio resource information acquisition unit 161 and the data size determination unit 163 (and the notification unit 165) is installed to the car navigation apparatus 1820, and the radio communication interface 1833 (for example, the BB processor 1834), and/or the processor 1821 may execute the program. As described above, as the apparatus including the radio resource information acquisition unit 161 and the data size determination unit 163 (and the notification unit 165), the car navigation apparatus 1821 or the module may be provided, and the program for allowing the processor to function as the radio resource information acquisition unit 161 and the data size determination unit 163 (and the notification unit 165) may be provided. Further, a readable recording medium storing the program may be provided. In terms of these points, the radio resource information acquisition unit 171 and the data size determination unit 173 (and the notification unit 175) described with reference to FIG. 33 are also similar to the radio resource information acquisition unit 161 and the data size determination unit 163 (and the notification unit 165), and the radio resource information acquisition unit 181 and the data size determination unit 183 (and the notification unit 185) described with reference to FIG. 42 are also similar to the radio resource information acquisition unit 161 and the data size determination unit 163 (and the notification unit 165).

The technology of the present disclosure may also be realized as an in-vehicle system (or a vehicle) 1840 including one or more blocks of the car navigation apparatus 1820, the in-vehicle network 1841, and a vehicle-side module 1842. That is, as the apparatus including the radio resource information acquisition unit 161 and the data size determination unit 163 (and the notification unit 165) (or the radio resource information acquisition unit 171 and the data size determination unit 173 (and the notification unit 175, or the radio resource information acquisition unit 181 and the data size determination unit 183 (and the notification unit 185)), the in-vehicle system (or the vehicle) 1840 may be provided. The vehicle-side module 1842 generates vehicle data such as vehicle speed, engine speed, and trouble information, and outputs the generated data to the in-vehicle network 1841.

8. Summary

Up to here, the terminal apparatus, the communication control apparatus (for example, the base station) and each processing according to an embodiment of the present disclosure have been described using FIG. 9 to FIG. 55. According to an embodiment according to the present disclosure, the terminal apparatus 100 that can communicate with the base station 10 acquires the radio resource information related to the radio resource usable for the D2D communication not via the base station 10 (D2D resource), and determines the size of the data to be transmitted and received in the D2D communication on the basis of the radio resource information.

This makes it possible to suppress an increase in load on the base station 10 when the D2D communication is performed.

More specifically, when the base station 10 determines the size of the data to be transmitted and received in the D2D communication, the base station 10 will collect the various information related to the D2D communication. As a result, the overhead for the information collection by the base station may be increased. Further, the heavy load for management and control for the D2D communication may be applied to the base station. However, as described above, when the terminal apparatus 100, instead of the base station 10, determines the size of the data, the information collection, management and control by the base station 10 are reduced, thereby making it possible to suppress an increase in load on the base station 10.

Notification of Size-Related Information

Moreover, for example, another apparatus that performs the D2D communication is notified of the size-related information related to the determined size.

This makes it possible to use the determined size in the D2D communication.

Channel to Used

As a first example, another apparatus is notified of the size-related information through transmission on the control channel for transmitting the control signal.

This makes it possible to notify of or be notified of the determined size also in the D2D communication similarly to the radio communication between the base station 10 and the terminal apparatus 100.

As a second example, another apparatus is notified of the size-related information through transmission on the data channel for transmitting the data.

This makes it possible to notify of the determined size even when the information is not successfully transmitted on the control channel.

As a first example, the size to be determined is one of a plurality of predetermined sizes, and the size-related information is information corresponding to the one of the plurality of predetermined sizes.

This makes it possible to suppress the amount of the radio resource required for the notification compared with when being notified of information indicating the size. That is, the overhead can be suppressed.

As a second example, the size-related information is information indicating the size to be determined.

This makes it possible to be notified of a size larger than that in the case where the information corresponding to a predetermined size (for example, the index) is transmitted, therefore improving throughput in the D2D communication.

Determination of Size of Data

Determination Based on Modulation Scheme and Encoding Scheme

Furthermore, for example, the size is determined further based on at least one of the modulation scheme and the encoding scheme.

As a first example, the modulation scheme and the encoding scheme are a modulation scheme and an encoding scheme to be used in the D2D communication by the apparatus that performs the D2D communication.

In this manner, when the size of the data is determined also based on the modulation scheme and the encoding scheme actually used, it is possible to more accurately calculate the size of the data that can be transmitted, thereby making it possible to determine a larger value as the size of the data.

Note that, for example, when the terminal apparatus 100 is not the apparatus that performs the D2D communication, the channel information related to the channel to be used in the D2D communication is acquired, and the modulation scheme and the encoding scheme to be used in the D2D communication are identified from the information.

This makes it possible to identify the modulation scheme and the encoding scheme to be used even when the terminal apparatus 100 is not the apparatus that performs the D2D communication.

As a second example, the modulation scheme and the encoding scheme, when the terminal apparatus 100 is not the apparatus that performs the D2D communication, are a predetermined modulation scheme and a predetermined encoding scheme.

In this manner, the data size is determined also based on the predetermined modulation scheme and the predetermined encoding scheme, thereby eliminating the need for the information related to the channel to be used in the D2D communication. Therefore, it is not necessary to feed back the information related to the channel from the slave apparatus to the master apparatus. As a result, the overhead can be suppressed. Further, as another viewpoint, such determination makes it possible to determine the size of the data even when the information related to the channel is not successfully obtained.

Note that, for example, the predetermined modulation scheme is the modulation scheme having the lowest data rate among a plurality of usable modulation schemes, and the predetermined encoding scheme is the encoding scheme having the lowest data rate among a plurality of usable encoding schemes.

This makes it possible to transmit and receive the data more securely. For example, even when a state of the channel to be used in the D2D communication is bad, the data can be transmitted and received correctly.

Determination Based on Amount of Radio Resource

As a first example, on the basis of the radio resource information related to the D2D resource, an amount of the resource for data usable for transmission and reception of the data among the D2D resources is calculated. Then, the size is determined on the basis of the amount of the resource for data and the at least one of the modulation scheme and the encoding scheme (the modulation scheme and/or the encoding scheme).

This makes it possible to more accurately calculate the size of the data that can be transmitted, thereby making it possible to determine a larger value as the size of the data.

As a second example, based on the radio resource information related to the D2D resource, and the at least one of the modulation scheme and the encoding scheme (the modulation scheme and/or the encoding scheme), a minimum size among one or more predetermined sizes corresponding to the amount of the D2D resource and the at least one of the modulation scheme and the encoding scheme, is determined as the size.

In this manner, the terminal apparatus 100 may not calculate the amount of the resource for data usable for transmission of the data, thus making it possible to suppress the load on the terminal apparatus 100.

9. Reference Embodiment

Furthermore, with reference to FIG. 56 to FIG. 61, a reference embodiment will be described.

<9.1. Outline>

In each embodiment of the present disclosure described above, the size of the data to be transmitted and received in the D2D communication is determined by the terminal apparatus 100. On the other hand, in a reference embodiment, the size of the data to be transmitted and received in the D2D communication is determined by the base station 10.

<9.2. Function Configuration of Base Station>

Figure 56:
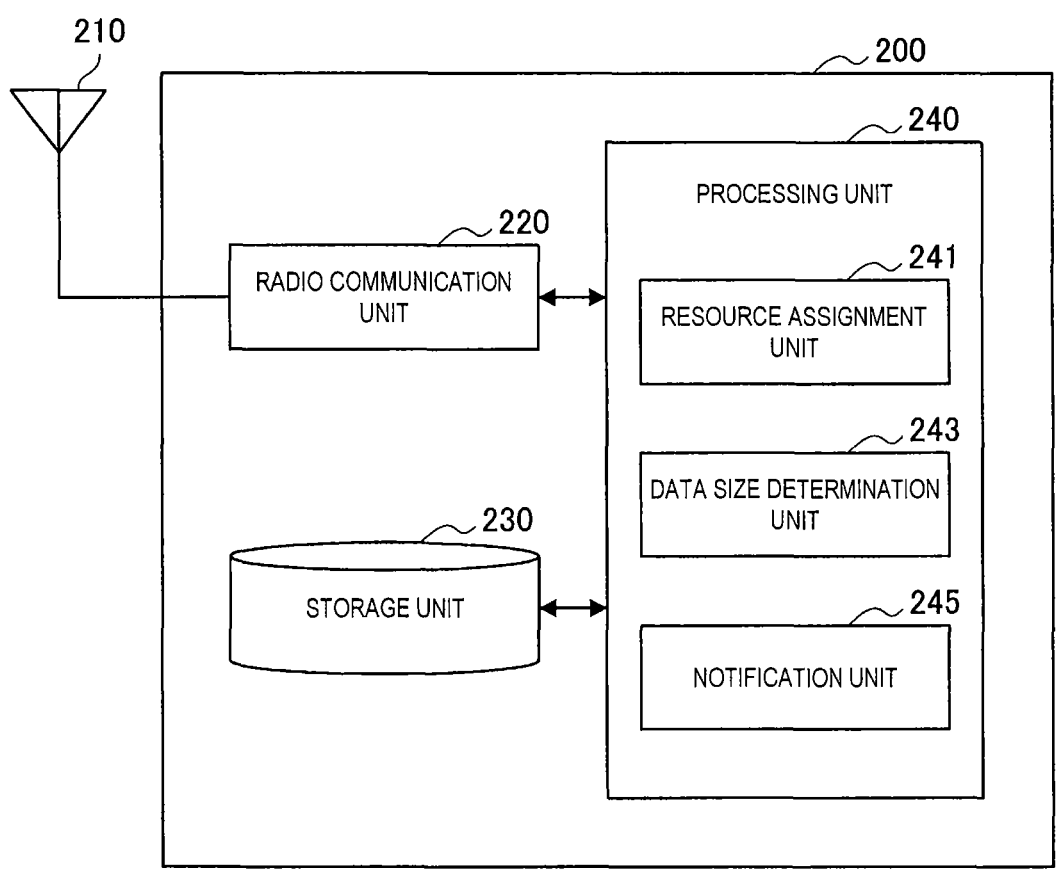
FIG. 56 is a block diagram illustrating an example of a function configuration of a base station according to a reference embodiment.

With reference to FIG. 56, an example of a function configuration of the base station 10 according to a reference embodiment will be described. FIG. 56 is a block diagram illustrating the example of the function configuration of the base station 10 according to a reference embodiment. With reference to FIG. 56, a terminal apparatus 10 includes an antenna unit 210, a radio communication unit 220, a storage unit 230 and a processing unit 240.

(Antenna Unit 210)

The antenna unit 210 receives a radio signal and outputs the received signal to the radio communication unit 220. Further, the antenna unit 210 transmits a transmission signal outputted by the radio communication unit 220.

(Radio Communication Unit 220)

The radio communication unit 220 performs radio communication with another apparatus. For example, the radio communication unit 220 performs radio communication with the terminal apparatus 100 positioned within the cell 11.

(Storage Unit 230)

The storage unit 230 stores a program and data for operating the base station 10.

For example, the storage unit 230 stores information related to the size of the data to be transmitted and received in the radio communication. More specifically, for example, the storage unit 230 stores the table of the TBS candidates as shown in FIG. 5. Further, for example, the storage unit 230 stores the table of the correspondence relationship between the MCS indexes and the TBS indexes as shown in FIG. 7 and FIG. 8. Further, the storage unit 230 stores the table of the CQI as shown in FIG. 6.

(Processing Unit 240)

The processing unit 240 provides various functions of the base station 10. The processing unit 240 includes a resource assignment unit 241, a data size determination unit 243, and a notification unit 245.

(Resource Assignment Unit 241)

Radio Resource for Radio Communication Between Base Station and Terminal Apparatus The resource assignment unit 241 assigns the radio resource for the radio communication between the base station 10 and the terminal apparatus 100 to the terminal apparatus 10 from among the radio resources controllable by the base station 10. Specifically, for example, the base station 10 assigns the radio resource to the terminal apparatus 100 for the downlink transmission of the data addressed to the terminal apparatus 100. Further, the base station 10 assigns the radio resource to the terminal apparatus 100 for the uplink transmission by the terminal apparatus 100.

Radio Resource for D2D Communication

The resource assignment unit 241 assigns the radio resource for the D2D communication to the terminal apparatus 100 that performs the D2D communication from among the radio resources controllable by the base station 10. The assigned radio resource for the D2D communication in this manner becomes the radio resource usable for the D2D communication (D2D resource).

The assigned radio resource for the D2D communication becomes the radio resource for transmission for the terminal apparatus 100 on the transmitting side of the D2D communication, and becomes the radio resource for reception for the terminal apparatus 100 on the receiving side of the D2D communication. For example, the resource assignment unit 241 assigns the radio resource for the D2D communication to the terminal apparatus 100 on the transmitting side of the D2D communication as the radio resource for transmission, and to the terminal apparatus 100 on the receiving side of the D2D communication as the radio resource for reception.

Further, for example, the resource assignment unit 241, when a predetermined condition is satisfied, assigns a radio resource as the radio resource for the D2D communication. For example, the predetermined condition is to have a request of the resource assignment from the terminal apparatus 100 that performs the D2D communication. The request includes, for example, an ID, a total amount of data, and an application type (for example, a QoS) of data of the terminal apparatus 100 on the opposite side of the D2D communication. Further, as another example, when service of performing the D2D communication at predetermined timing is provided, the predetermined condition may be to reach the predetermined timing. Further, as yet another example, it may be to require resending as a result of the occurrence of an error in the D2D communication.

An amount of the radio resource to be assigned may be an amount according to a content of the request of the D2D communication, or may be a predetermined amount (for example, 1 RB). Further, when the target communication is resending of the previous communication, the amount of the resource to be assigned may be determined in consideration of the state of being the resending. When the target communication is resending of the previous communication, the amount of the resource to be assigned may be an amount capable of transmission of resending data, or may be an amount as much as possible when it is difficult to transmit all of the resending data.

Furthermore, along with the radio resource for transmission and reception of the data, the radio resource for transmission and reception of ACK/NACK may be also assigned. A time interval between the radio resource for transmission and reception of the data and the radio resource for transmission and reception of the ACK/NACK may be a predetermined time interval, or may be designated at any time. When the time interval is the predetermined time interval, the need for the notification of the radio resource for transmission and reception of the ACK/NACK is eliminated, leading to reduction in overhead. The base station 10 may not assign the radio resource for transmission and reception of the ACK/NACK for another radio communication.

(Data Size Determination Unit 243)

The data size determination unit 243 determines the size of the data to be transmitted and received in the D2D communication on the basis of information related to the assigned radio resource for the D2D communication. For example, the information related to the assigned radio resource for the D2D communication is information indicating the assigned radio resource for the D2D communication.

Size to be Determined

As a first example, the size to be determined is one of a plurality of predetermined sizes. Specifically, for example, the size to be determined is one candidate of the TBS candidates as shown in FIG. 5.

As a second example, the size to be determined is a size to be calculated based on the information related to the assigned radio resource for the D2D communication.

Determination Based on Modulation Scheme and Encoding Scheme

For example, the data size determination unit 243 determines the size further based on at least one of the modulation scheme and the encoding scheme. For example, the data size determination unit 243 determines the size on the basis of the information related to the assigned radio resource for the D2D communication, and the modulation scheme and the encoding scheme.

Determination Based on Modulation Scheme and Encoding Scheme to be Used in D2D Communication As a first example, the modulation scheme and the encoding scheme are a modulation scheme and an encoding scheme to be used in the D2D communication by the terminal apparatus 100 that performs the D2D communication. In this manner, when the size of the data is determined on the basis of the modulation scheme and/or the encoding scheme to be actually used, it is possible to more accurately calculate the size of the data that can be transmitted. Therefore, it is possible to determine a larger value as the size of the data.

Note that, for example, the data size determination unit 243 acquires channel information related to a channel to be used in the D2D communication, and identifies the modulation scheme and the encoding scheme to be used in the D2D communication from the information. The information related to the channel is, for example, channel state information (CSI). And the CSI includes the CQI. The data size determination unit 243 then identifies the modulation scheme and the encoding scheme corresponding to the CQI. This allows the base station 10 to identify the modulation scheme and encoding scheme to be used in the D2D communication.

Determination Based on Predetermined Modulation Scheme and Predetermined Encoding Scheme As a second example, the modulation scheme and the encoding scheme are a predetermined modulation scheme and predetermined encoding scheme. Such determination of the data size on the basis of the predetermined modulation scheme and the predetermined encoding scheme eliminates the need for the information related to the channel to be used in the D2D communication. Therefore, it is not necessary to feed back the information related to the channel from the terminal apparatus 100 that performs the D2D communication to the base station 10. As a result, the overhead can be suppressed. Further, as another viewpoint, such determination makes it possible to determine the size of the data even when the information related to the channel is not successfully obtained.

Further, for example, the predetermined modulation scheme is a modulation scheme having the lowest data rate among a plurality of usable modulation schemes. Further, the predetermined encoding scheme is an encoding scheme having the lowest data rate among a plurality of usable encoding schemes. This allows the data to be more securely transmitted and received. For example, when a state of the channel to be used in the D2D communication is bad, the data can be accurately transmitted and received.

Determination Based on Amount of Radio Resource

Determination Based on Amount of Resource for Data

As a first example, the data size determination unit 243 calculates an amount of a resource for data usable for transmission and reception of the data among the assigned radio resources on the basis of the information related to the assigned radio resource for the D2D communication. The data size determination unit 243 then determines the size on the basis of the amount of the resource for data and the at least one of the modulation scheme and the encoding scheme (the modulation scheme and/or the encoding scheme).

For example, the data size determination unit 243 calculates the number of the resource elements (REs) usable for transmission and reception of the data among the assigned radio resources for the D2D communication, as the amount of the resource for data. For example, the data size determination unit 243 calculates the number of the REs excluding the RE for a control signal (for example, a synchronization signal, a reference signal, and a signal of the control channel) among the assigned radio resources for the D2D communication. The data size determination unit 243 then determines the size on the basis of the calculated amount of the resource for data (that is, the number of the REs), and the modulation scheme and the encoding scheme.

This makes it possible to more accurately calculate the size of the data that can be transmitted, thereby making it possible to determine a larger value as the size of the data.

Furthermore, more specifically, for example, the data size determination unit 243 calculates a maximum value of the size of the data to be transmitted, on the basis of the calculated amount of the resource for data (that is, the number of the REs), and the modulation scheme and the encoding scheme. The data size determination unit 243 then determines one of a plurality of predetermined sizes as the size of the data to be transmitted and received in the D2D communication, on the basis of the calculated maximum value. For example, the plurality of predetermined sizes are the TBS candidates shown in FIG. 5. The data size determination unit 243 then determines the candidates equal to or less than the calculated maximum value among the TBS candidates as the size. As an example, when the table shown in FIG. 5 is provided, one column to be referred to in the table is determined from the amount of the usable radio resources (for example, the number of the RBs). Then, since a range of the TBS indexes is determined from the modulation scheme and the encoding scheme, one or more rows to be referred to in the table are determined. Then, the TBS candidates equal to or less than the maximum value among some TBS candidates corresponding to the one column and the one or more rows are first selected. Further, the maximum TBS candidate among the selected TBS candidates is finally selected. In this manner, the maximum TBS candidate among the TBS candidates equal to or less than the calculated maximum value is selected. The TBS candidate finally selected is determined as the size of the data to be transmitted and received in the D2D communication.

Note that, instead of determining any candidate of the TBS candidates as the size, the maximum value itself of the size of the data, which is calculated based on the calculated amount of the resource for data (that is, the number of the REs), and the modulation scheme and the encoding scheme, may be determined as the size of the data to be transmitted and received in the D2D communication, thereby making it possible to determine a larger value as the size of the data.

Determination Based on Amount of Assigned Radio Resource for D2D Communication

As a second example, the data size determination unit 243, based on the radio resource information related to the assigned radio resource for the D2D communication, and the at least one of the modulation scheme and the encoding scheme (the modulation scheme and/or the encoding scheme), determines a minimum size among one or more predetermined sizes corresponding to the amount of the assigned radio resource for the D2D communication and the at least one of the modulation scheme and the encoding scheme, as the size.

For example, the data size determination unit 243 determines the minimum TBS candidate among the TBS candidates corresponding to the amount of the assigned radio resource for the D2D communication, and the modulation scheme and the encoding scheme, as the size of the data to be transmitted and received in the D2D communication. As described above, for example, when the table shown in FIG. 5 is provided, one column to be referred to in the table is determined from the amount of the assigned radio resource for the D2D communication (for example, the number of the RBs). Then, since the range of the TBS indexes is determined from the modulation scheme and the encoding scheme, one or more rows to be referred to in the table are determined. Therefore, the minimum TBS candidate is selected among some TBS candidates corresponding to the one column and the one or more rows. The selected TBS candidate is then determined as the size of the data to be transmitted and received in the D2D communication.

In this manner, the base station 10 may not calculate the amount of the resource for data usable for transmission of the data, thus making it possible to suppress the load on the base station 10.

As described above, the size of the data to be transmitted and received in the D2D communication is determined. This makes it possible to suppress an increase in load on the terminal apparatus 100 when the D2D communication is performed. That is, similarly to the radio communication between the base station 10 and the terminal apparatus 100, it becomes possible for the terminal apparatus 100 that performs the D2D communication to transmit the data having the determined size by using the assigned radio resource, thereby making it possible to suppress the processing that should be performed by the terminal apparatus 100 for the D2D communication.

(Notification Unit 245)

Notification of Assigned Radio Resource for D2D Communication

The notification unit 245 notifies the terminal apparatus 100 that performs the D2D communication of the assigned radio resource for the D2D communication. For example, the notification unit 245 notifies the terminal apparatus 100 that performs the D2D communication of the radio resource via the radio communication unit 210 on the control channel (for example, the PDCCH) or the data channel (for example, the PDSCH) of the radio resource.

For example, the notification unit 245 notifies the apparatus on the transmitting side in the D2D communication of the assigned radio resource for the D2D communication as the resource for transmission. As an example, the notification unit 245 notifies the apparatus on the transmitting side in the D2D communication of the radio resource as uplink grant. For example, the notification unit 245 notifies the apparatus on the receiving side in the D2D communication of the assigned radio resource for the D2D communication as the resource for reception. As an example, the notification unit 245 notifies the apparatus on the receiving side in the D2D communication of the radio resource as downlink assignment.

Such notification provides, for example, correct transmission and reception in the D2D communication.

Specifically, in the D2D communication, the one apparatus 100 performs transmission, and the other apparatus 100 performs reception. Therefore, it is difficult for the terminal apparatus 100 to acquire whether it should perform transmission or reception only by the notification of the radio resource for the D2D communication. As a result, there is the possibility that transmission and reception is not correctly performed in the D2D communication.

Then, if the terminal apparatus 100 on the transmitting side is notified of the assigned radio resource as the radio resource for transmission, and the terminal apparatus 100 on the receiving side is notified of the assigned radio resource as the radio resource for reception, the terminal apparatus 100 can acquire which of transmission and reception should be performed. As a result, transmission and reception can be correctly performed in the D2D communication.

Notification of Data Size to be Determined

The notification unit 245 notifies the terminal apparatus 100 that performs the D2D communication of the size-related information related to the size to be determined.

Size-Related Information

Information Corresponding to Predetermined Size

As a first example, the size to be determined is one of a plurality of predetermined sizes, and the size-related information is information corresponding to the one of the plurality of predetermined sizes.

Specifically, for example, the size to be determined is one candidate among the TBS candidates show in FIG. 5. Further, the size-related information is the TBS index or the MCS index.

This makes it possible to suppress the amount of the radio resource required for the notification compared with when being notified of information indicating the size. That is, the overhead can be suppressed.

Information Indicating Size

As a second example, the size-related information is information indicating the size to be determined.

Specifically, as described above, for example, the size to be determined is a size to be calculated based on the radio resource information related to the assigned radio resource for the D2D communication. Then, the calculated size is determined as the size of the data to be transmitted and received in the D2D communication. In this case, the size-related information is the size calculated and determined.

This makes it possible to be notified of a size larger than that in the case where the information corresponding to a predetermined size (for example, the index) is transmitted, therefore improving throughput in the D2D communication.

Channel to be Used

Control Channel

As a first example, the terminal apparatus 100 that performs the D2D communication is notified of the size-related information through transmission on the control channel for transmitting the control signal. For example, the control channel is the PDCCH.

The use of the control channel in this manner makes it possible to notify of or be notified of the determined size also in the D2D communication as in the case with the radio communication between the base station 10 and the terminal apparatus 100.

As a second example, another apparatus is notified of the size-related information through transmission on the data channel for transmitting the data. For example, the data channel is the PDSCH.

The use of the data channel in this manner makes it possible to notify of the determined size even when the information cannot be successfully transmitted on the control channel.

As described above, the terminal apparatus 100 that performs the D2D communication is notified of the size-related information, thereby allowing the determined size to be used in the D2D communication.

The function configuration of the base station 10 according to a reference embodiment has been described above. Note that such function configuration can be applied as the function configuration of the base station 10 according to an embodiment of the present disclosure by excluding the data size determination unit 243 and the notification part of the size of the data in the notification unit 245.

<9.3. Flow of Processing>

Figure 57:
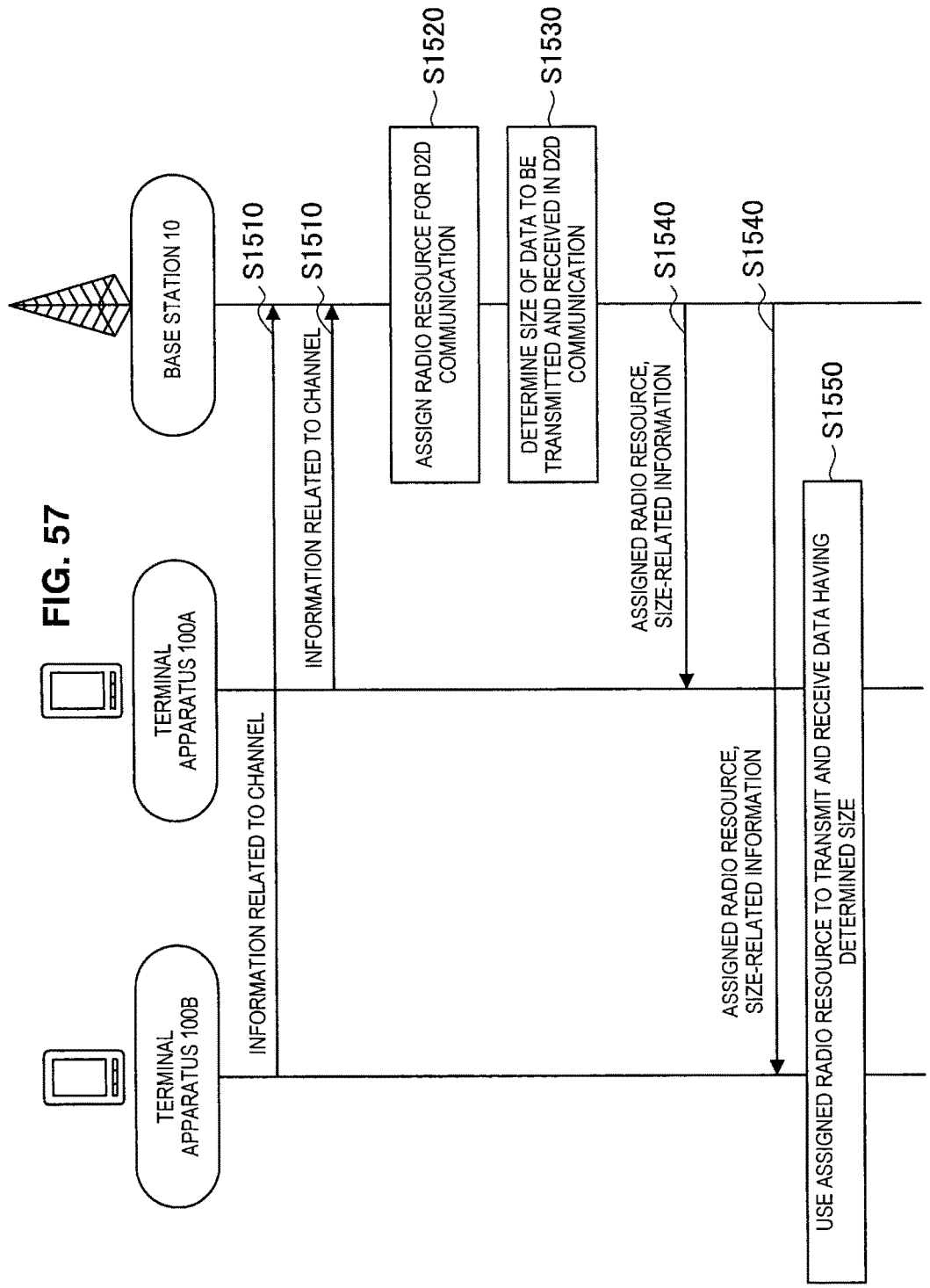
FIG. 57 is a sequence diagram illustrating an example of a schematic flow of communication control processing according to a reference embodiment.

Next, with reference to FIG. 57, an example of the communication control processing according to a reference embodiment. FIG. 57 is a sequence diagram illustrating an example of a schematic flow of the communication control processing according to a reference embodiment.

The terminal apparatus 100 estimates a state of the channel that can be used for the D2D communication. For example, the terminal apparatus 100 estimates the state of the channel by receiving the reference signal to be transmitted by another terminal apparatus 100. Then, for example, the terminal apparatus 100 feeds back the information related to the channel to the base station 10 (S1510). The information related to the channel is the channel state information (CSI), and includes the CQI, RI, PMI, RSRP, RSRQ, and the like.

Further, the base station 10 (resource assignment unit 241), when a predetermined condition is satisfied, assigns the radio resource as a part of the radio resources controllable by the base station 10 to the terminal apparatus 100 that performs the D2D communication as the radio resource for the D2D communication (S1520). Note that the base station 10 may assign the radio resource in consideration of the information related to the channel.

The base station 10 (data size determination unit 243) then determines the size of the data to be transmitted and received in the D2D communication (S1530). A flow of the processing will be described later.

The base station 10 (notification unit 245) then notifies the terminal apparatus 100 that performs the D2D communication of the assigned radio resource for the D2D communication and the size-related information related to the determined size (S1540). For example, the base station 10 (notification unit 245) notifies the terminal apparatus 100 of the radio resource and the size-related information on the control channel (for example, the PDCCH) or the data channel (for example, the PDSCH).

After that, the terminal apparatus 100A and the terminal apparatus 100B transmit and receive the data having the determined size by using the assigned radio resource for the D2D (S1550).

Note that, in a reference embodiment, as an example of the processing (S1530) of determining the size of the data to be transmitted and received in the D2D communication, there may be applied the processing similar to the first example (FIG. 19), the second example (FIG. 20), the third example (FIG. 21), the fourth example (FIG. 22) and the fifth example (FIG. 23) among the examples of the processing described in the first embodiment of the present disclosure.

<9.4. First Modification>

Next, with reference to FIG. 58, a first modification of the reference embodiment will be described.

In the reference embodiment, the base station 10 is not directly involved in the D2D communication, but determines the size of the data to be transmitted and received in the D2D communication. Therefore, in the reference embodiment described above, the base station 10 will determine the size of the data to be transmitted and received in the D2D communication without acquiring whether or not the resending for the D2D communication between the terminal apparatuses 100 is present (that is, the ACK/NACK for the D2D communication between the terminal apparatuses 100). That is, the base station 10 cannot determine the size of the data in consideration of the resending in the D2D communication. On the other hand, when the HARQ is used, the data is required to have the same size as that of the last transmission in the case of the resending.

Then, according to the first embodiment of the reference embodiment, the terminal apparatus 100 that performs the D2D communication fixes the size of the data in consideration of the resending in the D2D communication.

(Flow of Processing)

Figure 58:
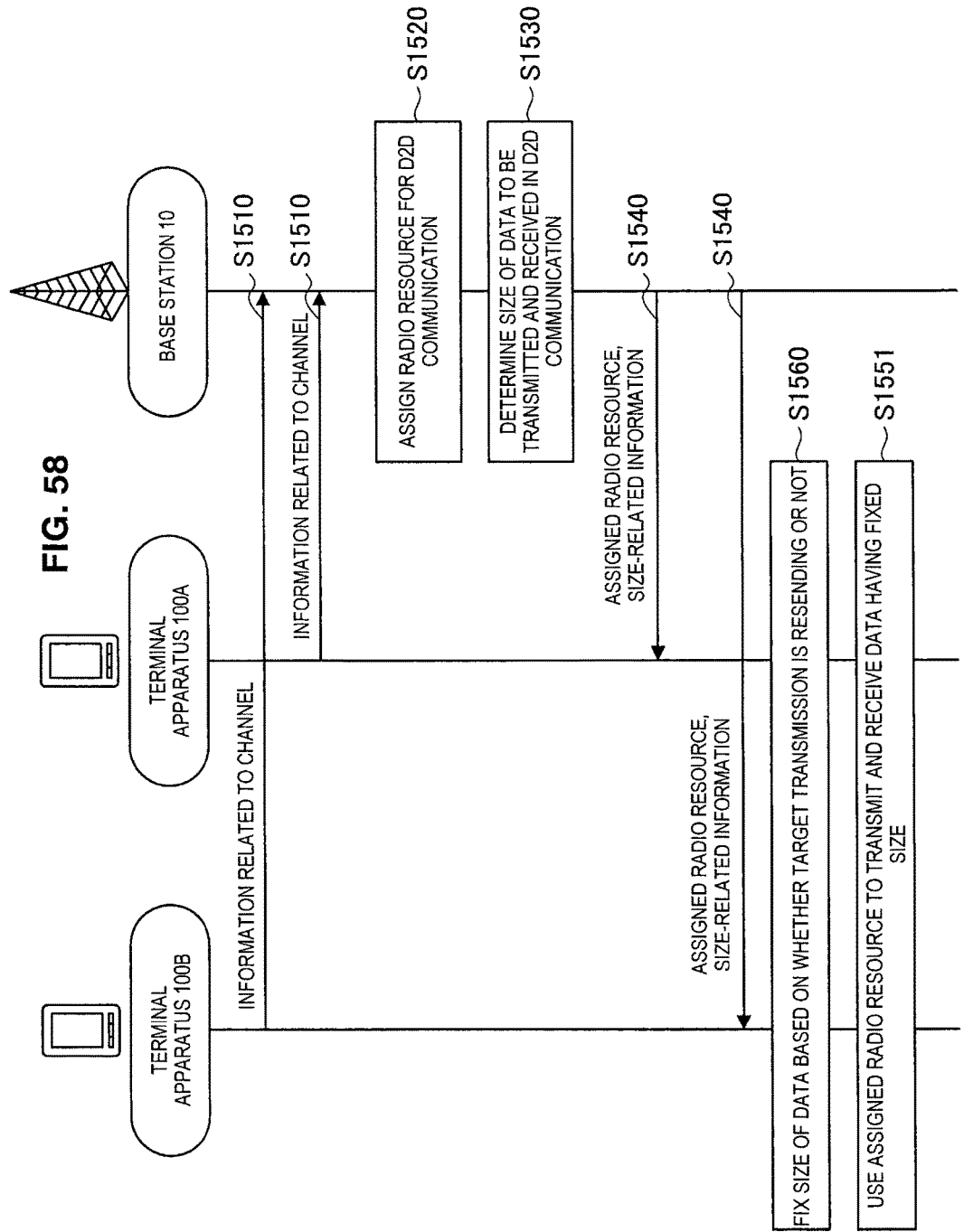
FIG. 58 is a sequence diagram illustrating an example of a schematic flow of communication control processing according to a first modification of the reference embodiment.

FIG. 58 is a sequence diagram illustrating an example of a schematic flow of the communication control processing according to the first modification of the reference embodiment.

The difference between the example according to the reference embodiment shown in FIG. 57 and the example according to the first modification of the reference embodiment shown in FIG. 58 is that Step S1550 is included in the example according to the reference embodiment, but Steps S1560 and S1551, instead of Step S1550, are included in the example according to the first modification of the reference embodiment. Therefore, Steps S1560 and S1551 are described here.

The terminal apparatus 100A and the terminal apparatus 100B fix the size of the data on the basis of whether or not the target transmission is the resending (S1560). A flow of the processing will be described in detail later.

The terminal apparatus 100A and the terminal apparatus 100B then use the assigned radio resource for the D2D communication to transmit and receive the data having the fixed size (S1551).

Note that, in the reference embodiment, as an example of the processing (S1560) of determining the size of the data to be transmitted and received in the D2D communication, the processing similar to the example (FIG. 25) of the processing related to the fixing of the data size described in the first modification of the first embodiment according to the present disclosure may be applied.

The first modification of the reference embodiment has been described above. According to the first modification of the reference embodiment, even when the base station 10 that is not directly involved in the D2D communication determines the size of the data, the data having the size in consideration of the resending is transmitted and received in the D2D communication.

<9.5. Second Modification>

Next, with reference to FIG. 59, a second modification of the reference embodiment will be described.

In the reference embodiment, the base station 10 is not directly involved in the D2D communication, but determines the size of the data to be transmitted and received in the D2D communication. Therefore, in the reference embodiment described above, the base station 10 will determine the size of the data to be transmitted and received in the D2D communication without acquiring whether or not the resending for the D2D communication between the terminal apparatuses 100 is present (that is, the ACK/NACK for the D2D communication). That is, the base station 10 cannot determine the size of the data in consideration of the resending in the D2D communication. On the other hand, when the HARQ is used, the data is required to have the same size as that of the last transmission in the case of the resending.

Then, according to the second modification of the reference embodiment, the terminal apparatus 100 that performs the D2D communication feeds back the information related to the resending for the D2D communication (for example, the ACK/NACK) to the base station 10, and the base station 10 performs the resource control and the determination of the data size in consideration of the presence or absence of the resending.

(Resource Assignment Unit 241)

As described above, the base station 10 (the resource assignment unit 241) assigns the radio resource for the D2D communication to the terminal apparatus 100 that performs the D2D communication from among the radio resources controllable by the base station 10. The assigned radio resource for the D2D communication in this manner becomes the radio resource usable for the D2D communication (D2D resource).

Especially in the second modification of the reference embodiment, the base station 10 (the resource assignment unit 241) considers whether or not the D2D communication between the terminal apparatuses 100 (that is, the target transmission) is the resending, to assign the radio resource for the D2D communication. For example, when the target transmission is the resending, from a viewpoint of the time and/or a viewpoint of the amount of the resource, the radio resource is preferentially assigned for the transmission.

Note that, in the second modification of the reference embodiment, the terminal apparatus 100 that performs the D2D communication feeds back the information related to the resending for the D2D communication (for example, the ACK/NACK) to the base station 10. The resource assignment unit 241 then acquires the information via the radio communication unit 220.

(Data Size Determination Unit 243)

As described above, the base station 100 (the data size determination unit 243) determines the size of the data to be transmitted and received in the D2D communication on the basis of the radio resource information related to the assigned radio resource for the D2D communication.

Especially in the second modification of the reference embodiment, the data size determination unit 243 considers whether or not the D2D communication between the terminal apparatuses 100 (that is, the target transmission) is the resending to determine the size of the data to be transmitted and received in the D2D communication. For example, when the target transmission is the resending, the size of the data to be transmitted and received is determined in consideration of the size of the resending data.

Note that, in the second modification of the reference embodiment, the terminal apparatus 100 that performs the D2D communication feeds back the information related to the resending for the D2D communication (for example, the ACK/NACK) to the base station 10. The data size determination unit 243 then acquires the information via the radio communication unit 220.

(Flow of Processing)

Figure 59:
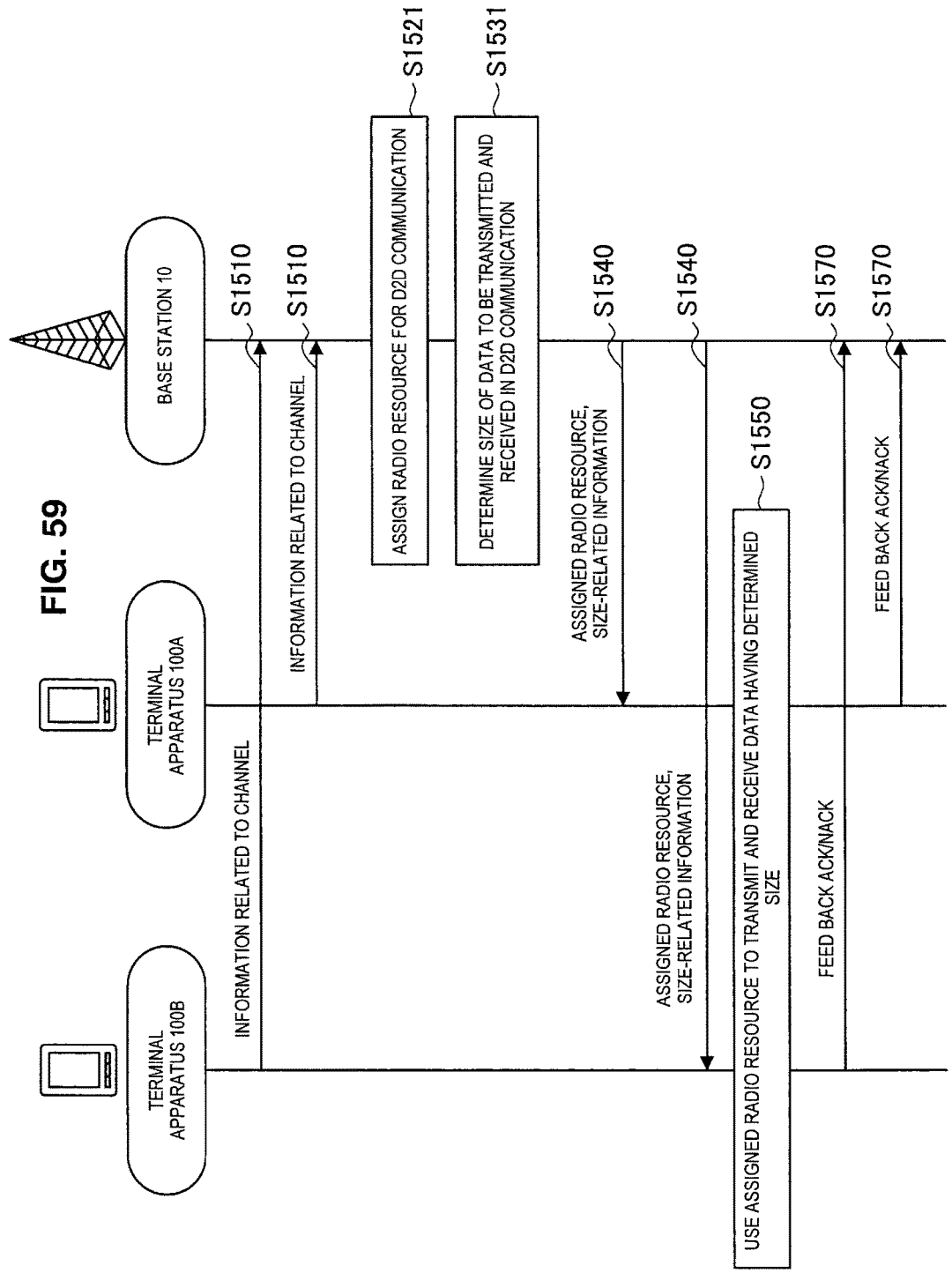
FIG. 59 is a sequence diagram illustrating an example of a schematic flow of communication control processing according to a second modification of the reference embodiment.

FIG. 59 is a sequence diagram illustrating an example of a schematic flow of the communication control processing according to the second modification of the reference embodiment.

The difference between the example according to the reference embodiment shown in FIG. 57 and the example according to the second modification of the reference embodiment shown in FIG. 59 is that Steps S1520 and S1530 are included in the example according to the reference embodiment, but Steps S1570, S1521 and S1531, instead of Steps S1520 and S1530, are included in the example according to the second modification of the reference embodiment. Therefore, Steps S1570, S1521 and S1531 are described here.

After transmission and reception of the data in the D2D communication (S1550), the ACK/NACK is fed back between the terminal apparatus 100A and the terminal apparatus 100B that perform the D2D communication. Further, the ACK/NACK is fed back from the terminal apparatus 100A and/or the terminal apparatus 100B to the base station 10 (S1570).

Further, the base station 10 (resource assignment unit 241) considers whether or not the D2D communication between the terminal apparatus 100A and the terminal apparatus 100B (that is, the target transmission is the resending, to assign the radio resource for the D2D communication (S1521). The assigned radio resource becomes the radio resource usable for the D2D communication (D2D resource). A flow of the processing will be described later.

Further, the base station 10 (data size determination unit 243) considers whether or not the D2D communication between the terminal apparatus 100A and the terminal apparatus 100B (that is, the target transmission) is the reseeding, to determine the size of the data to be transmitted and received in the D2D communication (S1531). A flow of the processing will be described in detail later.

Note that, in the second modification of the reference embodiment, as an example of the processing (S1521) related to the assignment of the radio resource for the D2D communication, the processing similar to the processing (FIG. 27) related to the resource assignment described in the second modification of the first embodiment according to the present disclosure may be applied.

Note that, in the second modification of the reference embodiment, as an example of the processing (S1531) related to the determination of the size of the data, the processing similar to the processing (FIG. 28) related to the determination of the size of the data described in the second modification of the first embodiment according to the present disclosure may be applied.

<9.6. Application Examples>

The technology according to a reference embodiment of the present disclosure may be applied to various products. For example, the base station 200 may be realized as any type of evolved Node B (eNB) such as a macro eNB, and a small eNB. The small eNB may be an eNB that covers a cell smaller than a macro cell, such as a pico eNB, micro eNB, or home (femto) eNB. Instead, the base station 200 may be realized as other types of base stations such as a NodeB and a base transceiver station (BTS). The base station 200 may include a main body (that is also referred to as a base station apparatus) configured to control radio communication, and one or more remote radio heads (RRHs) disposed in a different place from that of the main body. The various types of terminals to be described later may execute a base station function temporarily or semipermanently to operate as the base station 200.

First Application Example

Figure 60:
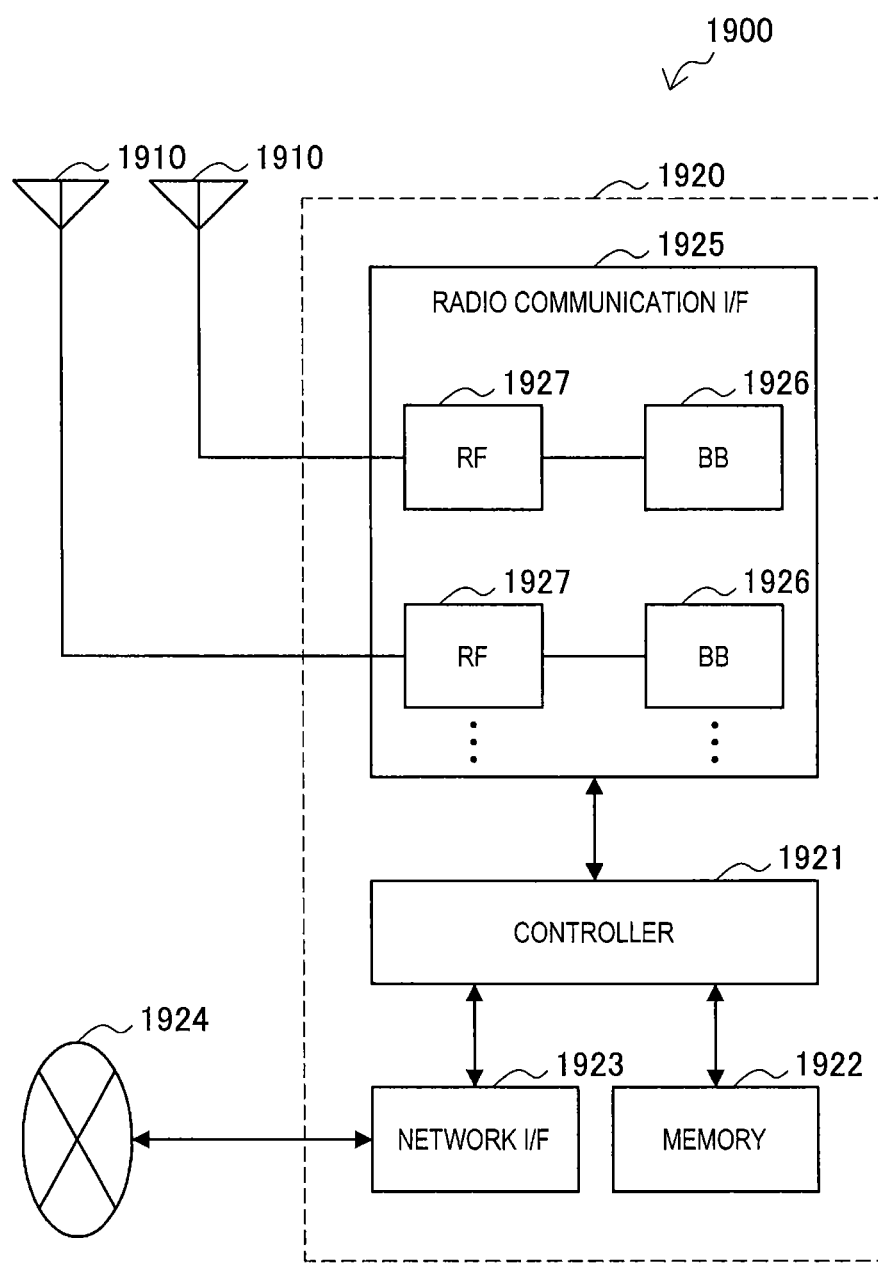
FIG. 60 is a block diagram illustrating a first example of a schematic configuration of eNB.

FIG. 60 is a block diagram illustrating the first example of the schematic configuration of an eNB to which the technology of the present disclosure may be applied. An eNB 1900 includes one or more antennas 1910 and a base station apparatus 1920. Each antenna 1910 and the base station apparatus 1920 may be connected to each other via an RF cable.

Each of the antennas 1910 includes a single or multiple antenna elements (such as multiple antenna elements included in an MIMO antenna), and is used for the base station apparatus 1920 to transmit and receive radio signals. The eNB 1900 may include the multiple antennas 1910, as illustrated in FIG. 60. For example, the multiple antennas 1910 may be compatible with multiple frequency bands used by the eNB 1900, respectively. Note that FIG. 60 illustrates the example in which the eNB 1900 includes the multiple antennas 1910, but the eNB 1900 may also include a single antenna 1910.

The base station apparatus 1920 includes a controller 1921, a memory 1922, a network interface 1923, and a radio communication interface 1925.

The controller 1921 may be, for example, a CPU or a DSP, and operates various functions of a higher layer of the base station apparatus 1920. For example, the controller 1921 generates a data packet from data in signals processed by the radio communication interface 1925, and transfers the generated packet via the network interface 1923. The controller 1921 may bundle data from multiple base band processors to generate the bundled packet and transfer the generated bundled packet. The controller 1921 may have logical functions of performing control such as radio resource control, radio bearer control, mobility management, admission control, and scheduling. The control may be performed in corporation with an eNB or a core network node in the vicinity. The memory 1922 includes a RAM and a ROM, and stores a program that is executed by the controller 1921, and various types of control data (such as a terminal list, transmission power data, and scheduling data).

The network interface 1923 is a communication interface for connecting the base station apparatus 1920 to a core network 1924. The controller 1921 may communicate with a core network node or another eNB via the network interface 1923. In that case, the eNB 1900, and the core network node or the other eNB may be connected to each other through a logical interface (such as an S1 interface and an X2 interface). The network interface 1923 may also be a wired communication interface or a radio communication interface for radio backhaul. If the network interface 1923 is a radio communication interface, the network interface 1923 may use a higher frequency band for radio communication than a frequency band used by the radio communication interface 1925.

The radio communication interface 1925 supports any cellular communication scheme such as long term evolution (LTE) or LTE-Advanced, and provides radio connection to a terminal positioned in a cell of the eNB 1900 via the antenna 1910. The radio communication interface 1925 may typically include, for example, a baseband (BB) processor 1926 and an RF circuit 1927. The BB processor 1926 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 1926 may have a part or all of the above-described logical functions instead of the controller 1921. The BB processor 1926 may be a memory that stores a communication control program, or a module that includes a processor and a related circuit configured to execute the program. Updating the program may allow the functions of the BB processor 1926 to be changed. The module may be a card or a blade that is inserted into a slot of the base station apparatus 1920. Alternatively, the module may also be a chip that is mounted on the card or the blade. Meanwhile, the RF circuit 1927 may include, for example, a mixer, a filter, and an amplifier, and transmits and receives radio signals via the antenna 1910.

The radio communication interface 1925 may include the multiple BB processors 1926, as illustrated in FIG. 60. For example, the multiple BB processors 1926 may be compatible with multiple frequency bands used by the eNB 1900. The radio communication interface 1925 may include the multiple RF circuits 1927, as illustrated in FIG. 60. For example, the multiple RF circuits 1927 may be compatible with multiple antenna elements, respectively. Note that FIG. 60 illustrates the example in which the radio communication interface 1925 includes the multiple BB processors 1926 and the multiple RF circuits 1927, but the radio communication interface 1925 may also include a single BB processor 1926 or a single RF circuit 1927.

In the eNB 1900 shown in FIG. 60, the resource assignment unit 241 and the data size determination unit 243 (and the notification unit 245) described with reference to FIG. 56 may be implemented in the radio communication interface 1925. Further, at least a part of these configuration elements may be implemented in the controller 1921. As an example, the eNB 1900 may mount a module including a part (for example, the BB processor 1926) or all of the radio communication interface 1925, and/or the controller 1921, and the resource assignment unit 241 and the data size determination unit 243 (and the notification unit 245) may be implemented in the module. In this case, the module may store a program for allowing the processor to function as the resource assignment unit 241 and the data size determination unit 243 (and the notification unit 245) (in other words, a program allowing the processor to execute operations of the radio resource information acquisition unit 161 and the data size determination unit 163 (and the notification unit 165)), and may execute the program. As another example, the program for allowing the processor to function as the resource assignment unit 241 and the data size determination unit 243 (and the notification unit 245) is installed to the eNB 1900, and the radio communication interface 1925 (for example, the BB processor 1926), and/or the controller 1921 may execute the program. As described above, as the apparatus including the resource assignment unit 241 and the data size determination unit 243 (and the notification unit 245), the eNB 1900, the base station apparatus 1920 or the module may be provided, and the program for allowing the processor to function as the resource assignment unit 241 and the data size determination unit 243 (and the notification unit 245) may be provided. Further, a readable recording medium storing the program may be provided.

Second Application Example

Figure 61:
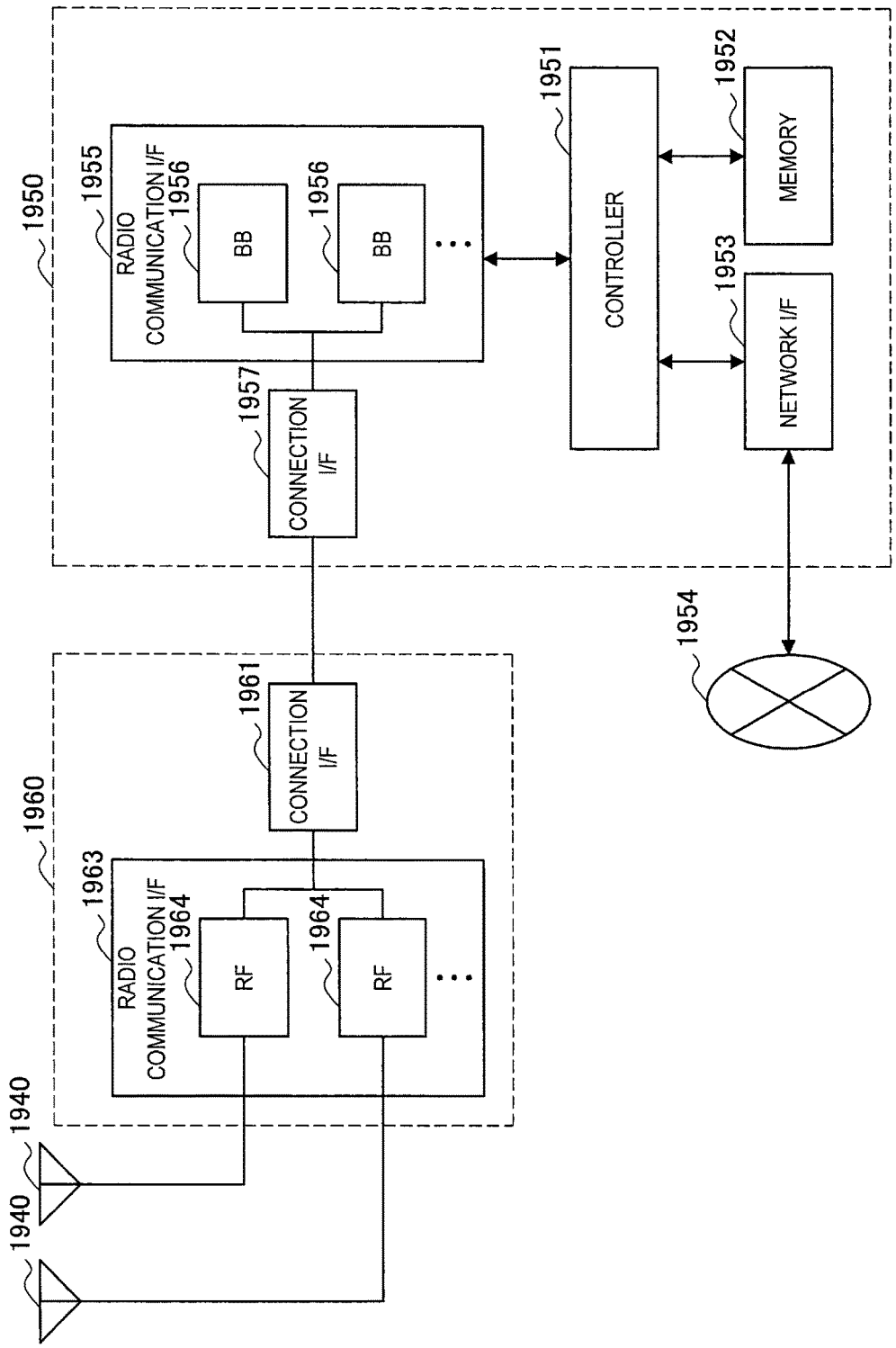
FIG. 61 is a block diagram illustrating a second example of a schematic configuration of eNB.

FIG. 61 is a block diagram illustrating the second example of the schematic configuration of an eNB to which the technology of the present disclosure may be applied. An eNB 1930 includes one or more antennas 1940, a base station apparatus 1950, and a RRH 1960. Each antenna 194 and the RRH 1960 may be connected to each other via an RF cable. Further, the base station apparatus 1950 and the RRH 1960 may be connected to each other by a high-speed line such as an optical fiber cable.

Each of the antennas 194 includes a single or multiple antenna elements (such as multiple antenna elements included in an MIMO antenna), and is used for the RRH 1960 to transmit and receive radio signals. The eNB 1930 may include the multiple antennas 1940, as illustrated in FIG. 61. For example, the multiple antennas 1940 may be compatible with multiple frequency bands used by the eNB 1930, respectively. Note that FIG. 61 illustrates the example in which the eNB 1930 includes the multiple antennas 1940, but the eNB 1930 may also include a single antenna 1940.

The base station apparatus 1950 includes a controller 1951, a memory 1952, a network interface 1953, a radio communication interface 1955, and a connection interface 1957. The controller 1951, the memory 1952 and the network interface 1953 are similar to the controller 11921, the memory 1922 and the network interface 1923 described with reference to FIG. 60.

The radio communication interface 1955 supports any cellular communication scheme such as the LTE or the LTE-Advanced, and provides radio connection to a terminal positioned in a sector corresponding to the RRH 1960 via the RRH 1960 and the antenna 1940. The radio communication interface 1955 may typically include a BB processor 1956, and others. The BB processor 1956 is similar to the BB processor 1926 described with reference to FIG. 60 except for being connected to an RF circuit 1964 of the RRH 1960 via the connection interface 1957. The radio communication interface 1955 includes the multiple BB processors 1956 as shown in FIG. 61, and, for example, the multiple BB processors 1956 may be compatible with the multiple frequency bands used by the eNB 1930, respectively. Note that FIG. 61 illustrates the example in which the radio communication interface 1955 includes the multiple BB processors 1956, but the radio communication interface 1955 may also include a single BB processor 1956.

The connection interface 1957 is an interface for connecting the base station apparatus 1950 (radio communication interface 1955) to the RRH 1960. The connection interface 1957 may be a communication module for communication on the high-speed line for connecting the base station apparatus 1950 (radio communication interface 1955) to the RRH 1960.

Furthermore, the RRH 1960 includes a connection interface 1961, and a radio communication interface 1963.

The connection interface 1961 is an interface for connecting the RRH 1960 (radio communication interface 1963) to the base station apparatus 1950. The connection interface 1961 may be a communication module for communication on the high-speed line.

The radio communication interface 1963 transmits and receives radio signals via the antenna 1940. The radio communication interface 1963 may typically include the RF circuit 1964, and others. The RF circuit 1964 may include a mixer, a filter, and an amplifier, and others, and transmits and receives radio signals via the antenna 1940. The radio communication interface 1963 includes the multiple RF circuits 1964 as shown in FIG. 61, and, for example, the multiple RF circuits 1964 may be compatible with the multiple antenna elements, respectively. Note that FIG. 61 illustrates the example in which the radio communication interface 1963 includes the multiple RF circuits 1964, but the radio communication interface 1963 may also include a single RF circuit 1964.

In the eNB 1930 shown in FIG. 61, the resource assignment unit 241 and the data size determination unit 243 (and the notification unit 245) described with reference to FIG. 56 may be implemented in the radio communication interface 1955 and/or the radio communication interface 1963. Further, at least a part of these configuration elements may be implemented in the controller 1951. As an example, the eNB 1930 may mount a module including a part (for example, the BB processor 1956) or all of the radio communication interface 1955, and/or the controller 1951, and the resource assignment unit 241 and the data size determination unit 243 (and the notification unit 245) may be implemented in the module. In this case, the module may store a program for allowing the processor to function as the resource assignment unit 241 and the data size determination unit 243 (and the notification unit 245) (in other words, a program allowing the processor to execute operations of the radio resource information acquisition unit 161 and the data size determination unit 163 (and the notification unit 165)), and may execute the program. As another example, the program for allowing the processor to function as the resource assignment unit 241 and the data size determination unit 243 (and the notification unit 245) is installed to the eNB 1930, and the radio communication interface 1955 (for example, the BB processor 1956), and/or the controller 1951 may execute the program. As described above, as the apparatus including the resource assignment unit 241 and the data size determination unit 243 (and the notification unit 245), the eNB 1930, the base station apparatus 1950 or the module may be provided, and the program for allowing the processor to function as the resource assignment unit 241 and the data size determination unit 243 (and the notification unit 245) may be provided. Further, a readable recording medium storing the program may be provided.

The application examples related to the base station 200 according to a reference embodiment of the present disclosure have been described above. Note that the application examples can be applied as the application examples related to the base station 10 according to an embodiment of the present disclosure.

The second modification of the reference embodiment has been described above. According to the second modification of the reference embodiment, even when the base station 10 that is not directly involved in the D2D communication determines the size of the data, the data having the size in consideration of the resending is transmitted and received in the D2D communication by using the radio resource in consideration of the resending. As a result, the use efficiency of the radio resource can be improved.

The preferred embodiments of the present disclosure have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

For example, the example of the communication system conforming to the LTE has been described, but the present disclosure is not limited to such an example. For example, the technology according to the present disclosure may be applied to the communication system conforming to a standard other than the LTE.

Furthermore, for example, the example that the terminal apparatus includes the radio communication function has been described, but the present disclosure is not limited to such an example. For example, the terminal apparatus does not include the radio communication function, and may be connected to another apparatus (for example, an external apparatus, another communication apparatus, or the like) that has a radio communication function allowing radio communication with the base station. Further, the terminal apparatus may be capable of radio communication with the base station through the use of the external apparatus.

Furthermore, for example, the example that the terminal apparatus performs radio communication with the base station has been described, but the present disclosure is not limited to such an example. For example, the terminal apparatus may perform communication with the base station via a wired network. As a specific example, the terminal apparatus may be directly connected to a LAN or connected to another apparatus (for example, an external apparatus, another communication apparatus, or the like) that can be connected to the LAN, and perform communication with the base station via the wired network such as the LAN, the Internet, a core network. Further, as an example, the terminal apparatus, when being capable of communication with the base station via the wired network, may communicate with the base station via the wired network, and when being not capable of communication with the base station via the wired network, may perform radio communication with the base station. As another example, the terminal apparatus does not have to perform radio communication with the base station, but may communicate with the base station only via the wired network. Note that the terminal apparatus that communicates with the base station via the wired network as described above may function as the master apparatus in the LN.

Furthermore, for example, the example that the terminal apparatus communicates with the base station has been described, but the present disclosure is not limited to such an example. For example, the terminal apparatus may communicate with the core network entity instead of communicating with the base station. In this case, as an example, the terminal apparatus provides information to the base station and acquires information from the base station via the core network entity. As another example, the core network entity bears a part of the function of the base station described above, and the terminal apparatus provides information for the core network entity, and acquires information from the core network entity.

Furthermore, the processing steps in the communication control processing and the other processing in this specification may not be always executed in time series in the order described in the sequence diagrams and the flow charts. For example, the processing steps in these processing may be executed in the order different from the order described as the sequence diagrams and the flow charts, or may be executed in parallel.

Furthermore, it is also possible to create a computer program for functioning the processor (for example, a CPU, a DSP or the like) included in the node (for example, the terminal apparatus or the base station) in this specification as configuration elements of the node (for example, the radio resource information acquisition unit, the data size determination unit and/or the notification unit) (in other words, a computer program for allowing the processor to execute the operation of the configuration elements of the node). Further, a memory storing the computer program, and an apparatus including one or more processors capable of executing the computer program (for example, a processing circuit, a chip or a module) may be provided.

Additionally, the present technology may also be configured as below.

(1)

A terminal apparatus capable of communicating with a base station, the terminal apparatus including:

an acquisition unit that acquires radio resource information related to a radio resource usable for device-to-device communication not via the base station, of radio resources controllable by the base station; and a determination unit that determines a size of data to be transmitted and received in the device-to-device communication on the basis of the radio resource information.

(2)

The terminal apparatus according to (1), further including:

a notification unit that notifies another apparatus which performs the device-to-device communication of size-related information related to the size.

(3)

The terminal apparatus according to (2), wherein the other apparatus is notified of the size-related information through transmission on a control channel for transmitting a control signal.

(4)

The terminal apparatus according to (2) or (3), wherein the other apparatus is notified of the size-related information through transmission on a data channel for transmitting data.

(5)

The terminal apparatus according to any one of (2) to (4), wherein the size is one of a plurality of predetermined sizes, and wherein the size-related information is information corresponding to the one of the plurality of predetermined sizes.

(6)

The terminal apparatus according to any one of (2) to (4), wherein the size-related information is information indicating the size.

(7)

The terminal apparatus according to any one of (1) to (6), wherein an apparatus on a transmitting side in the device-to-device communication is notified of the radio resource usable for the device-to-device communication, as a resource for transmission, and an apparatus on a receiving side in the device-to-device communication is notified of the radio resource usable for the device-to-device communication, as a resource for reception.

(8)

The terminal apparatus according to any one of (1) to (7), wherein the determination unit determines the size further on the basis of at least one of a modulation scheme and an encoding scheme.

(9)

The terminal apparatus according to (8), wherein the modulation scheme and the encoding scheme are a modulation scheme and an encoding scheme to be used in the device-to-device communication by an apparatus that performs the device-to-device communication.

(10)

The terminal apparatus according to (9), wherein the determination unit, when the terminal apparatus is not the apparatus that performs the device-to-device communication, acquires information related to a channel to be used in the device-to-device communication, and identifies the modulation scheme and the encoding scheme from the information.

(11)

The terminal apparatus according to (8), wherein the modulation scheme and the encoding scheme, when the terminal apparatus is not an apparatus that performs the device-to-device communication, are a predetermined modulation scheme and a predetermined encoding scheme.

(12)

The terminal apparatus according to (11), wherein the predetermined modulation scheme is a modulation scheme having the lowest data rate among a plurality of usable modulation schemes, and wherein the predetermined encoding scheme is an encoding scheme having the lowest data rate among a plurality of usable encoding schemes.

(13)

The terminal apparatus according to any one of (8) to (12), wherein the determination unit calculates an amount of a resource for data usable for transmission and reception of the data, of the radio resources usable for the device-to-device communication, on the basis of the radio resource information, and determines the size on the basis of the amount of the resource for data and the at least one of the modulation scheme and the encoding scheme.

(14)

The terminal apparatus according to any one of (8) to (12), wherein the determination unit determines, as the size, a minimum size of one or more predetermined sizes corresponding to an amount of the radio resource usable for the device-to-device communication, and the at least one of the modulation scheme and the encoding scheme, on the basis of the radio resource information and the at least one of the modulation scheme and the encoding scheme.

(15)

The terminal apparatus according to any one of (1) to (14), wherein the radio resource usable for the device-to-device communication is a part or all of radio resources to be reported by the base station as a usable radio resource.

(16)

The terminal apparatus according to (15), wherein the device-to-device communication is radio communication in a localized network controlled by the terminal apparatus, and wherein the radio resource usable for the device-to-device communication is assigned by the terminal apparatus as a radio resource for the device-to-device communication from among the radio resources to be reported by the base station.

(17)

The terminal apparatus according to (15), wherein the radio resource usable for the device-to-device communication is assigned by the base station as a radio resource for the device-to-device communication, and is reported by the base station.

(18)

The terminal apparatus according to any one of (1) to (14), wherein the radio resource usable for the device-to-device communication is a part or all of radio resources estimated as a usable radio resource.

(19)

An information processing apparatus that controls a terminal apparatus capable of communicating with a base station, the information processing apparatus including:

a memory that stores a predetermined program; and a processor capable of executing the predetermined program, wherein the predetermined program serves to execute acquiring radio resource information related to a radio resource usable for device-to-device communication not via the base station, of radio resources controllable by the base station, and determining a size of data to be transmitted and received in the device-to-device communication on the basis of the radio resource information.

(20)

A communication control apparatus of a base station, the communication control apparatus including:

an assignment unit that assigns a radio resource for radio communication between the base station and a terminal apparatus to the terminal apparatus from among radio resources controllable by the base station; and a notification unit that notifies the terminal apparatus of usable radio resources of the radio resources controllable by the base station, wherein a part or all of the usable radio resources are used for device-to-device communication not via the base station, and wherein a size of data to be transmitted and received in the device-to-device communication is not determined by the base station, but determined by the terminal apparatus capable of communicating with the base station.

REFERENCE SIGNS LIST

1 communication system
10 base station
11 cell
20 core network entity
21 core network
100 terminal apparatus
161, 171, 181 radio resource information acquisition unit
163, 173, 183 data size determination unit
165, 175, 185 notification unit

The invention claimed is:

1. A terminal apparatus being used as a master device, the terminal apparatus comprising:
   circuitry configured to:
   acquire radio resource information related to a radio resource usable for a device-to-device communication not via a base station for two or more slave devices not for the master device;
   determine a size of data to be transmitted or received in the device-to-device communication between the two or more slave devices based on the radio resource information and predetermined modulation and encoding schemes; and
   notify the two or more slave devices which perform the device-to-device communication of the determined size of the data to be transmitted or received.

2. The terminal apparatus according to claim 1, wherein the slave devices are notified of the information related to the size of data through transmission on a control channel for transmitting a control signal.

3. The terminal apparatus according to claim 1, wherein the slave devices are notified of the information related to the size of data through transmission on a data channel for transmitting data.

4. The terminal apparatus according to claim 1, wherein the size of data is one of a plurality of predetermined sizes, and the information related to the size of data is information corresponding to the one of the plurality of predetermined sizes.

5. The terminal apparatus according to claim 1, wherein the information related to the size of data is information indicating an amount of data.

6. The terminal apparatus according to claim 1, wherein an apparatus on a transmitting side in the device-to-device communication is notified of the radio resource usable for the device-to-device communication, as a resource for transmission, and another apparatus on a receiving side in the device-to-device communication is notified of the radio resource usable for the device-to-device communication, as another resource for reception.

7. The terminal apparatus according to claim 1, wherein the predetermined modulation scheme and the encoding scheme are to be used in the device-to-device communication by the slave devices that perform the device-to-device communication.

8. The terminal apparatus according to claim 1, wherein the predetermined modulation scheme is a modulation scheme having the lowest data rate among a plurality of usable modulation schemes, and the predetermined encoding scheme is an encoding scheme having the lowest data rate among a plurality of usable encoding schemes.

9. The terminal apparatus according to claim 1, wherein the circuitry is further configured to calculate an amount of the radio resource usable for the device-to-device communication, based on the radio resource information, and determine the size of data based on the amount of the radio resource for the data and the predetermined modulation and encoding schemes.

10. The terminal apparatus according to claim 1, wherein the circuitry is further configured to determine, as the size of data, a minimum size of one or more predetermined sizes corresponding to an amount of the radio resource usable for the device-to-device communication, and the predetermined modulation and encoding schemes, based on the radio resource information.

11. The terminal apparatus according to claim 1, wherein the radio resource usable for the device-to-device communication is a part or all of radio resources to be reported by the base station as a usable radio resource.

12. The terminal apparatus according to claim 11, wherein the device-to-device communication is radio communication in a localized network controlled by the terminal apparatus, and the radio resource usable for the device-to-device communication is assigned by the terminal apparatus as a radio resource for the device-to-device communication from the part or all of radio resources to be reported by the base station.

13. The terminal apparatus according to claim 11, wherein the radio resource usable for the device-to-device communication is assigned by the base station as a radio resource for the device-to-device communication, and is reported by the base station.

14. The terminal apparatus according to claim 1, wherein the radio resource usable for the device-to-device communication is a part or all of radio resources estimated as a usable radio resource.

15. An information processing apparatus that controls a terminal apparatus being used as a master device and capable of communicating with a base station, the information processing apparatus comprising:
a memory that stores a predetermined program; and
a processor capable of executing the predetermined program,
wherein the predetermined program serves to execute:
acquiring radio resource information related to a radio resource usable for a device-to-device communication not via the base station for two or more slave devices, not for the master device, wherein the terminal apparatus determines a size of data to be transmitted or received in the device-to-device communication between the two or more slave devices based on the radio resource information and predetermined modulation and encoding schemes, and the terminal apparatus notifies the two or more slave devices which perform the device-to-device communication of the determined size of the data to be transmitted or received.

16. A communication control apparatus of a base station, the communication control apparatus comprising:
circuitry configured to:
assign, to a terminal apparatus, usable radio resources, from radio resources controllable by the base station, for radio communication between the base station and the terminal apparatus; and
notify the terminal apparatus of the usable radio resources of the radio resources controllable by the base station, the terminal apparatus being used as a master device,
wherein a part or all of the usable radio resources are used for a device-to-device communication not via the base station for two or more slave devices, not for the master device, and
wherein the terminal apparatus determines a size of data to be transmitted or received in the device-to-device communication between the two or more slave devices based on radio resource information related to the usable radio resources and predetermined modulation and encoding schemes, and the terminal apparatus notifies the two or more slave devices which perform the device-to-device communication of the determined size of the data to be transmitted or received.

17. The terminal apparatus according to claim 1, wherein the circuitry is further configured to prevent the base station from performing resource assignment for the device-to-device communication, thereby suppressing an increase in a load on the base station.

* * * * *